US012776894B2

(12) United States Patent
Kachare et al.

(10) Patent No.: US 12,776,894 B2
(45) Date of Patent: Oct. 27, 2026

(54) SYSTEMS AND METHODS FOR INTEGRATING FULLY HOMOMORPHIC ENCRYPTION (FHE) WITH A STORAGE DEVICE

(71) Applicant: Samsung Electronics Co., Ltd., Suwon-si (KR)

(72) Inventors: Ramdas Kachare, Pleasanton, CA (US); Dongwan Zhao, San Jose, CA (US); Jimmy Lau, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 495 days.

(21) Appl. No.: 18/108,578

(22) Filed: Feb. 10, 2023

(65) Prior Publication Data

US 2023/0198740 A1 Jun. 22, 2023

Related U.S. Application Data

(63) Continuation-in-part of application No. 18/074,360, filed on Dec. 2, 2022.

(Continued)

(51) Int. Cl.
*H04L 9/00* (2022.01)

(52) U.S. Cl.
CPC .................................... *H04L 9/008* (2013.01)

(58) Field of Classification Search
CPC ..... H04L 9/008; H04L 2209/12; G06F 3/062; G06F 3/0622; G06F 3/0623; G06F 3/0635; G06F 3/0658; G06F 3/0659; G06F 3/0661; G06F 3/0673; G06F 3/0671; G06F 3/0679; G06F 3/0683; G06F 3/0688; G06F 13/14; G06F 13/38; G06F 13/382; G06F 13/4009; G06F 13/4063; G06F 13/4221;

(Continued)

(56) References Cited

U.S. PATENT DOCUMENTS 6,542,961 B1 4/2003 Matsunami et al.
6,963,954 B1 11/2005 Trehus et al.

(Continued)

FOREIGN PATENT DOCUMENTS

CN 106484492 A 3/2017
CN 109379177 A 2/2019

(Continued)

OTHER PUBLICATIONS

European Extended Search Report for Application No. 22214413.1, mailed May 4, 2023.

(Continued)

*Primary Examiner* — Idriss N Alrobaye
*Assistant Examiner* — Richard B Franklin
(74) *Attorney, Agent, or Firm* — Renaissance IP Law Group LLP

(57) ABSTRACT

A multi-function device is disclosed. The multi-function device may include a first connector for communicating with a storage device, a second connector for communicating with a Fully Homomorphic Encryption (FHE) circuit, and a third connector for communicating with a host processor. The multi-function device is configured to expose the storage device to the host processor via the third connector.

20 Claims, 27 Drawing Sheets

Related U.S. Application Data

(60) Provisional application No. 63/403,682, filed on Sep. 2, 2022, provisional application No. 63/403,679, filed on Sep. 2, 2022, provisional application No. 63/292,421, filed on Dec. 21, 2021.

(58) Field of Classification Search
CPC ...... G06F 3/061; G06F 3/067; G06F 12/0862; G06F 12/0868; G06F 12/0888; G06F 2212/502
See application file for complete search history.

(56) References Cited

U.S. PATENT DOCUMENTS

| | | | |
|---|---|---|---|
| 7,117,275 | B1 | 10/2006 | Ofek et al. |
| 7,979,592 | B1 | 7/2011 | Pettey et al. |
| 8,341,327 | B2 | 12/2012 | Baba et al. |
| 8,412,863 | B2 | 4/2013 | Tanaka et al. |
| 9,003,071 | B2 | 4/2015 | Liu |
| 9,053,252 | B2 | 6/2015 | Chang et al. |
| 9,292,551 | B2 | 3/2016 | Kang et al. |
| 9,608,936 | B1 | 3/2017 | Mehrotra et al. |
| 9,722,777 | B2 | 8/2017 | Payton et al. |
| 9,735,962 | B1 * | 8/2017 | Yang ..................... H04L 9/0877 |
| 10,007,443 | B1 | 6/2018 | Rajadnya et al. |
| 10,007,634 | B2 | 6/2018 | Dubal et al. |
| 10,073,981 | B2 | 9/2018 | Arasu et al. |
| 10,298,385 | B2 * | 5/2019 | Khedr ..................... H04L 9/008 |
| 10,318,476 | B2 | 6/2019 | Slik |
| 10,394,746 | B2 | 8/2019 | Kachare et al. |
| 10,430,333 | B2 | 10/2019 | Li et al. |
| 10,509,758 | B1 | 12/2019 | Habusha et al. |
| 10,585,819 | B2 * | 3/2020 | Kachare .............. G06F 13/1668 |
| 10,635,609 | B2 | 4/2020 | Olarig et al. |
| 10,678,732 | B1 | 6/2020 | Long |
| 10,719,474 | B2 | 7/2020 | Kachare et al. |
| 10,972,768 | B2 | 4/2021 | Zou et al. |
| 11,074,013 | B2 | 7/2021 | Suri et al. |
| 11,132,326 | B1 | 9/2021 | Modukuri et al. |
| 11,182,221 | B1 | 11/2021 | Sivaramakrishnan et al. |
| 11,216,391 | B1 | 1/2022 | Brandwine |
| 11,231,868 | B2 | 1/2022 | Bates et al. |
| 11,269,669 | B2 | 3/2022 | Chou et al. |
| 11,316,917 | B2 | 4/2022 | Kachare et al. |
| 11,341,281 | B2 | 5/2022 | Skourtis et al. |
| 11,366,894 | B1 | 6/2022 | Parameshwaran et al. |
| 11,379,374 | B2 | 7/2022 | Pinto |
| 11,416,176 | B2 | 8/2022 | Agarwal |
| 11,567,770 | B2 * | 1/2023 | Pineda de Gyvez . G06F 17/153 |
| 12,436,909 | B2 * | 10/2025 | Shuler ................. G06F 13/4282 |
| 2001/0041053 | A1 | 11/2001 | Abecassis |
| 2004/0030754 | A1 | 2/2004 | Ree |
| 2007/0285287 | A1 | 12/2007 | Hussain et al. |
| 2008/0147898 | A1 | 6/2008 | Freimuth et al. |
| 2009/0248973 | A1 | 10/2009 | Deshpande et al. |
| 2009/0307310 | A1 | 12/2009 | Kim et al. |
| 2011/0060859 | A1 | 3/2011 | Shukla et al. |
| 2011/0131456 | A1 | 6/2011 | Klinglesmith et al. |
| 2011/0307639 | A1 | 12/2011 | Dai |
| 2013/0007332 | A1 | 1/2013 | Teh et al. |
| 2013/0080677 | A1 | 3/2013 | Simmons et al. |
| 2014/0310430 | A1 | 10/2014 | Geddes et al. |
| 2015/0032910 | A1 | 1/2015 | Ben et al. |
| 2015/0149661 | A1 | 5/2015 | Kanigicherla et al. |
| 2015/0212797 | A1 | 7/2015 | Bordawekar et al. |
| 2015/0317088 | A1 | 11/2015 | Hussain et al. |
| 2016/0034415 | A1 | 2/2016 | Singh et al. |
| 2016/0037217 | A1 | 2/2016 | Harmon et al. |
| 2016/0127494 | A1 | 5/2016 | Liu et al. |
| 2016/0154756 | A1 | 6/2016 | Dodson et al. |
| 2016/0306580 | A1 | 10/2016 | Pinto |
| 2016/0378353 | A1 | 12/2016 | Schmisseur et al. |
| 2017/0212579 | A1 | 7/2017 | Tirumala et al. |
| 2017/0235510 | A1 | 8/2017 | Hu et al. |
| 2018/0095915 | A1 | 4/2018 | Prabhakar et al. |
| 2018/0101498 | A1 | 4/2018 | Cosby et al. |
| 2018/0246833 | A1 | 8/2018 | Bai et al. |
| 2018/0260123 | A1 | 9/2018 | Andresen et al. |
| 2018/0359318 | A1 | 12/2018 | Rogers et al. |
| 2019/0114195 | A1 | 4/2019 | Jani et al. |
| 2019/0235890 | A1 | 8/2019 | Schnoor et al. |
| 2019/0250845 | A1 | 8/2019 | Kabra et al. |
| 2019/0266117 | A1 | 8/2019 | Duncan |
| 2019/0272215 | A1 | 9/2019 | Olarig et al. |
| 2020/0042208 | A1 | 2/2020 | Roberts |
| 2020/0042246 | A1 | 2/2020 | Maharana et al. |
| 2020/0077144 | A1 | 3/2020 | Zavesky et al. |
| 2020/0092603 | A1 | 3/2020 | Fairhurst, Sr. et al. |
| 2020/0136799 | A1 | 4/2020 | Smith et al. |
| 2020/0201661 | A1 | 6/2020 | Chou et al. |
| 2020/0250119 | A1 | 8/2020 | Cannata et al. |
| 2020/0257629 | A1 | 8/2020 | Pinto |
| 2020/0401751 | A1 | 12/2020 | Kachare et al. |
| 2021/0012282 | A1 | 1/2021 | Smith et al. |
| 2021/0014047 | A1 | 1/2021 | Bernat et al. |
| 2021/0019270 | A1 | 1/2021 | Li et al. |
| 2021/0042254 | A1 | 2/2021 | Marolia et al. |
| 2021/0117242 | A1 | 4/2021 | Van De Groenendaal et al. |
| 2021/0117360 | A1 | 4/2021 | Kutch et al. |
| 2021/0157487 | A1 | 5/2021 | Guyer et al. |
| 2021/0181995 | A1 | 6/2021 | Ki et al. |
| 2021/0182212 | A1 | 6/2021 | Borikar et al. |
| 2021/0192076 | A1 | 6/2021 | Patel et al. |
| 2021/0247935 | A1 | 8/2021 | Beygi et al. |
| 2021/0250285 | A1 | 8/2021 | Noureddine et al. |
| 2021/0255970 | A1 | 8/2021 | Colenbrander |
| 2021/0263652 | A1 | 8/2021 | Dube |
| 2021/0278998 | A1 | 9/2021 | Li |
| 2021/0281618 | A1 | 9/2021 | Mosur et al. |
| 2021/0311646 | A1 | 10/2021 | Malladi et al. |
| 2021/0349841 | A1 | 11/2021 | Makhervaks et al. |
| 2021/0373951 | A1 | 12/2021 | Malladi et al. |
| 2021/0400102 | A1 | 12/2021 | Giladi |
| 2022/0019441 | A1 | 1/2022 | Rosing et al. |
| 2022/0029929 | A1 | 1/2022 | Jain et al. |
| 2022/0066807 | A1 | 3/2022 | Kashyap et al. |
| 2022/0126210 | A1 | 4/2022 | Kumar et al. |
| 2022/0129415 | A1 | 4/2022 | Grunwald et al. |
| 2022/0150509 | A1 | 5/2022 | Rosewarne |
| 2022/0188028 | A1 | 6/2022 | Mesnier et al. |
| 2022/0368985 | A1 | 11/2022 | Asarikuniyil et al. |
| 2024/0020182 | A1 | 1/2024 | Bert |

FOREIGN PATENT DOCUMENTS

| | | | |
|---|---|---|---|
| CN | 109656473 | A | 4/2019 |
| CN | 111131882 | A | 5/2020 |
| CN | 112667562 | A | 4/2021 |
| CN | 112804297 | A | 5/2021 |
| CN | 113312182 | A | 8/2021 |
| CN | 113424147 | A | 9/2021 |
| CN | 114296638 | A | 4/2022 |
| EP | 3712832 | A1 | 9/2020 |
| EP | 3940676 | A1 | 1/2022 |
| EP | 3987387 | A1 | 4/2022 |
| WO | 2021031619 | A1 | 2/2021 |
| WO | 2021162591 | A1 | 8/2021 |
| WO | 2022164490 | A1 | 8/2022 |

OTHER PUBLICATIONS

European Extended Search Report for Application No. 24167154.4, mailed Sep. 3, 2024.

European Office Action for Application No. 22214413.1, mailed Oct. 4, 2024.

Abdelsalam, Mohamed, "NVMe Solid State Drive Verification Solution using HW Emulation and Virtual Device Technologies," 2016 11th International Design & Test Symposium (IDT), 2016, pp. 47-52.

Cousins, David Bruce et al., "Designing an FPGA-Accelerated Homomorphic Encryption Co-Processor," IEEE Transactions on Emerging Topics in Computing, vol. 5, No. 2, 2016, pp. 193-206.

(56) References Cited

OTHER PUBLICATIONS

European Extended Search Report for Application No. 22188425.7, mailed Dec. 19, 2022.
Feldmann, Axel et al., "F1: A Fast and Programmable Accelerator for Fully Homomorphic Encryption," Proceedings of the 54th Annual IEEE/ACM International Symposium on Microarchitecture (MICRO-54), 2021, 15 pages.
Koo, Gunjae et al., "Summarizer: Trading Communication with Computing Near Storage," Proceedings of the 50th Annual IEEE/ACM International Symposium on Microarchitecture, 2017, pp. 219-231.
Samynathan, Balavinayagam et al., et al., "Computational Storage for Big Data Analytics," Proceedings of 10th International Workshop on Accelerating Analytics and Data Management Systems (ADMS '19), 2019, 9 pages.
Final Office Action for U.S. Appl. No. 18/074,360, mailed Jul. 9, 2024.
Chinese Office Action for Application No. 202010582886.0, mailed Jun. 30, 2023.
Corrected Notice of Allowability for U.S. Appl. No. 16/846,271, mailed Sep. 18, 2023.
European Extended Search Report for Application No. 23189399.1, mailed Jan. 26, 2024.
European Extended Search Report for Application No. 23189787.7, mailed Jan. 26, 2024.
Final Office Action for U.S. Appl. No. 16/846,271, mailed Sep. 20, 2022.
Notice of Allowance for U.S. Appl. No. 16/846,271, mailed Dec. 7, 2022.
Notice of Allowance for U.S. Appl. No. 16/846,271, mailed Mar. 27, 2023.
Notice of Allowance for U.S. Appl. No. 17/669,351, mailed Jan. 25, 2024.
Office Action for U.S. Appl. No. 16/846,271, mailed May 25, 2022.
Office Action for U.S. Appl. No. 17/669,351, mailed Sep. 21, 2023.
Office Action for U.S. Appl. No. 18/074,360, mailed Jan. 4, 2024.
Office Action for U.S. Appl. No. 18/238,449, mailed Dec. 12, 2024.
European Office Action for Application No. 22214413.1, mailed Jun. 18, 2025.
European Office Action for Application No. 23189399.1, mailed Apr. 16, 2025.
European Office Action for Application No. 23189787.7, mailed Apr. 16, 2025.
Office Action for U.S. Appl. No. 18/074,360, mailed Feb. 19, 2025.
Office Action for U.S. Appl. No. 18/108,575, mailed Feb. 12, 2025.
Final Office Action for U.S. Appl. No. 18/238,449, mailed Jul. 10, 2025.
Office Action for U.S. Appl. No. 18/074,360, mailed Sep. 18, 2025.
Office Action for U.S. Appl. No. 18/108,575, mailed Oct. 2, 2025.
European Office Action for Application No. 24167154.4, mailed Sep. 15, 2025.
A Motor Trend Article of Jan. 23, 2020 that describes 'no car, no matter how beloved . . is safe from having its wheels stolen'. (Year: 2020).
Final Office Action for U.S. Appl. No. 18/074,360, mailed Mar. 19, 2026.
Merriam-Webster dictionary definition of a device (Year: 2002).
Microsoft dictionary definition of routing and a router [Year: 2002).
Microsoft dictionary for the terms circuits and circuitry. (Year: 2002).
Microsoft Dictionary pages that show a pass through circuit does not change a signal (Year: 2002).
Office Action for U.S. Appl. No. 18/108,575, mailed May 20, 2026.
Office Action for U.S. Appl. No. 18/238,449, mailed Mar. 2, 2026.
SNIA Computational Storage Architecture and Programming Model, Version 1.0 (Year: 2022).

* cited by examiner

SYSTEMS AND METHODS FOR INTEGRATING FULLY HOMOMORPHIC ENCRYPTION (FHE) WITH A STORAGE DEVICE

RELATED APPLICATION DATA

This application claims the benefit of U.S. Provisional Patent Application Ser. No. 63/403,679, filed Sep. 2, 2022 and U.S. Provisional Patent Application Ser. No. 63/403,682, filed Sep. 2, 2022, both of which are incorporated by reference herein for all purposes.

This application is a continuation in part of U.S. patent application Ser. No. 18/074,360, filed Dec. 2, 2022, which claims the benefit of U.S. Provisional Patent Application Ser. No. 63/292,421, filed Dec. 21, 2021, both of which are incorporated by reference herein for all purposes.

This application is related to U.S. patent application Ser. No. 16/846,271, filed Apr. 10, 2020, now allowed, which claims the benefit of U.S. Provisional Patent Application Ser. No. 62/964,114, filed Jan. 21, 2020, and U.S. Provisional Patent Application Ser. No. 62/865,962, filed Jun. 24, 2019, all of which are incorporated by reference herein for all purposes.

This application is related to U.S. patent application Ser. No. 17/669,351, filed Feb. 10, 2022, which claims the benefit of U.S. Provisional Patent Application Ser. No. 63/232,631, filed Aug. 12, 2021, both of which are incorporated by reference herein for all purposes.

This application is related to U.S. patent application Ser. No. 18/108,575, filed Feb. 10, 2023, which claims the benefit of U.S. Provisional Patent Application Ser. No. 63/403,679, filed Sep. 2, 2022 and U.S. Provisional Patent Application Ser. No. 63/403,682, filed Sep. 2, 2022, both of which are incorporated by reference herein for all purposes.

FIELD

The disclosure relates generally to storage devices, and more particularly to a device to integrate a storage device with a computational storage unit.

BACKGROUND

With the increase in capacity offered by storage devices, applications may process more and more data. Transferring large amounts of data from the storage device to main memory for an application to process may require significant amounts of time. In addition, having the host processor execute the commands to process that data may impose a burden on the host processor.

A need remains to improve the processing data.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
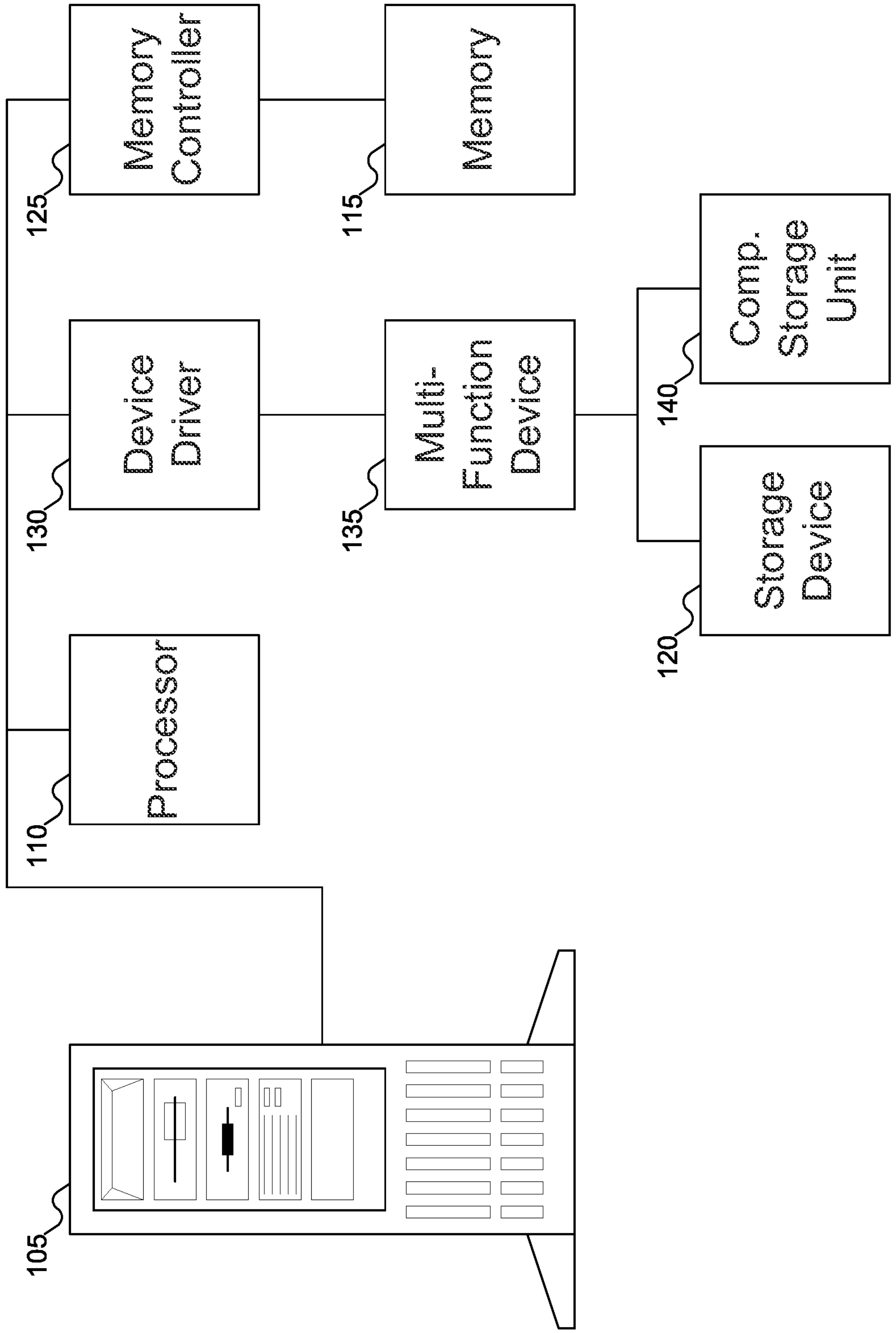
FIG. 1 shows a machine including a multi-function device to support modular storage devices and/or computational storage units, according to embodiments of the disclosure.

Embodiments of the disclosure include a multi-function device. The multi-function device may support storage devices and/or Fully Homomorphic Encryption CHE) circuits. The FHE circuits may support processing of data on the storage devices.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

As storage devices increase in capacity, the amount of data to be processed by an application may also increase. The time required to transfer such data between the storage device and main memory may increase, potentially slowing down execution of the application. In addition, having the host processor execute the commands may place a burden on the host processor, which may reduce the cycles available for the host processor to execute other commands.

Embodiments of the disclosure address these problems with a multi-function device. The multi-function device may support one or more storage devices and one or more computational storage units, which may include a Fully Homomorphic Encryption (FHE) circuit. One or more of the computational storage units may be hidden from the host processor, and used internally by the storage devices and/or the other computational storage units. The multi-function device may expose to the host processor the storage devices and/or computational storage units that are not hidden from the host processor in a manner that makes it appear as though the host processor is directly accessing the storage devices and/or computational storage units.

Computational storage units like the FHE circuit may be connected to the multi-function device via a connector, or they may be integrated into the multi-function device. If the storage units or the computational storage units are connected to the multi-function device, they may be replaceable.

Storage devices and computational storage units like the FHE circuit may share data using a buffer. By using the buffer, data may be shared without host management or involvement. The buffer may act like a shared memory, supporting multiple storage devices and/or computational storage units accessing the data sequentially or in parallel.

FIG. 1 shows a machine including an accelerator to reduce data dimensionality and perform calculations, according to embodiments of the disclosure. In FIG. 1, machine 105, which may also be termed a host or a system, may include processor 110, memory 115, and storage device 120. Processor 110 may be any variety of processor. Processor 110 may also be called a host processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol or a cache coherent interconnect protocol, such as the Compute Express Link (CXL) protocol.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure.

Machine 105 may also include multi-function device 135 (which may also be termed an accelerator or a device). As discussed below, multi-function device 135 may support connections to storage device 120 and computational storage unit 140, but present to processor 110 as though storage device 120 and computational storage unit 140 were a single device. Multi-function device 135 may enable modularity in storage device 120 and/or computational storage unit 140, in that storage device 120 and/or computational storage unit 140 may be added or replaced without necessarily having to replace other components connected to multi-function device 135.

Multi-function device 135 may be implemented using any desired hardware. For example, multi-function device 135, or components thereof, may be implemented using a Field Programmable Gate Array (FPGA), an Application-Specific Integrated Circuit (ASIC), a central processing unit (CPU), a System-on-a-Chip (SoC), a graphics processing unit (GPU), a general purpose GPU (GPGPU), a data processing unit (DPU), a neural processing unit (NPU), a Network Interface Card (NIC), or a tensor processing unit (TPU), to name a few possibilities. Multi-function device 135 may also use a combination of these elements to implement multi-function device 135.

Computational storage unit 140 may take any desired form. Like multi-function device 135, computational storage unit 140 may be implemented using an FPGA, an ASIC, a CPU, an SoC, a GPU, a GPGPU, a DPU, an NPU, an NIC, or a TPU, to name a few possibilities. Computational storage unit 140 may implement any desired function or functions. For example, computational storage unit 140 may implement a specific-purpose accelerator, designed to perform near-data processing. Computational storage unit 140 may also be a general-purpose accelerator, designed to receive a program from machine 140 to perform near-data processing. Computational storage unit 140 may also implement other functions, such as encryption and/or decryption, compression and/or decompression, or network interfacing, among other possibilities.

A particular example of encryption and/or decryption that may be performed using computational storage unit 140 may be Fully Homomorphic Encryption (FHE). FHE may support analyzing encrypted data without decrypting it. FHE may thus protect the privacy and confidentiality of customer data. When computational storage unit 140 includes a circuit to implement FHE, machine 105 may download instructions into the engine of the FHE circuit to implement the desired processing, which may then be performed near to the data, without transferring the data into memory 115.

While FIG. 1 shows device driver 130, which is described above as supporting access to storage device 120, machine 105 may also include device drivers (not shown) for computational storage unit 140 and/or multi-function device 135. That is, embodiments of the disclosure may support device driver 130 supporting any or all of storage device 120, computational storage unit 140, or multi-function device 135, and embodiments of the disclosure may include additional device drivers to support any or all combinations of these components.

In some embodiments of the disclosure, device driver 130 (and other device drivers, such as to support computational storage unit 140) may provide application programming interfaces (APIs) to access storage device 120 and/or computational storage unit 140. By supporting existing device drivers, existing applications may be executed by processor 110 without change to the applications (although embodiments of the disclosure may involve modifications to other elements in a software stack). For example, a TPU may have a TPU device driver, or a GPU may have a GPU device driver: applications that access functions of the TPU or the GPU may continue to use the existing TPU device driver or GPU device driver. In addition, by supporting existing device drivers, computational storage unit 140 may be any computational storage unit, even if manufactured by a different manufacturer from storage device 120 and/or multi-function device 135. Further, in some embodiments of the disclosure, device driver 130 (or other device drivers) may be proprietary.

Embodiments of the disclosure may include any desired mechanism to communicate with storage device 120 and/or computational device 140. For example, storage device 120 and/or computational device 140 may connect to a bus, such as a Peripheral Component Interconnect Express (PCIe) bus, or storage device 120 and/or computational device 140 may include Ethernet interfaces or some other network interface. Other potential interfaces and/or protocols to storage device 120 and/or computational device 140 may include NVMe, NVMe over Fabrics (NVMe-oF), CXL, Remote Direct Memory Access (RDMA), Transmission Control Protocol/Internet Protocol (TCP/IP), Universal Flash Storage (UFS), embedded MultiMediaCard (eMMC), InfiniBand, Serial Attached Small Computer System Interface (SCSI) (SAS), Internet SCSI (iSCSI), and Serial AT Attachment (SATA), among other possibilities.

Machine 105 may include a range of addresses in memory 115 that are addressable by processor 110, storage device 120, and/or computational storage unit 140. In some embodiments of the disclosure, processor 110 may allocate subsets of this address range that may be associated with commands to be sent to storage device 120 and/or computational storage unit 140. In addition, processor 110 may allocate a subset of this address range that may be associated with commands for peer-to-peer communication between storage device 120 and computational storage unit 140. That is, by associating a command with a particular address in memory 115, it may be possible to determine whether the command is intended for storage device 120, computational storage unit 140, or for transferring data between storage device 120 and computational storage unit 140. Note that memory 115 might not include enough memory to include such a physical address, but memory 115 is not necessarily required to actually enough memory to include such an address. For example, memory 115 might include 2 gigabytes (GB) of memory, but might support addressing up to 4 GB of memory. A subset of addresses, such as those between 2 GB and 3 GB, might be used to identify commands for peer-to-peer communication, even though memory 115 might not be able to process a request for those particular addresses. Multi-function device 135 may identify such commands based on the address assigned to the command, and may intercept such commands for processing.

Processor 110, memory 115, storage device 120, memory controller 125, multi-function device 135, and computational storage unit 140 may be connected in any desired manner, using any desired links and any desired protocols. For example, multi-function device 135 may connect to processor 110, memory 115, and memory controller 125 using a PCIe bus and using the NVMe protocol, but other busses or links and other protocols may be used. Storage device 120 and computational storage unit 140 may similarly connect to multi-function device 135 using a PCIe bus and using the NVMe protocol, but other busses or links (for example, Small Computer System Interface (SCSI), Parallel AT Attachment (known as IDE), HyperTransport, Infiniband, or others) and other protocols may be used. Nor is it required that the same busses, links, or protocols be used: storage device 120 and computational storage unit 140 might connect to multi-function device 135 using other busses, links, or protocols (and may each use different busses, links, or protocols). Embodiments of the disclosure are intended to include any and all variations regarding how the components of FIG. 1 are connected and how they communicate with each other.

Figure 2:
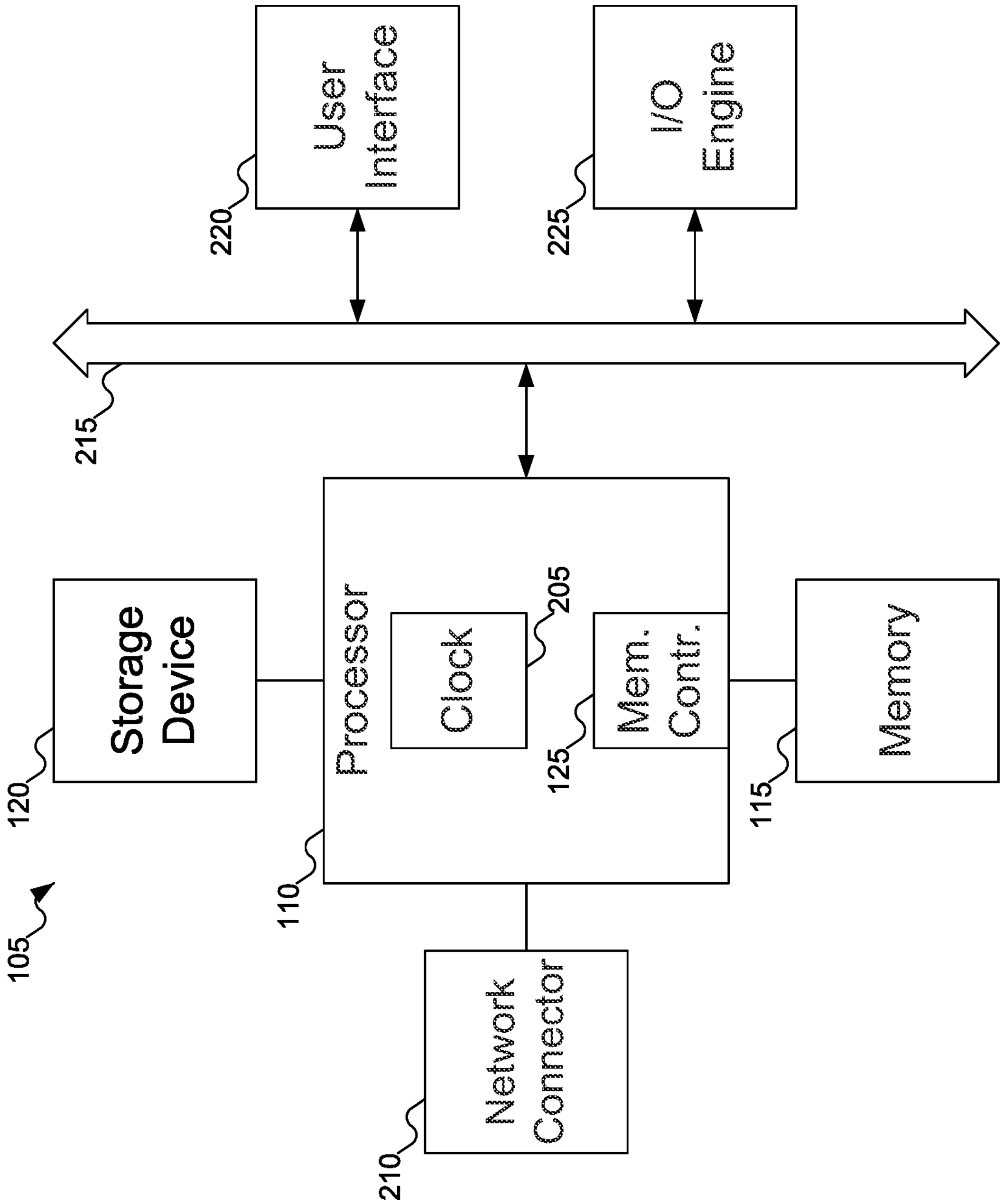
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components. Example components that may be managed using user interfaces 220 and I/O engines 225 may include keyboard, mouse, printer, and display screen, among other possibilities.

FIG. 2 shows an alternate diagram of some of the components shown in FIG. 1: components not shown in FIG. 2 (for example, multi-function device 135 of FIG. 1) may also be included. FIG. 2 is not intended to differ from FIG. 1, but merely to present an alternative view of how the various components shown might be arranged. In addition, other components may be added: for example, other components may connect to buses 215.

Figure 3:
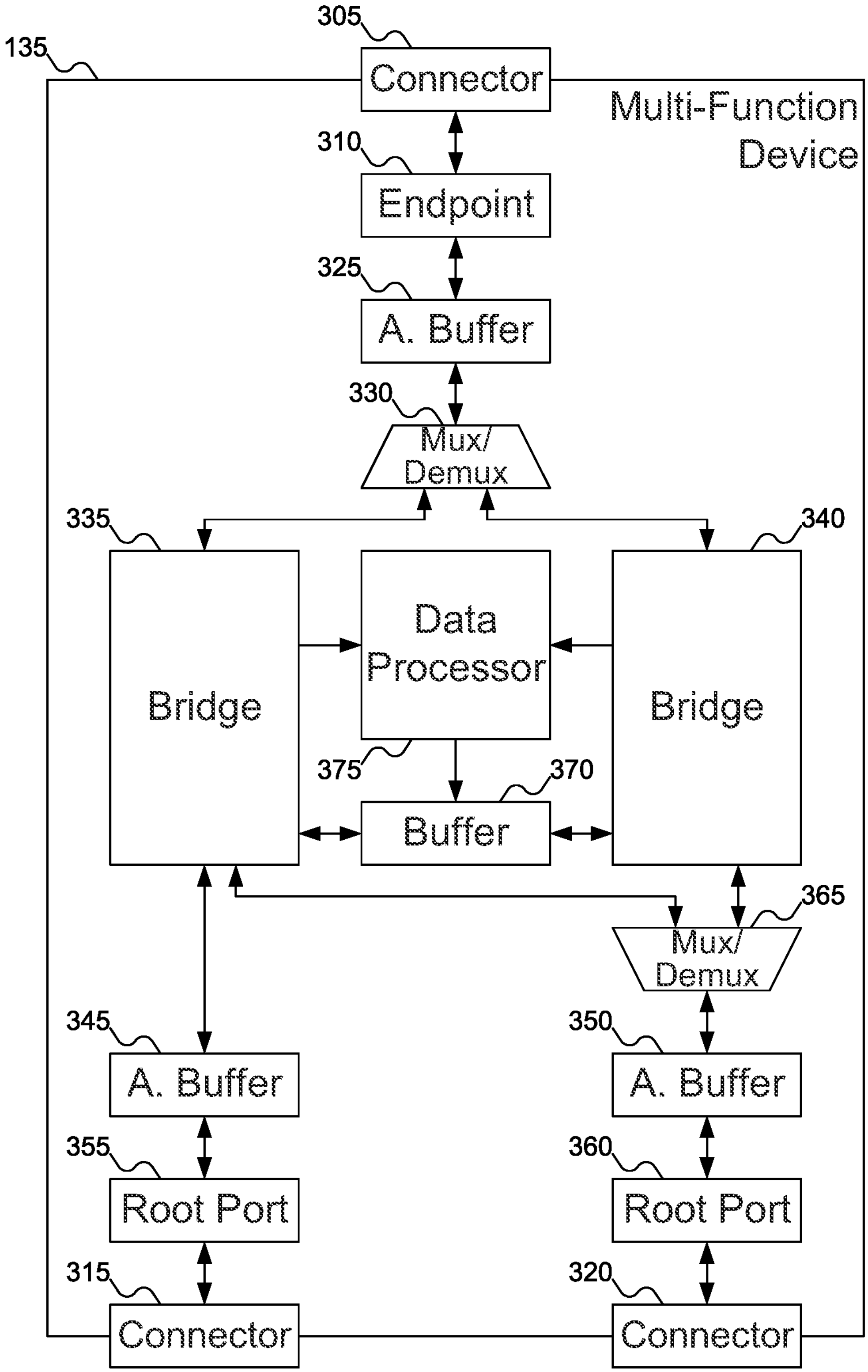
FIG. 3 shows details of the multi-function device of FIG. 1, according to embodiments of the disclosure.

FIG. 3 shows details of multi-function device 135 of FIG. 1, according to embodiments of the disclosure. In FIG. 3, multi-function device 135 may include connector 305. Connector 305 may provide a connection to a bus that may be used to communicate with processor 110 of FIG. 1. For example, connector 305 may provide a connection to a PCIe bus, but other busses may be used as well.

Endpoint 310 may be connected to (or implemented as part of) connector 305. Endpoint 310 may function as an endpoint for queries from processor 110 of FIG. 1. Endpoint 310 may expose functions of devices attached to other connectors of multi-function device 135, such as connectors 315 and 320, as discussed further below.

Asynchronous buffer 325 may be connected to endpoint 310 and/or connector 305. Asynchronous buffer 325 may act as a landing point for requests, messages, and/or data to be exchanged between host processor 110 of FIG. 1 and other devices connected to multi-function device 135. Asynchronous buffer 325 may be asynchronous, in that asynchronous buffer 325 may operate at a different clock cycle than processor 110. That is, processor 110 of FIG. 1 may send a request, message, or data based on the clock cycle of processor 110 of FIG. 1, which may be written into asynchronous buffer 325 when received from processor 110 of FIG. 1; the request, message, or data may then be read from asynchronous buffer 325 at a time governed by the clock cycle of multi-function device 135. By including asynchronous buffer 325, multi-function device 135 may avoid needing to operate at the same clock cycle as processor 110.

Note that in some embodiments of the disclosure, multi-function device 135 may operate using the same clock cycle as processor 110 of FIG. 1. In such embodiments of the disclosure, asynchronous buffer 325 may be omitted entirely, or replaced with a synchronous buffer (to permit temporary storage of requests, messages, and/or data received from or to be transmitted to processor 110 of FIG. 1).

Multiplexer/demultiplexer 330 may be connected to asynchronous buffer 325. Multiplexer/demultiplexer 330 may access requests, messages, and/or data from asynchronous buffer 325. Multiplexer/demultiplexer 330 may then determine which device connected to multi-function device 135 the request, message, or data is intended, and may route the request, message, or data accordingly. To accomplish this function, multiplexer/demultiplexer 330 may also be connected to bridges 335 and 340, each of which may ultimately deliver a request, message, or data to a particular device connected to multi-function device 135. In another embodiment of the disclosure, multiplexer/demultiplexer 330 may communicate with more than two bridges. How multiplexer/demultiplexer 330 may determines to which bridge a particular request should be delivered is discussed further below.

Bridges 335 and 340 may be connected to asynchronous buffers 345 and 350, respectively. Asynchronous buffers 345 and 350, like asynchronous buffer 325, may enable multi-function device 135 to operate at a different clock cycle than the various devices connected to connectors 315 and 320. In addition, like asynchronous buffer 325, in some embodiments of the disclosure multi-function device 135 may operate using the same clock cycle as the device(s) connected to connectors 315 and/or 320. In such embodiments of the disclosure, asynchronous buffer 345 and/or 350 may be omitted entirely, or replaced with synchronous buffers (to permit temporary storage of requests, messages, and/or data received from or to be transmitted to the devices connected to connectors 315 and/or 320).

Root ports 355 and 360 may be connected to asynchronous buffers 345 and 350 respectively (and may be implemented as part of connectors 315 and 320, respectively). Root ports 355 and 360 may communicate with devices connected to connectors 315 and 320, respectively. For example, storage device 120 of FIG. 1 may be connected to connector 315, and computational storage unit 140 of FIG. 1 may be connected to connector 320.

Root ports 355 and 360 may interrogate devices connected to connectors 315 and 320 for information about those devices. For example, devices connected to connectors 315 or 320 may expose various functions identifying requests that may be made of the devices.

In some embodiments of the disclosure, these functions may include one or more physical functions (PFs) and/or one or more virtual functions (VFs). Each PF may represent a resource, such as a function offered by the device. Each VF may represent a function that is associated with a PF, but is "virtualized": that is, for a given PF there may be one more VFs. PFs and VFs may be discovered by when the devices are enumerated: this enumeration may be performed by root ports 355 and 360 rather than by processor 110 of FIG. 1. While PFs, VFs, endpoints, and root ports are concepts commonly associated with PCIe devices, embodiments of the disclosure may include similar concepts when using devices that connect to other busses.

Once the PFs and VFs are enumerated, this information may be provided to bridges 335 and 340, and eventually be provided back to multiplexer/demultiplexer 330 and/or endpoint 310. In this manner, endpoint 310 may be capable of exposing the functions (PFs, VFs, or both) of the various devices connected to connectors 315 and 320. If there are any conflicts between the functions exposed by the devices connected to connectors 315 and 320 (for example, identical function identifiers), multiplexer/demultiplexer 330 and/or endpoint 310 may change the enumerations to avoid such conflicts. For example, devices may enumerate the functions starting at zero: if the devices connected to connectors 315 and 320 were both assigned the function number starting at zero, multiplexer/demultiplexer 330 might not be able to determine for which device a particular request associated with function number zero is intended. Thus, for example, if the device connected to connector 315 has three PFs and the device connected to connector 320 has two PFs, multiplexer/demultiplexer 330 may assign the PFs to the device connected to connector 315 using numbers 0, 1, and 2, and may assign the PFs to the device connected to connector 320 using numbers 3 and 4. As long as no two PFs are assigned the same number, multiplexer/demultiplexer 330 may map functions in any desired manner. In addition, VFs exposed by the devices connected to connectors 315 and/or 320 may be exposed as VFs or PFs (that is, VFs of the devices may map to PFs exposed by multi-function device 135).

With this understanding the operation of multiplexer/demultiplexer 330 may now be understood. Upon receiving a request, message, or data from processor 110 of FIG. 1 via connector 305, multiplexer/demultiplexer 330 may determine the identifier of the function for which the data is relevant. For example, if the request is a write request intended for storage device 120 of FIG. 1, multiplexer/demultiplexer 330 may identify the write function in the write request, and may internally map that write function to storage device 120 of FIG. 1. Multiplexer/demultiplexer 330 may then route the write request to bridge 335 or bridge 340, depending on which bridge may lead to storage device 120 of FIG. 1. More information about how exposed functions of the devices attached to connectors 315 and 320 may be exposed by multi-function device 135 may be found in U.S. patent application Ser. No. 16/846,271, filed Apr. 10, 2020, now pending, which claims the benefit of U.S. Provisional Patent Application Ser. No. 62/964,114, filed Jan. 21, 2020, and U.S. Provisional Patent Application Ser. No. 62/865,962, filed Jun. 24, 2019, all of which are incorporated by reference herein for all purposes.

Endpoint 310 and root ports 355 and 360 may be examples of PCIe ports, and may be used with embodiments of the disclosure with multi-function device 135 connecting to PCIe busses. In embodiments connecting multi-function device 135 connecting to other busses, endpoint 310 and root ports 355 and 360 may be replaced with other equivalent components, or may be omitted if not needed in that architecture.

While FIG. 3 shows multi-function device 135 as including three connectors 305, 315, and 320, which may connect to processor 110 of FIG. 1, storage device 120 of FIG. 1, and computational storage unit 140 of FIG. 1, embodiments of the disclosure may include any number of connectors. For example, multi-function device 135 may include four or more connectors: the additional connectors may connect to additional storage devices and/or computational storage units. Further, there may be any number (one or more) of storage devices and/or any number (one or more) of computational storage units connected to multi-function device 135 via connectors such as connectors 315 and 320. There is no requirement that the number of storage devices connected to multi-function device 135 be identical to the number of computational storage units connected to multi-function device 135. If multi-function device 135 includes more connectors than connectors 315 and 320, multi-function device 135 may also include additional bridges like bridges 335 and 340, additional asynchronous buffers like asynchronous buffers 345 and 350, and additional root ports like root ports 355 and 360, to support additional devices.

FIG. 3 also includes multiplexer/demultiplexer 365, which may be interposed between bridge 340 and asynchronous buffer 350. Multiplexer/demultiplexer 365 may be used in peer-to-peer communication between the devices connected to connectors 315 and 320. That is, using multiplexer/demultiplexer 365, it may be possible for the device attached to connector 320 to communicate with the device attached to connector 315 without having such communications to pass through processor 110 of FIG. 1 (via connector 305). To achieve this result, multiplexer/demultiplexer 365 may example information in a request, message, or data received at multiplexer/demultiplexer 365. Multiplexer/demultiplexer 365 may then identify any responses to such requests, messages, or data received from the device connected to connector 320, and may return such responses to the component that issued the original request, message, or data. For example, multiplexer/demultiplexer 365 may determine an identifier of the request, message, or data and the source from which the request, message, or data was received. Then, if multiplexer/demultiplexer 365 receives a response from the device connected to connector 320 associated with that identifier, multiplexer/demultiplexer 365 may send the response to the appropriate component.

As discussed above, in some embodiments of the disclosure, the devices connected to connectors 315 and 320 may be PCIe devices. In such embodiments of the disclosure, multiplexer/demultiplexer 365 may expect to process transaction layer packets (TLP).

In embodiments of the disclosure that support more than two devices connected to multi-function device 135, there may be a multiplexer/demultiplexer like multiplexer/demultiplexer 365 associated with devices attached to multi-function device 135. In some embodiments of the disclosure, such a multiplexer/demultiplexer may be interposed between a bridge like bridge 340 and an asynchronous buffer like asynchronous buffer 350 for all devices; in other embodiments of the disclosure, such a multiplexer/demultiplexer may be interposed between a bridge and an asynchronous buffer for computational storage units like computational storage unit 140 of FIG. 1, or between a bridge and an asynchronous buffer for storage devices like storage device 120 of FIG. 1. A multiplexer/demultiplexer may also be interposed between various components, permitting communication across the components. Embodiments of the disclosure may also include more than one multiplexer/demultiplexer to support various different paths for communication between components. In some embodiments of the disclosure, all components might be able to communicate with all other components; in other embodiments of the disclosure, only some components might be able to communicate with some other components. Note that multiplexer/demultiplexer 365 and similar multiplexers/demultiplexers may be connected to some or all bridges like bridges 335 and 340, to support the exchange of data between various pairs of devices.

Note that multiplexer/demultiplexer 365 may receive requests, messages, and/or data from a device attached to connector 315, and from processor 110 of FIG. 1 attached to connector 305. In some embodiments of the disclosure, requests received by multiplexer/demultiplexer 365 from processor 110 of FIG. 1 and from the device attached to connector 315 may include tags that identify the request. For example, read requests may include a tag that identifies the request, so that data may be returned associated with the same tag. When such tagged requests are received from only one source, it may be expected that tags will not conflict: for example, multiplexer/demultiplexer 365 may reasonably assume that processor 110 of FIG. 1 would not assign the same tag to two different read requests. But when requests are received from multiple sources, unless the multiple sources coordinate their use of tags, it might happen that a request received from one source might have the same tag as a request received from another source. Upon receiving the data from computational storage unit 140 of FIG. 1, multiplexer/demultiplexer 365 might not be able to differentiate which device originated the read request: this situation could be a conflict.

There are several ways in which such a conflict might be avoided. One solution may be to process requests from only one source at a time, and the other source might wait until no requests from the first source are active. But this solution might not offer the best performance. Another solution may be to permit only requests with unique tags to be active at any time. Thus, so long as each request has a different tag from any other active requests, the request may be processed; if the request replicates a tag that is associated with another active request, the new request may be buffered until the active request with that tag is complete. This solution offers better performance. Yet another solution may be for multiplexer/demultiplexer 365 to provide tags that may be used by the various sources: so long as each source may be provided a set of tags that does not intersect with the set of tags assigned to another source, tag conflict may be avoided. Yet another solution may be for multiplexer/demultiplexer 365 to introduce a level of indirection, mapping tags from each source to new tags (used internally to multiplexer/demultiplexer 365). When a request is received, the tag may be mapped and the mapping from the original tag to the new tag may be stored in a table in multiplexer/demultiplexer 365. When the request is completed, multiplexer/demultiplexer 365 may determine the original tag from the new tag received with the response.

To support such operations, bridge 335 may also be capable of directing requests, messages, or data (whether received from processor 110 of FIG. 1 as received via connector 305 or from the device connected to connector 315) to multiplexer/demultiplexer 365. This situation may occur, for example, if the devices attached to connectors 315 and 320 may support direct memory addressing (DMA). For example, assume that storage device 120 of FIG. 1 is connected to connector 315 and computational storage unit 140 of FIG. 1 is connected to connector 320. If computational storage unit 140 of FIG. 1 includes a memory (such as a DRAM) and storage device 120 of FIG. 1 may issue a DMA request that may write data into that memory, bridge 335 may direct the DMA request to multiplexer/demultiplexer 365 (rather than to multiplexer/demultiplexer 330). In this manner processor 110 of FIG. 1 may be bypassed, which may result in the request being processed more expeditiously.

While having either storage device 120 of FIG. 1 or computational storage unit 140 of FIG. 1 read or write data directly from the other is useful, it is not always possible or practical. For example, to support DMA, one device may need a memory, and the other device may need a circuit to read data from or write data to that memory (in the first device). If either element is lacking (for example, if computational storage unit 140 of FIG. 1 includes neither memory nor a circuit to read or write a memory in storage device 120 of FIG. 1), then DMA might not be possible.

In addition, if DMA is used, then the devices may need to handle the data as stored, without processing. If the data may need processing before it is used, DMA might not be an option. For example, consider computational storage unit 140 of FIG. 1 operating to process video data. If computational storage unit 140 of FIG. 1 expects data to be in a particular format—for example, MPEG format—but the data is in another format—for example, WVM format—computational storage unit 140 of FIG. 1 might not be able to process the data unless the data is transcoded first. Or if data in a table is stored in column format but computational storage unit 140 of FIG. 1 expects the table to be stored in row format, the table might need to be transposed before computational storage unit 140 of FIG. 1 may process the data.

If storage device 120 of FIG. 1 includes a processor that may process the data so that it is in a format that may be used by computational storage unit 140 of FIG. 1, storage device 120 of FIG. 1 may process the data before DMA is used to transfer the data from storage device 120 of FIG. 1 to computational storage unit 140 of FIG. 1. But another approach may also be used.

Buffer 370 may be used to store data being transferred between the devices connected to connectors 315 and 320. Once the data is stored in buffer 370, data processor 375 may then process the data as appropriate before transfer to the destination device. Once the data in buffer 370 has been processed by data processor 375, the processed data may be transferred to the destination device. In some embodiments of the disclosure, DMA may be used by the devices to write data to or read data from buffer 370. Buffer 370 may use any desired form of storage: for example, DRAM, SRAM, or the like, and may be on-chip or off-chip.

Buffer 370 may have an associated address range, which may be used by storage device 120 of FIG. 1 or computational storage unit 140 of FIG. 1 to read data from or write data to buffer 370, may be determined by multi-function device 135 itself, or may be assigned by processor 110 of FIG. 1.

Bridges 335 and 340 may use the address range of buffer 370 to determine whether a particular request to access an address involves memory 115 of FIG. 1 or buffer 370. Thus, for example, when bridge 335 receives a request to read data from or write data to a particular address, bridge 335 may examine the request and determine if the address is associated with buffer 370. If so, then bridge 335 may direct the request to buffer 370 rather than delivering the request to processor 110 of FIG. 1. Put another way, bridge 335 may process a request on an address in buffer 370 rather than delivering the request to processor 110 of FIG. 1 and letting processor 110 of FIG. 1 handle the request. Processing the request by bridge 335 may involve determining what data is to be read, written, or deleted, and carrying out the appropriate action. Bridge 335 may determine whether to process the request itself by examining the request. For example, if the request reads, writes, or deletes data at an address associated with buffer 370, sending the request to processor 110 of FIG. 1 or memory 115 of FIG. 1 might result in processor 110 of FIG. 1 or memory 115 of FIG. 1 sending another request back, since the data may be in buffer 370. By processing the request itself, bridge 335 may avoid sending requests back and forth to either processor 110 of FIG. 1 or memory 115 of FIG. 1, which may result in more efficient operation of machine 105 of FIG. 1. Bridge 340 may similarly redirect requests to buffer 370. Note that storage device 120 of FIG. 1 and/or computational storage unit 140 of FIG. 1 (or whatever devices might be connected to connectors 315 and 320) may be agnostic to the fact that their requests have been redirected to buffer 370: as far as the devices are concerned, the requests are happening in memory 115 of FIG. 1.

Data processor 375 may perform any desired processing on data in buffer 370. Data processor 375 may include a circuit and/or software to perform some expected processing. But data processor 375 may also be general enough to support processing as instructed by processor 110 of FIG. 1. That is, processor 110 of FIG. 1 may download a program to data processor 375, which may then execute that program on data in buffer 370 to transform the data into a format expected by the destination device.

As discussed above, in some embodiments of the disclosure data processing may be performed to put the data in a format appropriate for the device designated to receive the data. But in some embodiments of the disclosure, data processing may be performed even if the device designated to receive the data may be able to process the data. For example, the data might already be in a format that may be acceptable to the destination device, but there might be a more optimal format. In such embodiments of the disclosure, data processor 375 may process the data even though the data is already in a format that may be acceptable to the destination device.

In some embodiments of the disclosure, processor 110 of FIG. 1 may act as the scheduler. In such embodiments of the disclosure, processor 110 of FIG. 1 may send a request to the source device. Upon receiving a response from the source device, processor 110 of FIG. 1 may then signal data processor 375 to being processing the data in buffer 370. Once data processor 375 has completed the processing of the data in buffer 370, data processor 375 may signal processor 110 of FIG. 1 that the processing is complete, after which processor 110 of FIG. 1 may request that the destination device read the data from buffer 370.

In other embodiments of the disclosure, data processor 375 may act as a scheduler for the data transfer. Data processor 375 may send a request to the source device, asking that the data be transferred to buffer 370. Note that bridges 335 and 340 may access buffer 370, to effect writing data to (and reading data from) buffer 370. Once the transfer is complete, the source device may signal data processor 375 that the transfer is complete. Data processor 375 may then transform the data as appropriate. Once data processor 375 has finished transforming the data in buffer 370, data processor 375 may signal the destination device that the data is ready for retrieval, and the destination device may then read the data from buffer 370. Data processor 375 may receive such instructions regarding scheduling from processor 110 of FIG. 1. These instructions may be encoded using any desired protocol: a new protocol may also be designed to support such scheduling instructions.

When computational storage unit 140 of FIG. 1 processes a request from processor 110 of FIG. 1 (or an application running on processor 110 of FIG. 1), that processing may use data from buffer 370 (potentially as processed by data processor 375). But that processing may also involve data from processor 110. For example, if computational storage unit 140 of FIG. 1 is performing image recognition, the data from storage device 120 of FIG. 1 may include information about how to recognize various features of an image. But the image itself to be processed may be provided by processor 110 of FIG. 1. Or, if computational storage unit 140 of FIG. 1 is processing a query on a database, the database itself may come from storage device 120 of FIG. 1, but the query may be provided by processor 110 of FIG. 1. Thus, information processed by computational storage unit 140 of FIG. 1 may come from different sources via multi-function device 135.

As discussed above, multi-function device 135 may include more than two connectors 315 and 320, and therefore may include more than two attached devices. In some embodiments of the disclosure, some or all attached devices may have access to buffer 370, and may read data from or write data to buffer 370. In other embodiments of the disclosure, there may be any number (one or more) of buffers 370 (and possibly more than one data processor 375 as well). For example, there may a buffer 370 associated with each computational storage unit 140 of FIG. 1 connected to multi-function device 135. In that manner, data may be written to a buffer associated with the computational storage unit 140 of FIG. 1 that is expected to process the data. Note that buffer 370 may also be used to exchange data between two (or more) storage devices 120 of FIG. 1 attached to multi-function device 135, or between two (or more) computational storage units 140 of FIG. 1: embodiments of the disclosure are not limited to using buffer 370 to exchange data between storage device 120 of FIG. 1 and computational storage unit 140 of FIG. 1. There may be one or more data processors 375 as well: the number of data processors 375 may be one-to-one with the number of buffers 370, or the number of data processors 375 may differ from the number of buffers 370.

In some embodiments of the disclosure, peer-to-peer communication may use a PCIe protocol for communication. That is, bridges 335 and/or 340 may use the PCIe protocol for transmission of requests, messages, and/or data to and/or from the devices connected to connectors 315 and 320. In other embodiments of the disclosure, peer-to-peer communication may use other protocols. In some embodiments of the disclosure, the devices connected to connectors 315 and 320 may use different protocols for communication (although in such embodiments of the disclosure some mapping of requests, messages, or data formats and/or protocols between or among the protocols may be needed).

As noted above, computational storage unit 140 of FIG. 1 may, among other possibilities, be an NIC. When an NIC is connected to connector 320, storage device 120 of FIG. 1 (when connected to connector 315) may be able to communicate with the NIC via peer-to-peer communication (using, for example, buffer 370). Multi-function device 135 may therefore support communication between storage device 120 of FIG. 1 and the NIC without such communication necessarily passing through processor 110 of FIG. 1. Note that using an NIC as computational storage unit 140 of FIG. 1, and connecting the NIC to connector 320, does not prevent processor 110 of FIG. 1 from communicating with the NIC: processor 110 of FIG. 1 may still communicate with the NIC via multi-function device 135. In addition, if multi-function device 135 includes additional connectors, another computational storage unit 140 of FIG. 1 may also be connected to multi-function device 135, also enabling that computational storage unit 140 of FIG. 1 to communicate with the NIC without such communication passing through processor 110 of FIG. 1. In this manner, an NIC may be treated as a computational storage unit and combined with one or more storage devices and/or one or more other computational storage units 140 of FIG. 1.

While FIG. 3 shows connectors 315 and 320 and suggests that connectors 315 and 320 may permit the replacement of the attached devices, embodiments of the disclosure may include one or more of connectors 315 and 320 as permanent connectors. In addition, some embodiments of the disclosure may include both permanent and swappable connectors. For example, storage device 120 of FIG. 1 might be permanently affixed to connector 315 (perhaps via soldering), whereas computational storage unit 140 of FIG. 1 might be plugged into connector 320, which may support detaching and replacing computational storage unit 140 of FIG. 1. In some embodiments of the disclosure, swapping a device connected to connectors 315 or 320 may be performed as a hot-swap (that is, without powering down machine 105 of FIG. 1 to perform the replacement); in other embodiments of the disclosure, swapping a device connected to connectors 315 or 320 may involve powering machine 105 of FIG. 1 down before replacing the device.

Figure 4:
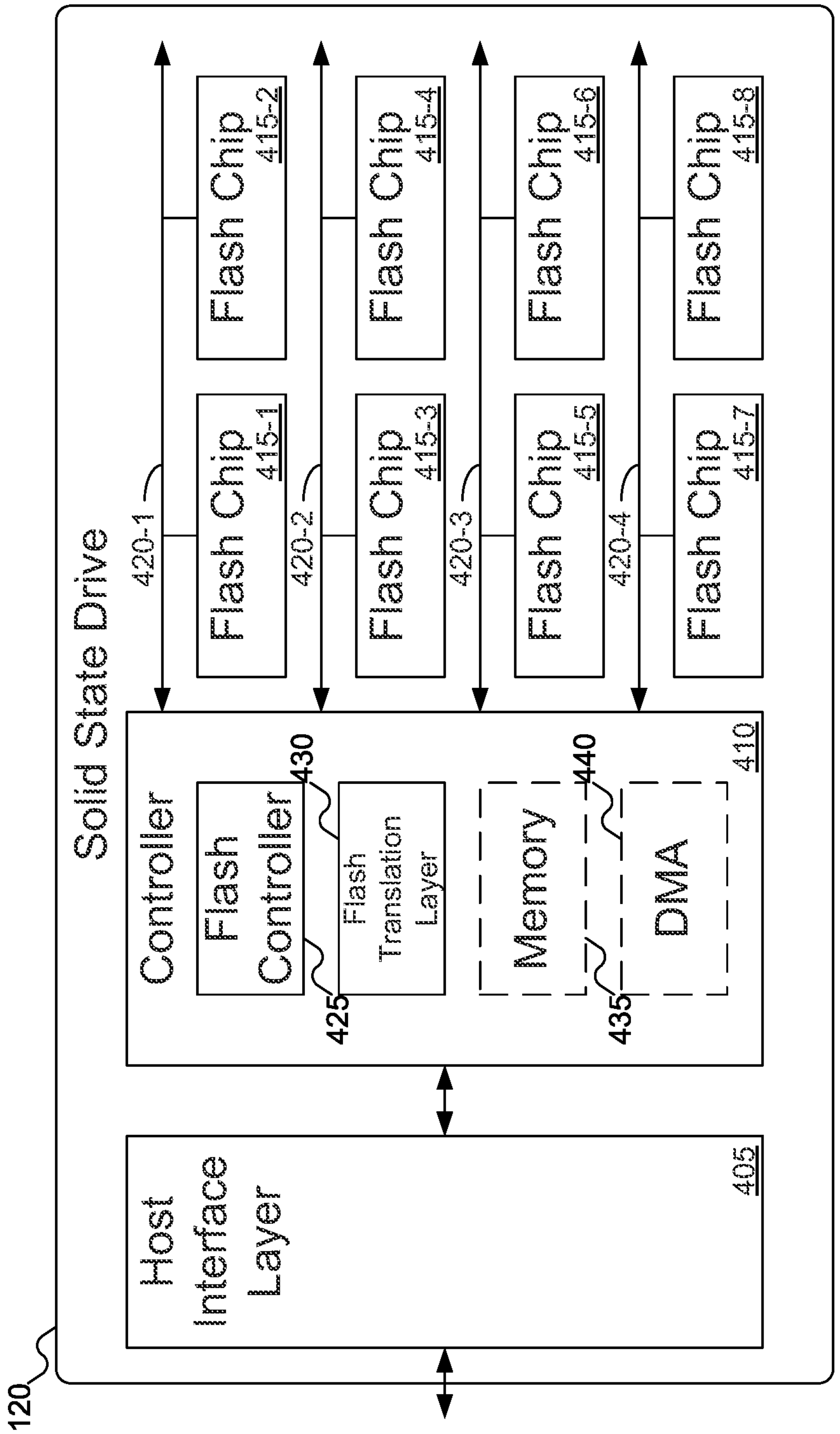
FIG. 4 shows details of the storage device of FIG. 1, according to embodiments of the disclosure.

FIG. 4 shows details of storage device 120 of FIG. 1, according to embodiments of the disclosure. In FIG. 4, the implementation of storage device 120 is shown as for a Solid State Drive. In FIG. 4, storage device 120 may include host interface layer (HIL) 405, controller 410, and various flash memory chips 415-1 through 415-8 (also termed "flash memory storage"), which may be organized into various channels 420-1 through 420-4. Host interface layer 405 may manage communications between storage device 120 and other components (such as processor 110 of FIG. 1). Host interface layer 405 may also manage communications with devices remote from storage device 120: that is, devices that are not considered part of multi-function device 135 of FIG. 1, but in communication with storage device 120: for example, over one or more network connections. These communications may include read requests to read data from storage device 120, write requests to write data to storage device 120, and delete requests to delete data from storage device 120.

Host interface layer 405 may manage an interface across only a single port, or it may manage interfaces across multiple ports. Alternatively, storage device 120 may include multiple ports, each of which may have a separate host interface layer 405 to manage interfaces across that port. Embodiments of the inventive concept may also mix the possibilities (for example, an SSD with three ports might have one host interface layer to manage one port and a second host interface layer to manage the other two ports).

Controller 410 may manage the read and write operations, along with garbage collection and other operations, on flash memory chips 415-1 through 415-8 using flash memory controller 425. SSD controller 410 may also include flash translation layer 430, memory 435, and/or DMA controller 440. Flash translation layer 430 may manage the mapping of logical block addresses (LBAs) (as used by host 105 of FIG. 1) to physical block addresses (PBAs) where the data is actually stored on storage device 120. By using flash translation layer 430, host 105 of FIG. 1 does not need to be informed when data is moved from one block to another within storage device 120.

Memory 435 may be a local memory, such as a DRAM, used by storage controller 410. Memory 435 may be a volatile or non-volatile memory. Memory 435 may also be accessible via DMA from devices other than storage device 120: for example, computational storage unit 140 of FIG. 1. Memory 435 may be omitted, as shown by its representation using dashed lines.

DMA 440 may be a circuit that enables storage device 120 to execute DMA commands in a memory outside storage device 120. For example, DMA 440 may enable storage device 120 to read data from or write data to memory 115 of FIG. 1 or a memory in computational storage unit 140 of FIG. 1. DMA 440 may be omitted, as shown by its representation using dashed lines.

While FIG. 4 shows storage device 120 as including eight flash memory chips 415-1 through 415-8 organized into four channels 420-1 through 420-4, embodiments of the inventive concept may support any number of flash memory chips organized into any number of channels. Similarly, while FIG. 4 shows the structure of a SSD, other storage devices (for example, hard disk drives) may be implemented using a different structure from that shown in FIG. 4 to manage reading and writing data, but with similar potential benefits.

While FIG. 4 shows storage device 120 as being just a storage device, embodiments of the disclosure may include other components within storage device 120. For example, storage device 120 might have its own computational storage unit, which might be used by processor 110 of FIG. 1 (or other devices attached to multi-function device 135 of FIG. 1). For example, processor 110 of FIG. 1 or a computational storage unit connected to multi-function device 135 of FIG. 1 via connector 320 of FIG. 1 might use a computational storage unit included as part of storage device 120.

Figure 5A:
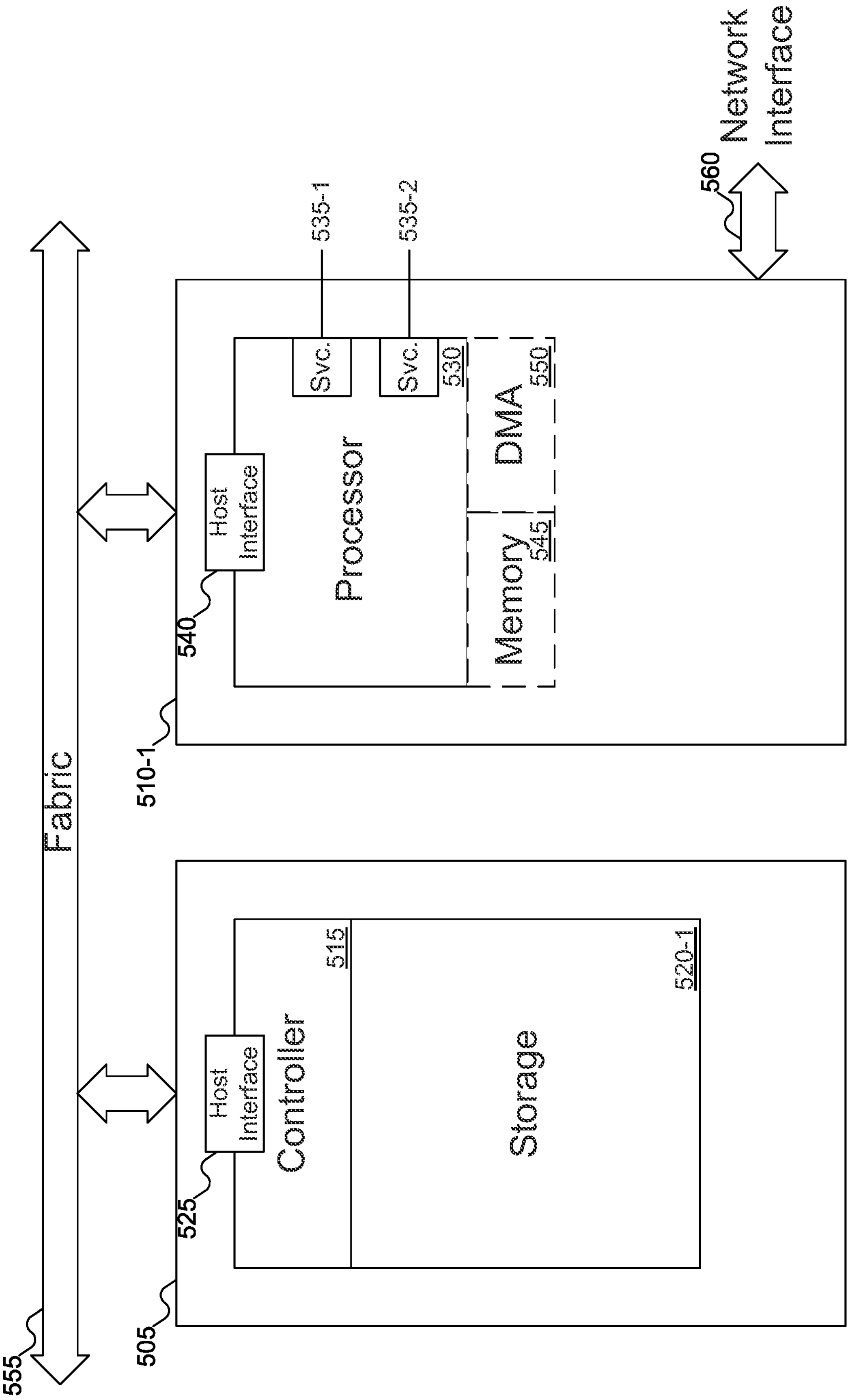
FIG. 5A shows a first example implementation of the computational storage unit of FIG. 1, according to embodiments of the disclosure.

FIGS. 5A-5D shows example implementations of computational storage unit 140 of FIG. 1, according to embodiments of the disclosure. In FIG. 5A, storage device 505 and computational device 510-1 are shown. Storage device 505 may include controller 515 and storage 520-1, and may be reachable across a host protocol interface, such as host interface 525. Host interface 525 may be used both for management of storage device 505 and to control I/O of storage device 505. An example of host interface 525 may include queue pairs for submission and completion, but other host interfaces 525 are also possible, using any native host protocol supported by storage device 505.

Computational device 510-1 may be paired with storage device 505. Computational device 510-1 may include any number (one or more) processors 530, which may offer one or more services 535-1 and 535-2. To be clearer, each processor 530 may offer any number (one or more) services 535-1 and 535-2 (although embodiments of the disclosure may include computational device 510-1 including exactly two services 535-1 and 535-2). Each processor 530 may be a single core processor or a multi-core processor. Computational device 510-1 may be reachable across a host protocol interface, such as host interface 540, which may be used for both management of computational device 510-1 and/or to control I/O of computational device 510-1. As with host interface 525, host interface 540 may include queue pairs for submission and completion, but other host interfaces 540 are also possible, using any native host protocol supported by computational device 510-1. Examples of such host protocols may include Ethernet, RDMA, TCP/IP, InfiniBand, iSCSI, PCIe, SAS, and SATA, among other possibilities. In addition, host interface 540 may support communications with other components of system 105 of FIG. 1—for example, a NIC, if the NIC is not connected to multi-function device 135 of FIG. 1—or to operate as a NIC and communicate with local and/or remote network/cloud components.

Processor(s) 530 may be thought of as near-storage processing: that is, processing that is closer to storage device 505 than processor 110 of FIG. 1. Because processor(s) 530 are closer to storage device 505, processor(s) 530 may be able to execute commands on data stored in storage device 505 more quickly than for processor 110 of FIG. 1 to execute such commands. Processor(s) 530 may have associated memory 545, which may be used for local execution of commands on data stored in storage device 505. Memory 545 may also be used similarly to memory 435 of FIG. 4, and may be accessible by DMA from devices other than computational storage unit 410-1. Memory 545 may include local memory similar to memory 115 of FIG. 1, on-chip memory (which may be faster than memory such as memory 115 of FIG. 1, but perhaps more expensive to produce), or both.

Computational storage unit 410-1 may also include DMA 550. DMA 550 may be used similarly to DMA 440 of FIG. 4, and may be used to access memories in devices other than computational storage unit 410-1.

Depending on the implementation, memory 545 and/or DMA 550 may be omitted, as shown by the dashed lines.

While FIG. 5A shows storage device 505 and computational device 510-1 as being separately reachable across fabric 555, embodiments of the disclosure may also include storage device 505 and computational device 510-1 being serially connected, or sharing multi-function device 135 of FIG. 1 (as shown in FIG. 1). That is, commands directed to storage device 505 and computational device 510-1 might both be received at the same physical connection to fabric 555 and may pass through one device (or multi-function device 135 of FIG. 1) to reach the other. For example, if computational device 510-1 is located between storage device 505 and fabric 555, computational device 510-1 may receive commands directed to both computational device 510-1 and storage device 505: computational device 510-1 may process commands directed to computational device 510-1, and may pass commands directed to storage device 505 to storage device 505. Similarly, if storage device 505 is located between computational device 510-1 and fabric 555, storage device 505 may receive commands directed to both storage device 505 and computational device 510-1: storage device 505 may process commands directed to storage device 505 and may pass commands directed to computational device 510-1 to computational device 510-1.

Services 535-1 and 535-2 may offer a number of different functions that may be executed on data stored in storage device 505. For example, services 535-1 and 535-2 may offer pre-defined functions, such as encryption, decryption, compression, and/or decompression of data, erasure coding, and/or applying regular expressions. Or, services 535-1 and 535-2 may offer more general functions, such as data searching and/or SQL functions. Services 535-1 and 535-2 may also support running application-specific code. That is, the application using services 535-1 and 535-2 may provide custom code to be executed using data on storage device 505. Services 535-1 and 535-2 may also any combination of such functions. Table 1 lists some examples of services that may be offered by processor(s) 530.

TABLE 1

| Service Types |
|---|
| Compression |
| Encryption |
| Database filter |
| Erasure coding |
| RAID |
| Hash/CRC |
| RegEx (pattern matching) |
| Scatter Gather |
| Pipeline |
| Video compression |
| Data deduplication |
| Operating System Image Loader |
| Container Image Loader |
| Berkeley packet filter (BPF) loader |
| FPGA Bitstream loader |
| Large Data Set |

Processor(s) 530 (and, indeed, computational device 510-1) may be implemented in any desired manner. Example implementations may include a local processor, such as a CPU or some other processor (such as an FPGA, an ASIC, or a SoC), a GPU, a GPGPU, a DPU, an NPU, an NIC, or a TPU, among other possibilities. Processor(s) 530 may also be implemented using an FPGA or an ASIC, among other possibilities. If computational device 510-1 includes more than one processor 530, each processor may be implemented as described above. For example, computational device 510-1 might have one each of CPU, TPU, and FPGA, or computational device 510-1 might have two FPGAs, or computational device 510-1 might have two CPUs and one ASIC, etc.

Depending on the desired interpretation, either computational device 510-1 or processor(s) 530 may be thought of as a computational storage unit.

Some embodiments of the disclosure may include other mechanisms to communicate with storage device 505 and/or computational device 510-1. For example, storage device 505 and/or computational device 510-1 may include network interface 560, which may support communication with other devices using Ethernet, RDMA, TCP/IP, InfiniBand, SAS, iSCSI, or SATA, among other possibilities. Network interface 560 may provide another interface for communicating with storage device 505 and/or computational device 510-1. While FIG. 5A shows network interface 560 as providing communication to computational device 510-1, embodiments of the disclosure may include a network interface to storage device 505 as well. In addition, in some embodiments of the disclosure, such other interfaces may be used instead of host interfaces 525 and/or 540 (in which case host interfaces 525 and/or 540 may be omitted). Other variations, shown in FIGS. 5B-5D below, may also include such interfaces.

Figure 5B:
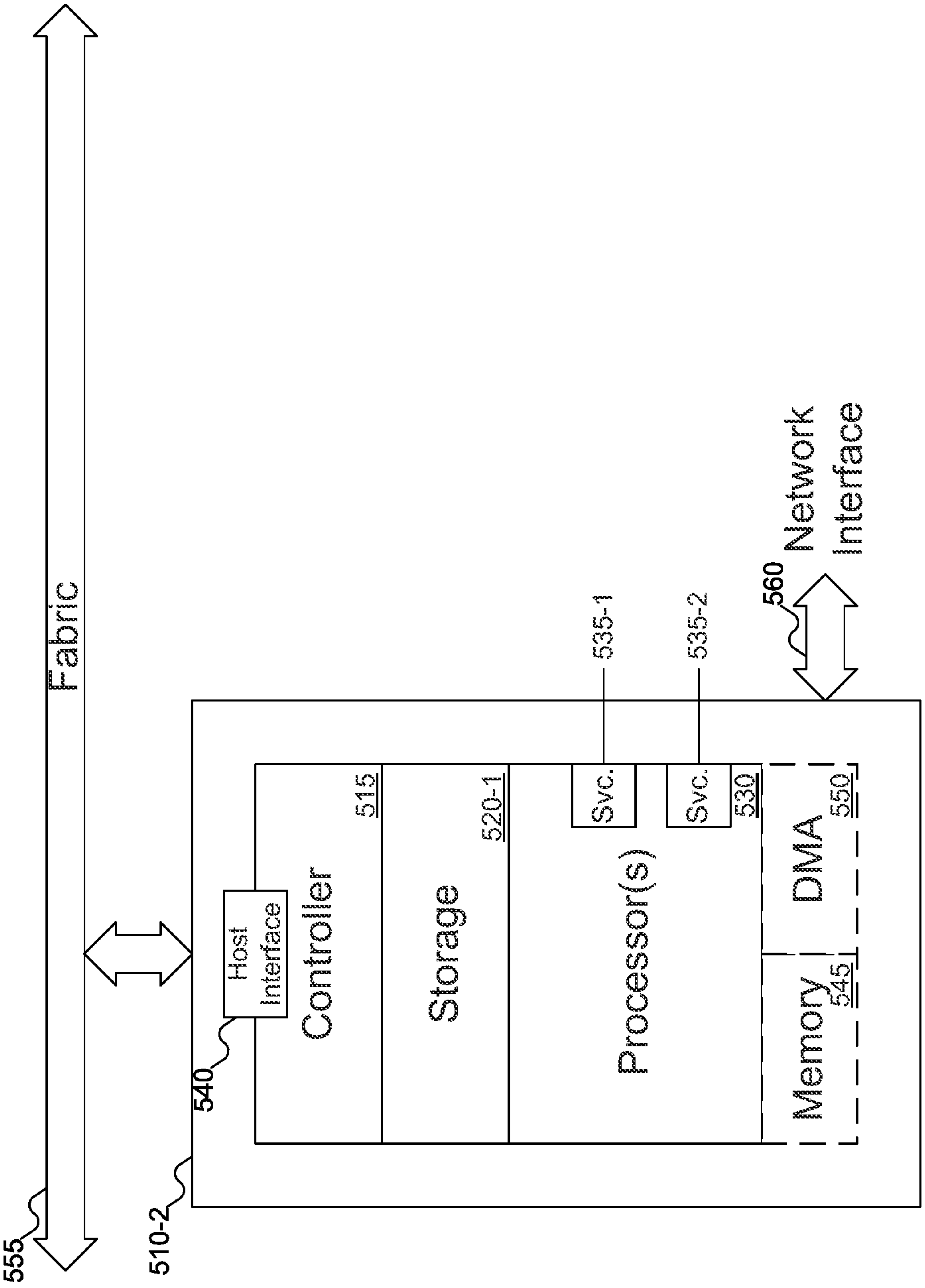
FIG. 5B shows a second example implementation of the computational storage unit of FIG. 1, according to embodiments of the disclosure.

Whereas FIG. 5A shows storage device 505 and computational device 510-1 as separate devices, in FIG. 5B they may be combined. Thus, computational device 510-2 may include controller 515, storage 520-1, processor(s) 530 offering services 535-1 and 535-2, memory 545, and/or DMA 550. As with storage device 505 and computational device 510-1 of FIG. 5A, management and I/O commands may be received via host interface 540 and/or network interface 560. Even though computational device 510-2 is shown as including both storage and processor(s) 530, FIG. 5B may still be thought of as including a storage device that is associated with a computational storage unit.

Figure 5C:
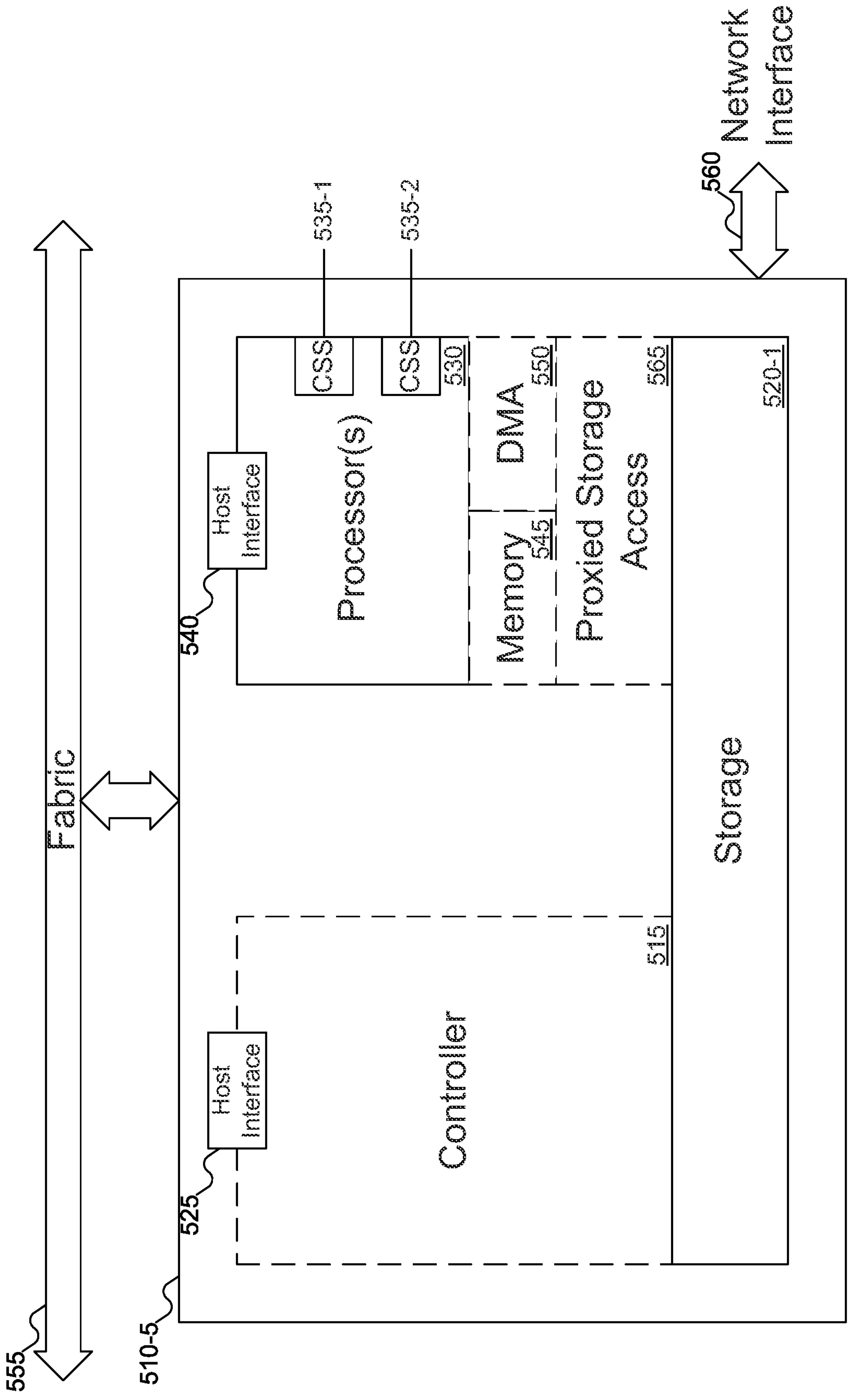
FIG. 5C shows a third example implementation of the computational storage unit of FIG. 1, according to embodiments of the disclosure.

In yet another variation shown in FIG. 5C, computational device 510-5 is shown. Computational device 510-3 may include controller 515 and storage 520-1, as well as processor(s) 530 offering services 535-1 and 535-2, memory 545, and/or DMA 550. But even though computational device 510-3 may be thought of as a single component including controller 515, storage 520-1, processor(s) 530 (and also being thought of as a storage device associated with a computational storage unit), memory 545, and/or DMA 550, unlike the implementation shown in FIG. 5B controller 515 and processor(s) 530 may each include their own host interfaces 525 and 540 and/or network interface 560 (again, which may be used for management and/or I/O). By including host interface 525, controller 515 may offer transparent access to storage 520-1 (rather than requiring all communication to proceed through processor(s) 530).

In addition, processor(s) 530 may have proxied storage access 565 to storage 520-1. Thus, instead of routing access requests through controller 515, processor(s) 530 may be able to directly access the data from storage 520-1.

In FIG. 5C, both controller 515 and proxied storage access 565 are shown with dashed lines to represent that they are optional elements, and may be omitted depending on the implementation.

Figure 5D:
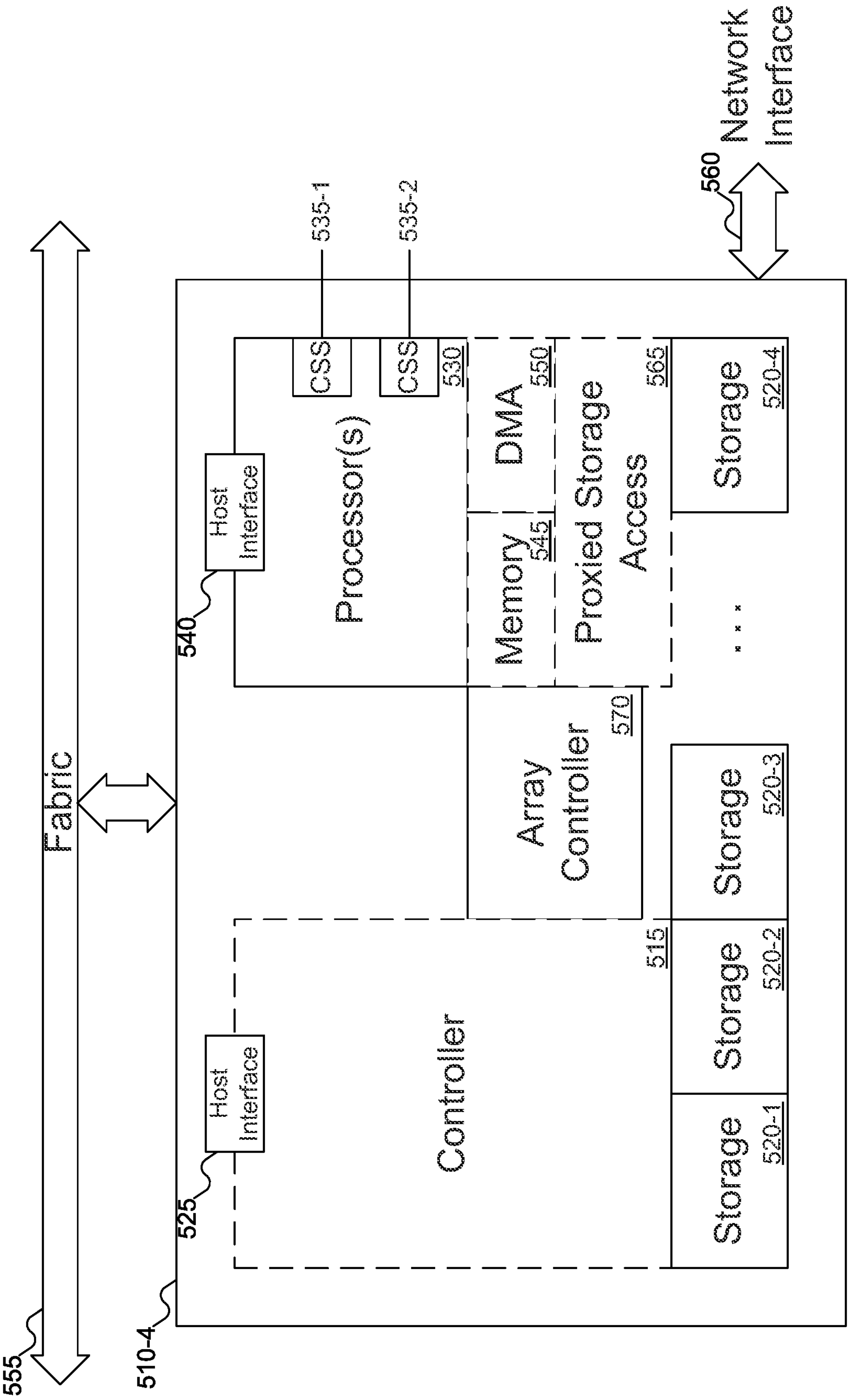
FIG. 5D shows a fourth example implementation of the computational storage unit of FIG. 1, according to embodiments of the disclosure.

Finally, FIG. 5D shows yet another implementation. In FIG. 5D, computational device 510-4 is shown, which may include controller 515, memory 545, DMA 550, and proxied storage access 565 similar to FIG. 5C. In addition, computational device 510-4 may include an array of one or more storage 520-1 through 520-4. While FIG. 5D shows four storage elements, embodiments of the disclosure may include any number (one or more) of storage elements. In addition, the individual storage elements may be other storage devices, such as those shown in FIGS. 5A-5D.

Because computational device 510-4 may include more than one storage element 520-1 through 520-4, computational device 510-4 may include array controller 570. Array controller 570 may manage how data is stored on and retrieved from storage elements 520-1 through 520-4. For example, if storage elements 520-1 through 520-4 are implemented as some level of a Redundant Array of Independent Disks (RAID), array controller 570 may be a RAID controller. If storage elements 520-1 through 520-4 are implemented using some form of Erasure Coding, then array controller 570 may be an Erasure Coding controller.

Figure 6:
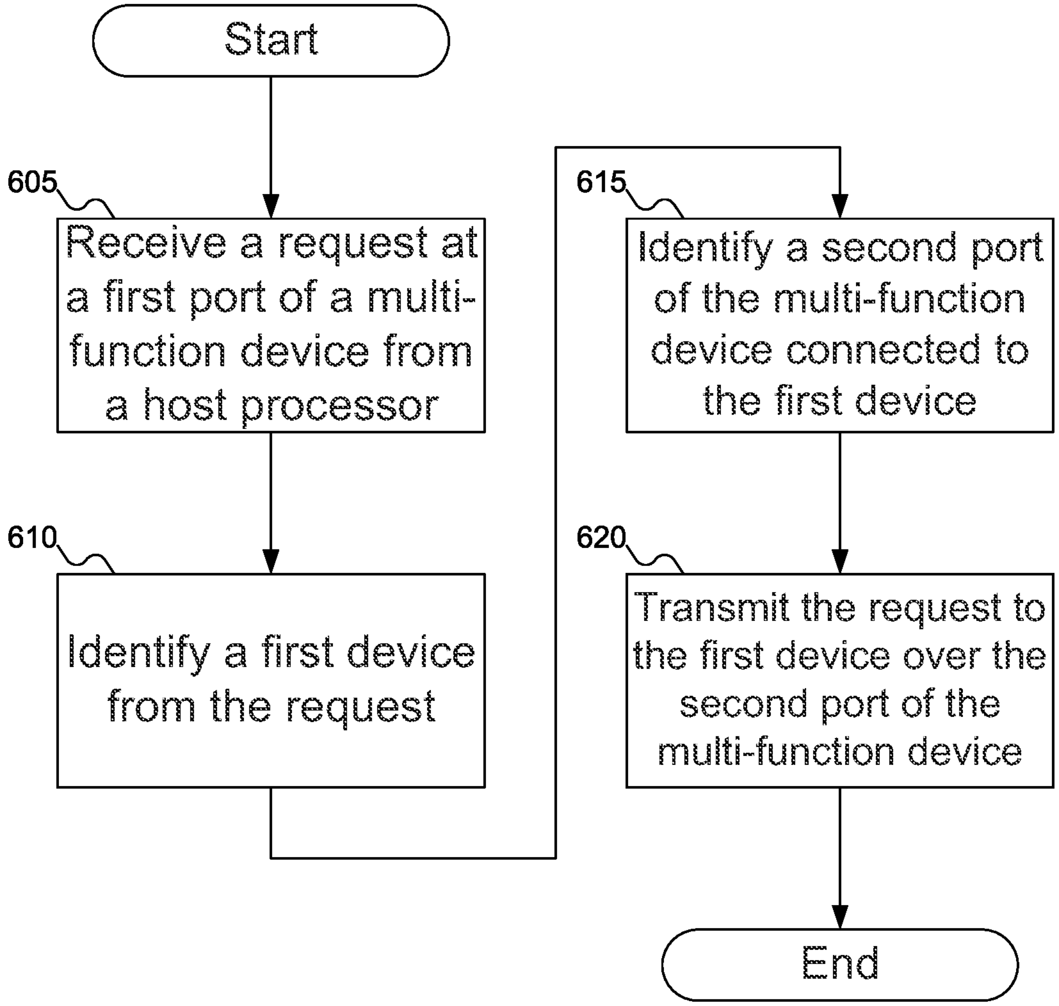
FIG. 6 shows a flowchart of an example procedure for using the multi-function device of FIG. 1 to deliver requests to the storage device of FIG. 1 and/or the computational storage unit of FIG. 1, according to embodiments of the disclosure.

FIG. 6 shows a flowchart of an example procedure for using multi-function device 135 of FIG. 1 to deliver requests to storage device 120 of FIG. 1 and/or computational storage unit 140 of FIG. 1, according to embodiments of the disclosure. In FIG. 6, at block 605, multi-function device 135 of FIG. 1 may receive a request at port 310 of FIG. 3. At block 610, multiplexer/demultiplexer 330 of FIG. 3 may identify a device from the request. At block 615, multiplexer/demultiplexer 330 of FIG. 3 may identify port 355 of FIG. 3 or port 360 of FIG. 3 as being connected to the device identified from the request. At block 620, multiplexer/demultiplexer 330 of FIG. 3, bridge 335 of FIG. 3 or bridge 340 of FIG. 3, and port 355 of FIG. 3 or port 360 of FIG. 3 may transmit the request to the device identified from the request.

Figure 7:
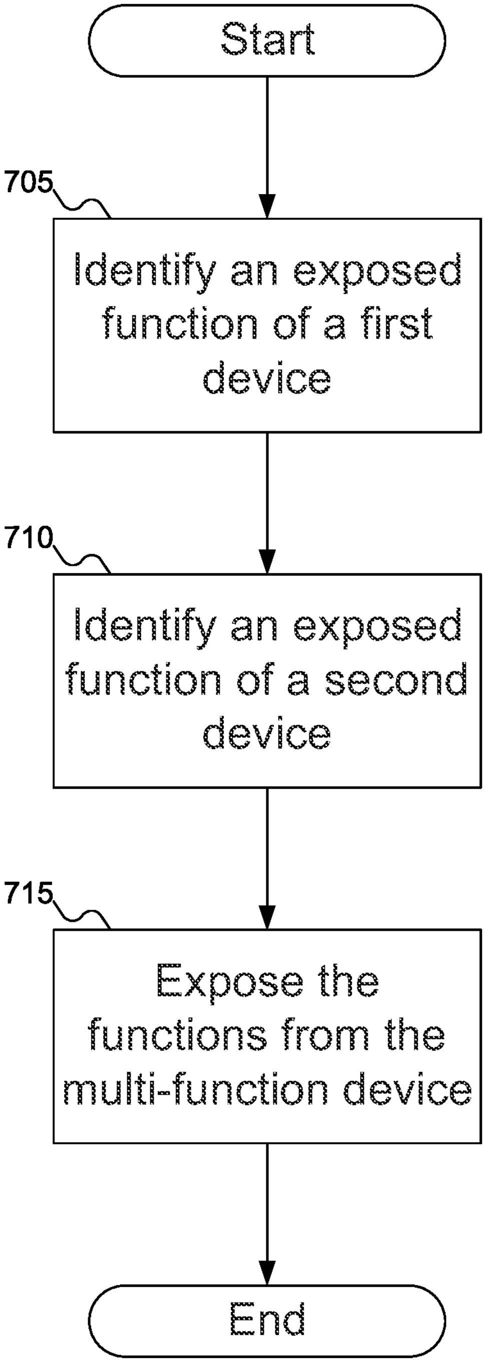
FIG. 7 shows a flowchart of an example procedure for using the multi-function device of FIG. 1 to identify exposed functions of the storage device of FIG. 1 and/or the computational storage unit of FIG. 1, according to embodiments of the disclosure.

FIG. 7 shows a flowchart of an example procedure for using multi-function device 135 of FIG. 1 to identify exposed functions of the storage device 120 of FIG. 1 and/or computational storage unit 140 of FIG. 1, according to embodiments of the disclosure. In FIG. 7, at block 705, root port 355 of FIG. 3 may identify a function exposed by the device connected to connector 315 of FIG. 3. At block 710, root port 360 of FIG. 3 may identify a function exposed by the device connected to connector 320 of FIG. 3. At block 715, endpoint 310 of FIG. 3 may expose the functions as from multi-function device 135 of FIG. 1.

Figure 8:
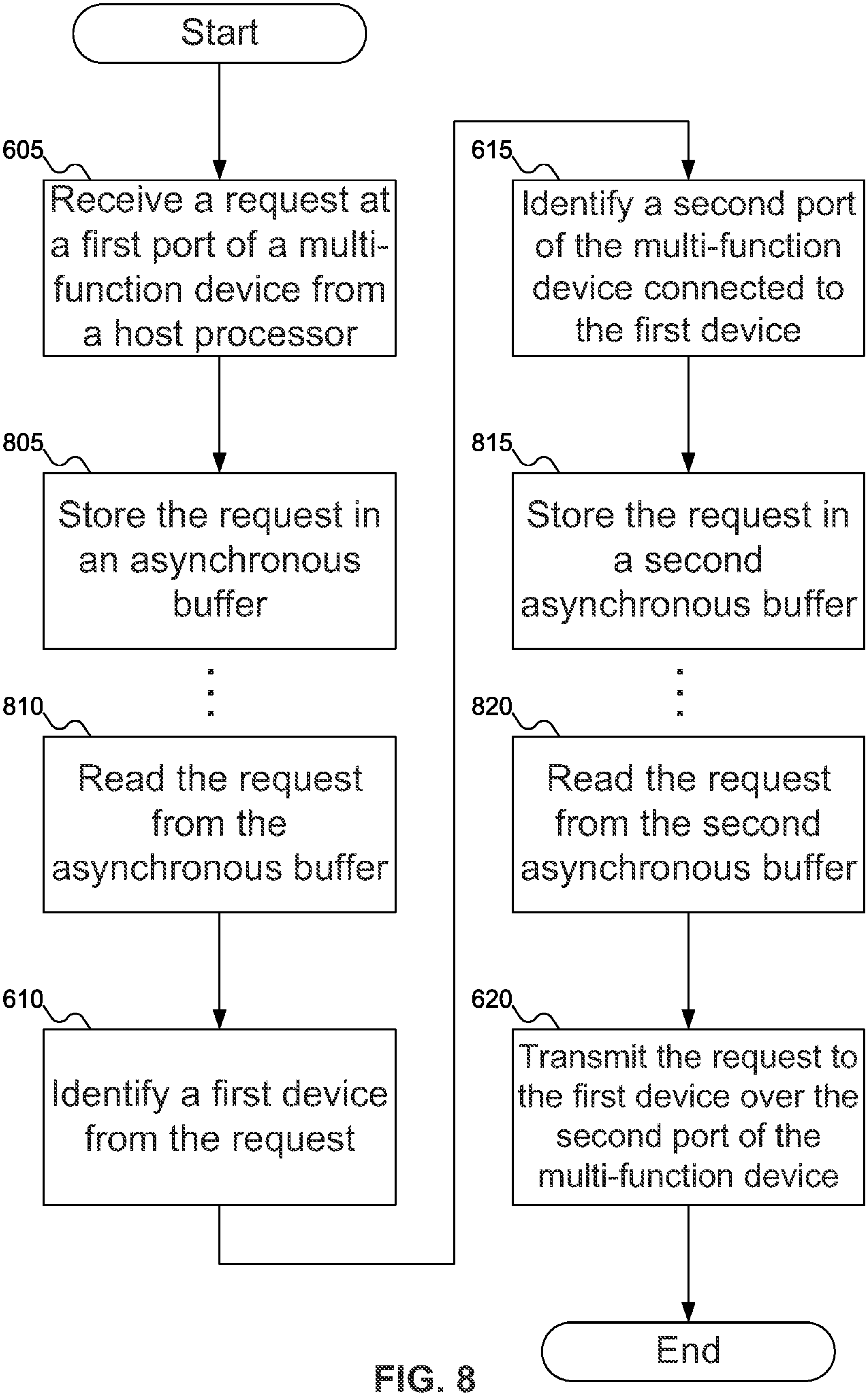
FIG. 8 shows a flowchart of an example procedure for using the asynchronous buffers of FIG. 3, according to embodiments of the disclosure.

FIG. 8 shows a flowchart of an example procedure for using the asynchronous buffers of FIG. 3, according to embodiments of the disclosure. In FIG. 8, at block 605, multi-function device 135 of FIG. 1 may receive a request at port 310 of FIG. 3. Block 605 uses the same identifier as block 605 of FIG. 6 as the operations described are the same. At block 805, multi-function device 135 of FIG. 1 may store the request in asynchronous buffer 325 of FIG. 3.

At block 810, at some later time, multiplexer/demultiplexer 330 of FIG. 3 may read the request from asynchronous buffer 325 of FIG. 3. At block 610, multiplexer/demultiplexer 330 of FIG. 3 may identify a device from the request. At block 615, multiplexer/demultiplexer 330 of FIG. 3 may identify port 355 of FIG. 3 or port 360 of FIG. 3 as being connected to the device identified from the request. Blocks 610 and 615 use the same identifiers as blocks 610 and 615 of FIG. 6 as the operations described are the same. At block 815, bridge 335 of FIG. 3 or bridge 340 of FIG. 3 may store the request in asynchronous buffer 345 of FIG. 3 or asynchronous buffer 350 of FIG. 3.

At block 820, at some later time, root port 355 of FIG. 3 may read the request from asynchronous buffer 345 of FIG. 3, or root port 360 of FIG. 3 may read the request from asynchronous buffer 350 of FIG. 3. At block 620, root port 355 of FIG. 3 or root port 360 of FIG. 3 may transmit the request to the device identified from the request. Block 620 uses the same identifier as block 620 of FIG. 6 as the operations described are the same.

Figure 9:
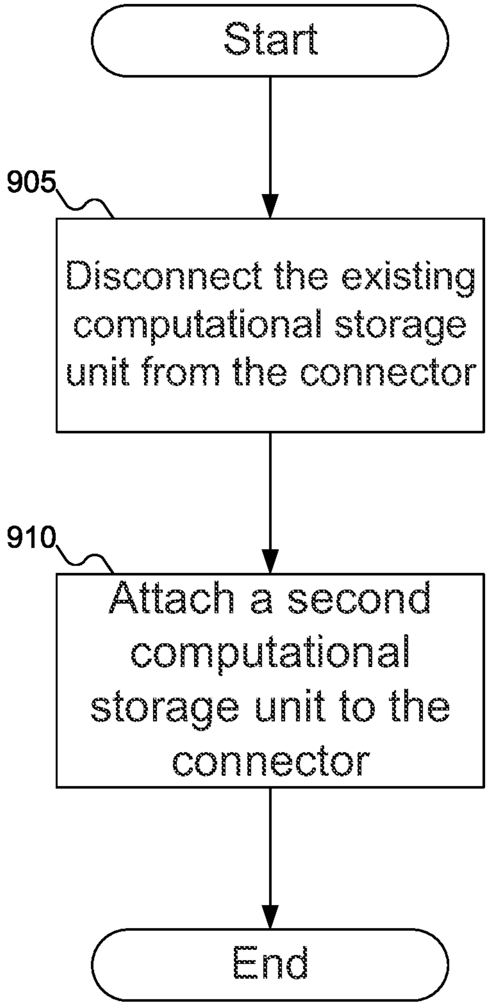
FIG. 9 shows a flowchart of an example procedure for replacing the computational storage unit of FIG. 1 with another computational storage unit, according to embodiments of the disclosure.

FIG. 9 shows a flowchart of an example procedure for replacing computational storage unit 140 of FIG. 1 with another computational storage unit, according to embodiments of the disclosure. At block 905, computational storage unit 140 of FIG. 1 may be disconnected from connector 320 of FIG. 3. At block 910, a new computational storage unit may be connected to connector 320 of FIG. 3.

Figure 10:
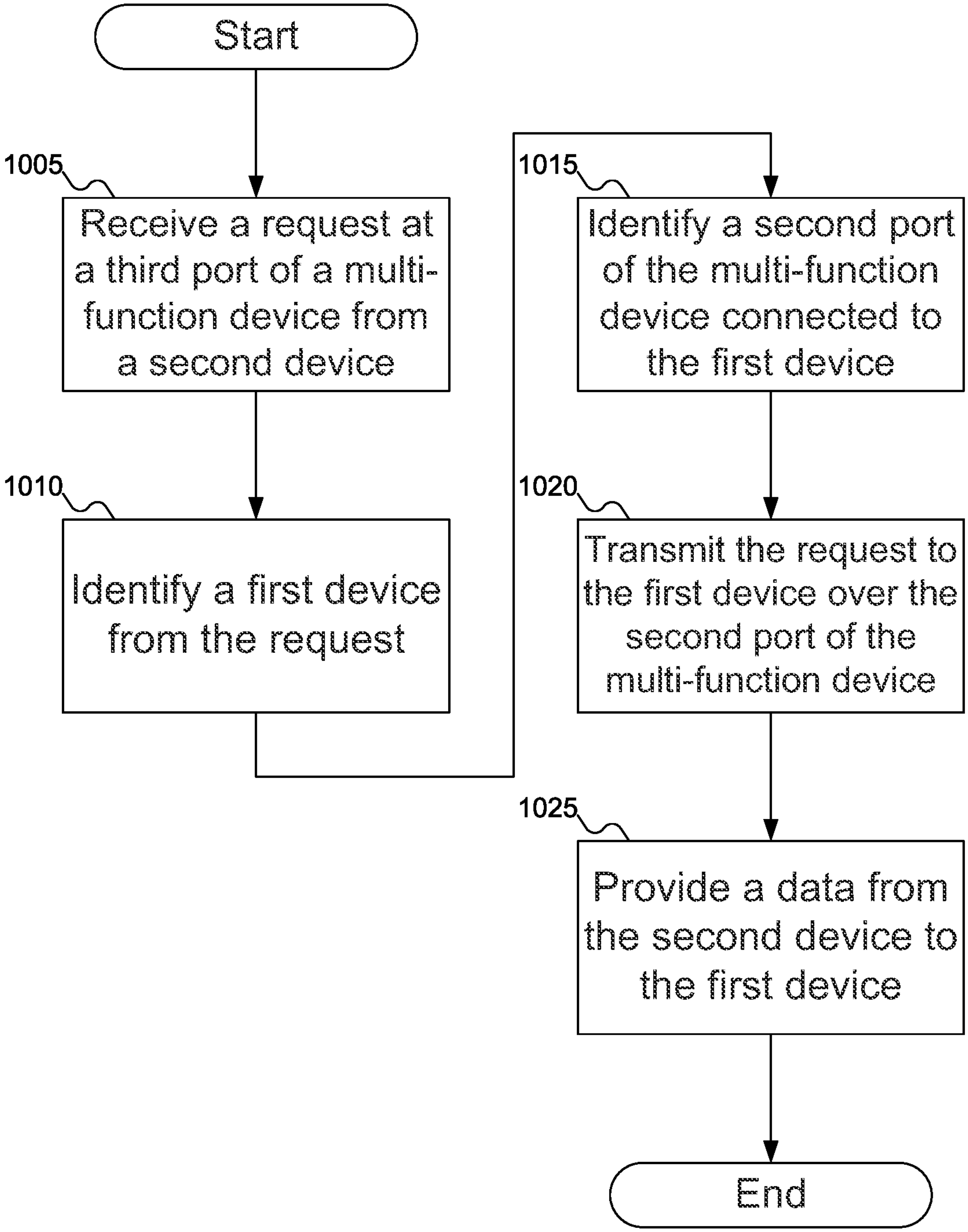
FIG. 10 shows a flowchart of an example procedure for using the multi-function device of FIG. 1 to deliver requests between devices attached to the multi-function device of FIG. 1, according to embodiments of the disclosure.

FIG. 10 shows a flowchart of an example procedure for using multi-function device 135 of FIG. 1 to deliver requests between devices attached to multi-function device 135 of FIG. 1, according to embodiments of the disclosure. At block 1005, multi-function device 135 of FIG. 1 may receive a request from a device connected to a port of multi-function device 135 of FIG. 1. Note that the device in question may be connected using port 355 of FIG. 3 or port 360 of FIG. 3, or other ports connected to other storage devices or computational storage units, rather than processor 110 of FIG. 1 connected to port 310 of FIG. 3. At block 1010, At block 1010, bridge 335 of FIG. 3 or bridge 340 of FIG. 3 may identify a device from the request. At block 1015, bridge 335 of FIG. 3 or bridge 340 of FIG. 3 may identify port 355 of FIG. 3 or port 360 of FIG. 3 as being connected to the device identified from the request. At block 1020, bridge 335 of FIG. 3 or bridge 340 of FIG. 3 may transmit the request to the device identified from the request. Finally, at block 1025, the device that sent the original request may provide data to the device identified in the request.

Figure 11A:
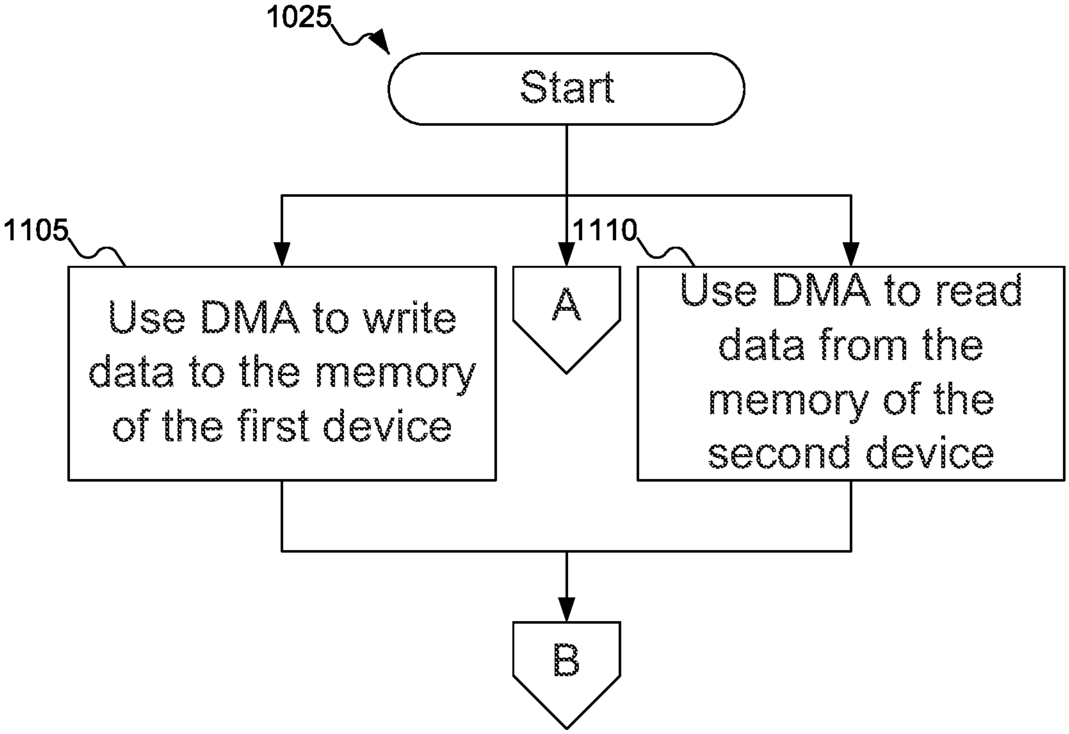
FIG. 11A shows a flowchart of an example procedure for devices attached to the multi-function device of FIG. 1 to share data, according to embodiments of the disclosure.
Figure 11B:
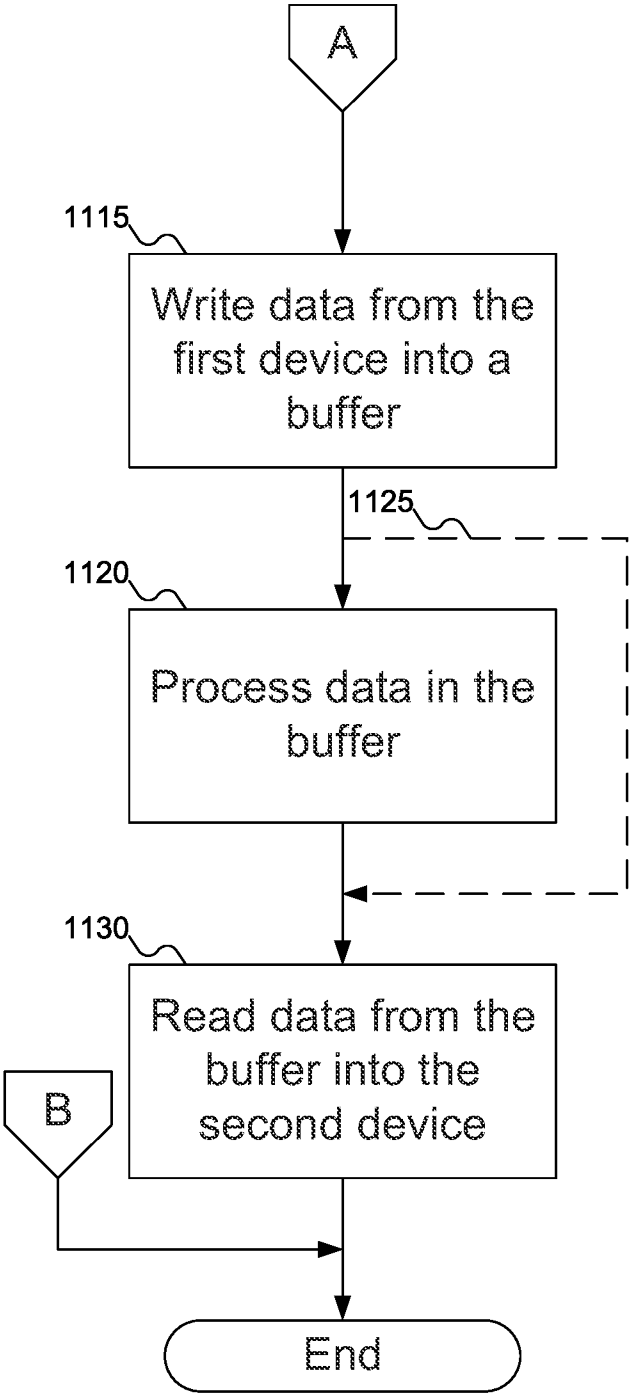
FIG. 11B continues the flowchart of FIG. 11A of the example procedure for devices attached to the multi-function device of FIG. 1 to share data, according to embodiments of the disclosure.

FIGS. 11A-11B show a flowchart of an example procedure for devices attached to multi-function device 135 of FIG. 1 to share data, according to embodiments of the disclosure. In FIG. 11A, at block 1105, one device may use DMA 440 of FIG. 4 or DMA 550 of FIGS. 5A-5D to write data to memory 435 of FIG. 4 or memory 545 of FIGS. 5A-5D. Alternatively, at block 1110, one device may use DMA 440 of FIG. 4 or DMA 550 of FIGS. 5A-5D to read data from memory 435 of FIG. 4 or memory 545 of FIGS. 5A-5D.

Alternatively, at block 1115 (FIG. 11B), one device may write data into buffer 370 of FIG. 3. At block 1120, data processor 375 of FIG. 3 may process the data in buffer 370 of FIG. 3, perhaps to put the data in a format that may be processed by the other device. Note that block 1120 is optional, as shown by dashed line 1125. Finally, at block 1130, the second device may read the data from buffer 370 of FIG. 3.

Figure 12:
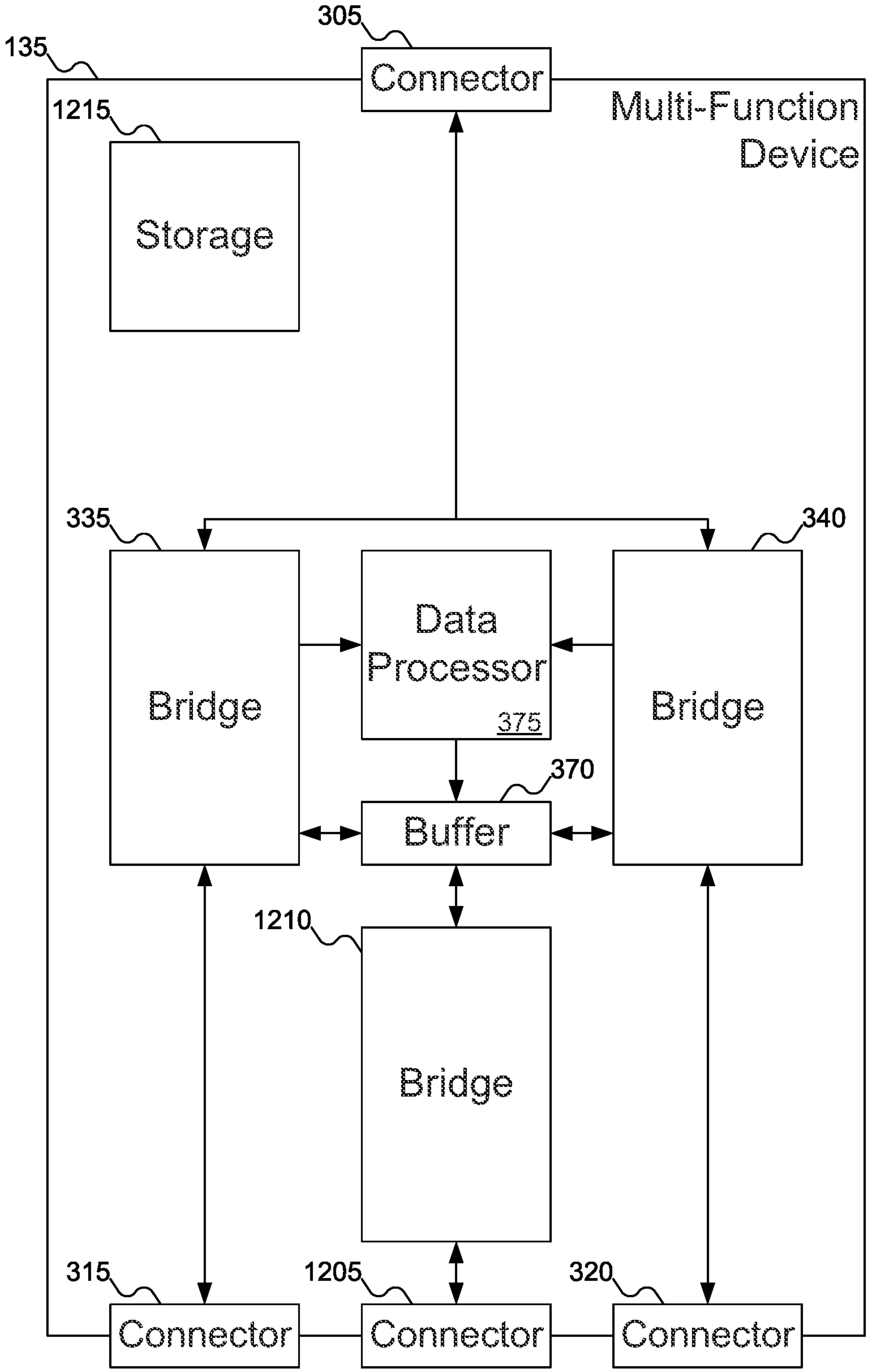
FIG. 12 shows another embodiment of the multi-function device of FIG. 1, according to embodiments of the disclosure.
Figure 14:
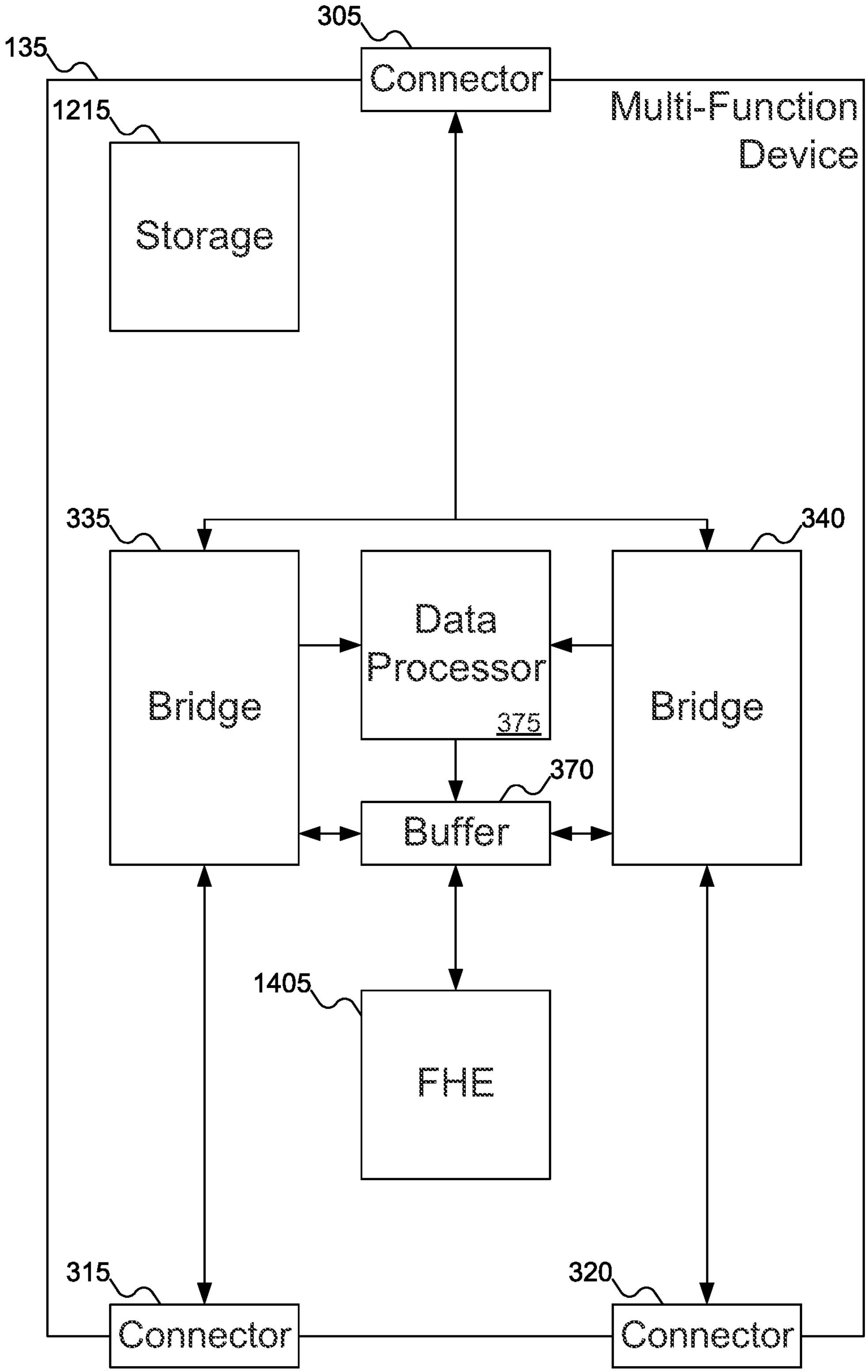
FIG. 14 shows yet another embodiment of the multi-function device of FIG. 1, according to embodiments of the disclosure.

As discussed above with reference to FIG. 3, some embodiments of the disclosure may support connecting more than two devices to multi-function device 135 of FIG. 1. FIGS. 12 and 14 illustrate some potential embodiments of the disclosure with more than two connected devices.

In FIG. 12, as with FIG. 3, multi-function device 135 may include connectors 305, 315, and 320 for connecting multi-function device 135 to processor 110, storage device 120, and computational storage unit 140 of FIG. 1. (FIG. 12 omits endpoint 310, asynchronous buffers 325, 345, and 350, multiplexers 330 and 365, and root ports 355 and 360: subsets or all of these components may be included in some embodiments of the disclosure, but may be omitted in other embodiments of the disclosure as shown.) Multi-function device 135 may also include connector 1205, which may be connected to bridge 1210. Bridge 1210 may function similarly to bridges 335 and 340: bridge 1210 may deliver a request, message, or data to a device connected to multi-function device 135 via connector 1205. This device may be another storage device, another computational storage unit (as a particular example, an FHE circuit), or any other type of device that may be supported using multi-function device 135.

FIG. 12 does not show connections between bridge 1210 and connector 305, bridges 335 and 340, or data processor 375. The omission of these lines for communication is not intended to suggest that bridge 1210 is not in communication with these components: rather, these lines have been left out of FIG. 12 for clarity. It may be understood that bridge 1210 may communicate with connector 305, bridges 335 and 340, and data processor 375 in a manner similar to bridges 335 and 340.

In embodiments of the disclosure where multi-function device 135 supports only two devices, which may be storage device 120 of FIG. 1 and computational storage unit 140 of FIG. 1, buffer 370 may effectively be a temporary storage used to pass data between the devices. For example, storage device 120 of FIG. 1 may write data into buffer 370, which computational storage unit 140 of FIG. 1 may then read and process. But in embodiments of the disclosure such as are shown in FIG. 12, when multi-function device 135 supports the use of multiple devices—be they storage devices or computational storage units—accessing buffer 370, buffer 370 might be used as a shared memory rather than as a buffer to shuttle data between two devices. That is, data may reside in buffer 370 while the various devices may access the data from buffer 370. For example, storage device 120 of FIG. 1 might copy data into buffer 370, which computational storage unit 140 of FIG. 1 may then process and overwrite with new data, which may then be processed by yet another computational storage unit 140 of FIG. 1.

As a particular example, consider a situation where storage device 120 of FIG. 1 stores video data that is encoded using a particular encoding, one computational storage unit 140 of FIG. 1 connected to multi-function device 135 is a TPU or GPU to perform object detection on the video data, and another computational storage unit 140 of FIG. 1 is a video processing unit (VPU) to perform video decoding. When host processor 110 of FIG. 1 asks the TPU or GPU to perform video decoding, the TPU or GPU may ask storage device 120 of FIG. 1 to transfer the data to buffer 370, and then ask the VPU to perform video decoding so that the TPU or GPU can then perform the object detection on the video data. The data may remain in place in buffer 370 for both video decoding and object detection by the TPU or GPU and the VPU.

There are some other points worth noting about this example, which generalize to embodiments of the disclosure. First, as noted above, rather than being used as a transit buffer, buffer 370 may be used as a shared memory, with storage device 120 of FIG. 1 and the TPU or GPU and the VPU all accessing buffer 370. In the above example, storage device 120, the VPU, and the TPU or GPU each access data from buffer 370 in turn, performing their operations before the next device takes over. But more generally, embodiments of the disclosure may permit any subset of devices, or all devices, connected to multi-function device 135 to access data from buffer 370 in either a choreographed manner or simultaneously (for example, if different devices are accessing different data and there is no concern about what one device does affecting data used by another device, two or more devices might access data from buffer 370 simultaneously).

Second, note that in the example host processor 110 of FIG. 1 only asks the TPU or GPU to perform object detection, and the TPU or GPU issues requests to storage device 120 of FIG. 1 and to the VPU to carry out their functions. In other words, one controller attached to multi-function device 135 may issue requests to another controller attached to multi-function device 135: not all requests necessarily issue from processor 110 of FIG. 1. In other words, host processor 110 of FIG. 1 does not need to orchestrate or manage the operations of multiple devices connected to multi-function device 135: the devices themselves may trigger functions of each other.

Third, host processor 110 of FIG. 1 does not need to know that the VPU is connected to multi-function device 135. Put another way, host processor 110 of FIG. 1 is only concerned with the object detection being done: host processor 110 of FIG. 1 is not concerned with what additional processes may need to be performed to complete the desired operation. Host processor 110 of FIG. 1 may remain agnostic to the fact that controllers of other devices may be handling specific operations requested by host processor 110 of FIG. 1.

An advantage of having one controller issue requests to another controller, and that host processor 110 of FIG. 1 may be unaware that a particular controller is connected to multi-function device 135, is that some controllers may be hidden from host processor 110 of FIG. 1. Continuing the above example, multi-function device 135 might not even inform host processor 110 of FIG. 1 that the VPU is connected to multi-function device.

To achieve this result, multi-function device 135 may enumerate the various devices attached to multi-function device 135 and determine how the devices are configured. Each device's configuration may specify what functions the device offers, and which devices/controllers are to be exposed to host processor 110 of FIG. 1. This information may be stored in a list of device configurations, which may be stored in storage 1215, and which multi-function device 135 may use to selectively expose or hide the various devices/controllers from host processor 110 of FIG. 1.

In some embodiments of the disclosure, multi-function device 135 may notify storage device 120 of FIG. 1 or computational storage unit 140 of FIG. 1 about the devices connected to multi-function device 135 via connectors 315, 320, and 1215. For example, multi-function device 135 may enumerate all attached devices and may provide information (such as all exposed functions) about all attached devices to all attached devices. In other embodiments of the disclosure, multi-function device 135 may inform the attached devices about devices, but using the devices' configurations. In such embodiments of the disclosure, a device may specify whether each of its functions (or even the device as a whole) should be reported to other devices or not. In some embodiments of the disclosure, devices may not only specify whether their functions (or the devices themselves) are exposed to or hidden from other devices, but may even do so selectively, letting some devices know about the device's functions and hiding that functionality from other devices.

Figure 13:
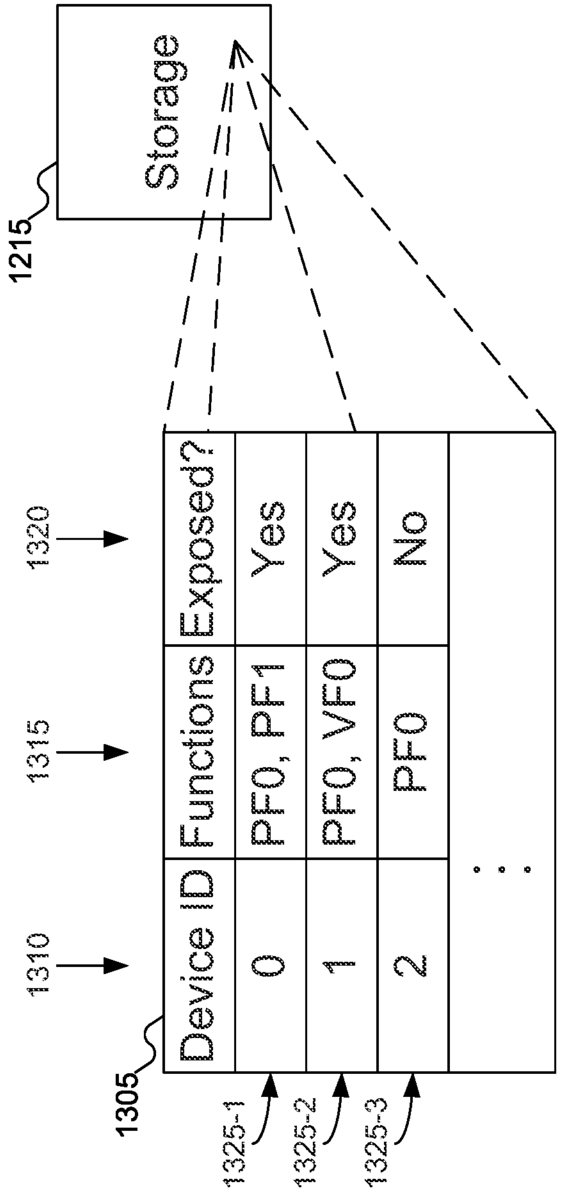
FIG. 13 shows details of a list of device configurations that may be used by the multi-function device of FIG. 1, according to embodiments of the disclosure.

FIG. 13 shows details of a list of device configurations that may be used by multi-function device 135 of FIG. 1, according to embodiments of the disclosure. In FIG. 13, storage 1215 is shown as including list of device configurations 1305. List of device configurations 1305 may include various columns, such as device identifier 1310, functions 1315, and indicator 1320 indicating whether the device/controller is exposed to host processor 110 of FIG. 1 or not. List of device configurations 1305 may also include entries, such as entries 1325-1, 1325-2, and 1325-3 (entries 1325-1 through 1325-3 may be referred to collectively as entries 1325). Each entry 1325 may identify a particular device, list the functions exposed by that device, and indicate whether the device/controller is to be exposed to host processor 110 of FIG. 1. For example, entry 1325-1 indicates that the device with identifier 0 exposes two physical functions and is to be exposed to host processor 110 of FIG. 1, entry 1325-2 indicates that the device with identifier 1 exposes one physical function and one virtual function and is to be exposed to host processor 110 of FIG. 1, and entry 1325-3 indicates that the device with identifier 2 exposes one physical function and is to be hidden from host processor 110 of FIG. 1. Multi-function device 135 of FIG. 1 may use this information to expose appropriate functions to host processor 110 of FIG. 1.

While FIG. 13 shows three entries 1325 in list of device configurations 1305, embodiments of the disclosure may include any number (one or more) of entries 1325. In addition, list of device configurations 1305 may include configurations for devices not currently attached to multi-function device 135 of FIG. 1. That is, entries 1325 may include information about devices that were connected to multi-function device 135 of FIG. 1 at one point, but are not currently connected. Such entries 1325 may be kept in case the devices in question are later connected again to multi-function device 135 of FIG. 1, avoiding the need to interrogate anew the device for its configuration.

Each function 1315 listed in entries 1325 may represent a different capability offered by the identified device. For example, consider storage device 120 of FIG. 1, but with a built-in computational storage unit. Storage device 120 of FIG. 1 might expose two functions: one to initiate reading data from or writing data to storage device 120 of FIG. 1, and another to access the built-in computational storage unit. To avoid confusion between how a particular function offered by the device is triggered and the fact that the device may expose a "function" to trigger that functionality, any reference to a "capability" of a device is intended to mean the functionality the device offers rather than the "function" that triggers that functionality.

As shown in list of device configurations 1305, different devices may offer different numbers of functions. For example, entries 1325-1 and 1325-2 show devices with two functions expose, whereas entry 1325-3 shows a device with only one function exposed. Embodiments of the disclosure may include any number (one or more) of devices, each with any number (one or more) of functions exposed by the device.

In referring to physical and virtual functions in column 1315, list of device configurations 1305 implies that the devices are PCIe devices. In some embodiments of the disclosure, PCIe busses and functions may be used. But embodiments of the disclosure may also use architectures other than PCIe, and may use other mechanisms to enable host processor 110 of FIG. 1 (or other controllers) to trigger operations within various devices. Embodiments of the disclosure are intended to cover all such variations, regardless of the particular nomenclature.

In FIG. 13, indicator 1320 suggests that the entire device is either exposed to host processor 110 of FIG. 1 or hidden from host processor 110 of FIG. 1. In some embodiments of the disclosure, the entire device may be exposed to or hidden from host processor 110 of FIG. 1. But in other embodiments of the disclosure, different functions of the device may be selectively exposed or hidden from host processor 110 of FIG. 1. For example, storage device 120 of FIG. 1 might include a compression circuit that may function as a computational storage unit built into storage device 120 of FIG. 1. Requests to read data from or write data to storage device 120 of FIG. 1 might automatically trigger compression/decompression of the data, and so the compression circuit might be hidden from host processor 110 of FIG. 1. But other computational storage units might benefit from accessing the compression circuit of storage device 120 of FIG. 1 for other reasons, and so that functionality might be made available to the other devices even if not exposed to host processor 110 of FIG. 1. To support function-selective exposure to host processor 110 of FIG. 1, list of device configurations 1305 might include separate entries 1325 for each device/function combination (to separately indicate which functions are exposed or hidden), or might subdivide just functions 1315 and indicator 1320, but still grouped in a single entry 1325 for a single device.

It may be noted that functions 1315 shows three different functions identified as physical function 0: one for each device 1310. In some embodiments of the disclosure, each device may list its functions starting at function 0. When devices are directly accessed by host processor 110 of FIG. 1, there is no confusion regarding which function is being invoked: only the functions exposed by that device are considered and each function is typically uniquely identified. But when multi-function device 135 of FIG. 1 acts like a single device including the functionality of multiple devices, multi-function device 135 of FIG. 1 should not expose multiple functions all identified as "function 0": host processor 110 of FIG. 1 may not know which function triggers the desired functionality, and/or multi-function device 135 of FIG. 1 may not know which capability host processor 110 of FIG. 1 intended to trigger.

To resolve this concern, multi-function device 135 of FIG. 1 may expose unit function identifiers, and may internally map the functions exposed by multi-function device 135 of FIG. 1 to the functions exposed by the individual devices. For example, assuming that entries 1325-1, 1325-2, and 1325-3 all represent devices attached to multi-function device 135 of FIG. 1, multi-function device 135 may expose four functions to host processor 110 of FIG. 1: these four functions may map, respectively, to physical function 0 of device 0, physical function 1 of device 0, physical function 0 of device 1, and virtual function 0 of device 1. These functions may be assigned any desired function identifiers: in some embodiments of the disclosure such functions exposed by multi-function device 135 of FIG. 1 to host processor 110 of FIG. 1 may be assigned sequential numbers starting at 0. Thus, the functions managed by multi-function device 135 of FIG. 1 may map to the various device functions as shown in Table 2 below.

TABLE 2

| Function mapping | | |
|---|---|---|
| Device ID | Function ID | MFD function ID |
| 0 | PF 0 | PF 0 |
| 0 | PF 1 | PF 1 |
| 1 | PF 0 | PF 2 |
| 1 | VF 0 | PF 3 |
| 2 | PF 0 | PF 4 |

Thus, when multi-function device 135 of FIG. 1 receives a request involving, for example, its exposed function 3, multi-function device 135 of FIG. 1 may translate that request to trigger virtual function 0 of device ID 1, and may pass the request along to the appropriate bridge 335 or 340 of FIG. 3, or to bridge 1210 of FIG. 12. Note that in some embodiments of the disclosure, rather than translating the request itself, multi-function device 135 of FIG. 1 may leave it to bridges 335 or 340 of FIG. 3 or bridge 1210 of FIG. 12 to handle the mapping to the appropriate function of the device. Put another way, multi-function device 135 of FIG. 1 may determine which device includes the function host processor 110 of FIG. 1 intended to trigger, identify bridge 335 or 340 of FIG. 3 or bridge 1210 of FIG. 12 that leads to that device, and pass the request to that bridge, which may then map the function identified in the request appropriately.

Note that since device 2 is not exposed to host processor 110 of FIG. 1, multi-function device 135 of FIG. 1 need not expose a function to host processor 110 of FIG. 1 corresponding to physical function 0 of device 2, although such a function may be exposed to the other devices attached to multi-function device 135 of FIG. 1.

In some embodiments of the disclosure, the mapping of Table 2 may be used with requests received at multi-function device 135 from any source, be it a device "above" multi-function device 135 (such as host processor 110 of FIG. 1) or a device "below" multi-function device 135 (such as storage device 120 of FIG. 1 and/or computational storage unit 140 of FIG. 1). Put another way, the mapping of Table 2 may be used for any request, regardless of where the request originated. (In this context, "above" and "below" may be in the hierarchy of devices relative to, for example, host processor 110 of FIG. 1: host processor 110 of FIG. 1, along with any other devices that that are between host processor 110 of FIG. 1 and multi-function device 135, may be considered "above" multi-function device 135, whereas any devices that communicate with host processor 110 of FIG. 1 through multi-function device 135 may be considered "below" multi-function device 135.) In other embodiments of the disclosure, as the devices connected to multi-function device 135 may be aware of each other and may know what functions they each expose (to the extent the devices permit other devices to see them or their functions), devices connected to multi-function device 135 may use device identifiers and function identifiers exposed by the devices, rather than the functions exposed by multi-function device 135.

Storage 1215 may be any variety of storage. For example, storage 1215 may be a volatile storage, such as DRAM, or a non-volatile storage, such as flash memory. Some embodiments of the disclosure may use list of device configurations 1305 of FIG. 13 to determine what devices/controllers to expose to host processor 110 of FIG. 1: in such embodiments, multi-function device 135 may enumerate the attached devices to determine that all attached devices have configurations stored in list of device configurations 1305 of FIG. 13, and may then use the device configurations from list of device configurations 1305 of FIG. 13 to determine what devices/controllers to expose to host processor 110 of FIG. 1.

The fact that a particular device/controller might be hidden from host processor 110 of FIG. 1 should not be understood to suggest that the device/controller may not be exposed to host processor 110 of FIG. 1. In other words, multi-function device 135 of FIG. 1 may be capable of exposing the device/controller to host processor 110 of FIG. 1, but might choose to hide the device/controller because the device configuration indicates that the device/controller should be hidden from host processor 110 of FIG. 1.

FIG. 14 shows yet another embodiment of multi-function device 135 of FIG. 1, according to embodiments of the disclosure. In FIG. 14, multi-function device 135 is similar to multi-function device 135 as shown in FIG. 3. But multi-function device 135 of FIG. 14 also includes FHE circuit 1405. In FIG. 14, FHE circuit 1405 may be integrated into multi-function device 135. That is, instead of being connected to multi-function device via a connector, such as connectors 315 or 320, or connector 1205 of FIG. 12, FHE circuit 1405 may be implemented as part of multi-function device 135. By integrating FHE circuit 1405 with multi-function device 135, requests sent to FHE circuit 1405 may be handled more quickly. Multi-function device 135 may expose the functions of FHE circuit 1405 directly, so that the capabilities of FHE circuit 1405 may be triggered without need for mapping function identifiers. Integrating FHE circuit 1405 with multi-function device 135 also means that a bridge may be omitted: since communication with FHE circuit 1405 may be direct, FHE circuit 1405 may not need a bridge to handle communications with FHE circuit 1405. On the other hand, by integrating FHE circuit 1405 into multi-function device 135, FHE circuit 1405 might not be replaceable: if FHE circuit 1405 does not function correctly or is no longer needed, multi-function device 135 might need to be replaced entirely. FHE circuit 1405, like bridge 1210 of FIG. 12, may include connections to connector 305, bridges 335 and/or 340, and data processor 375, which are not shown for clarity in the drawing.

While FIG. 14 shows FHE circuit 1405 integrated into multi-function device 135, embodiments of the disclosure may include any desired computational storage unit (or even storage device) integrated into multi-function device 135. In addition, while FIG. 14 shows only one FHE circuit 1405 integrated into multi-function device 135, embodiments of the disclosure may integrate any number of devices into multi-function device 135, and the various devices integrated into multi-function device 135 may be the same or different devices. Finally, while FIG. 14 shows one connector 320 (and its corresponding bridge 340 and connections to connector 305, bridge 335, buffer 370, and data processor 375), embodiments of the disclosure may include any number (zero or more) devices attached to multi-function device 135 beyond connector 315 and FHE circuit 1405. In other words, multi-function device 135 might include only FHE circuit 1405 and one connector 315 for another device (such as storage device 120). But also, multi-function device might include two or more connectors 315 and 320 for connecting other devices like storage device 120 of FIG. 1 and computational storage unit 140 of FIG. 1 (meaning that multi-function device 135 might appear to include the functionalities of three or more devices).

Figure 15:
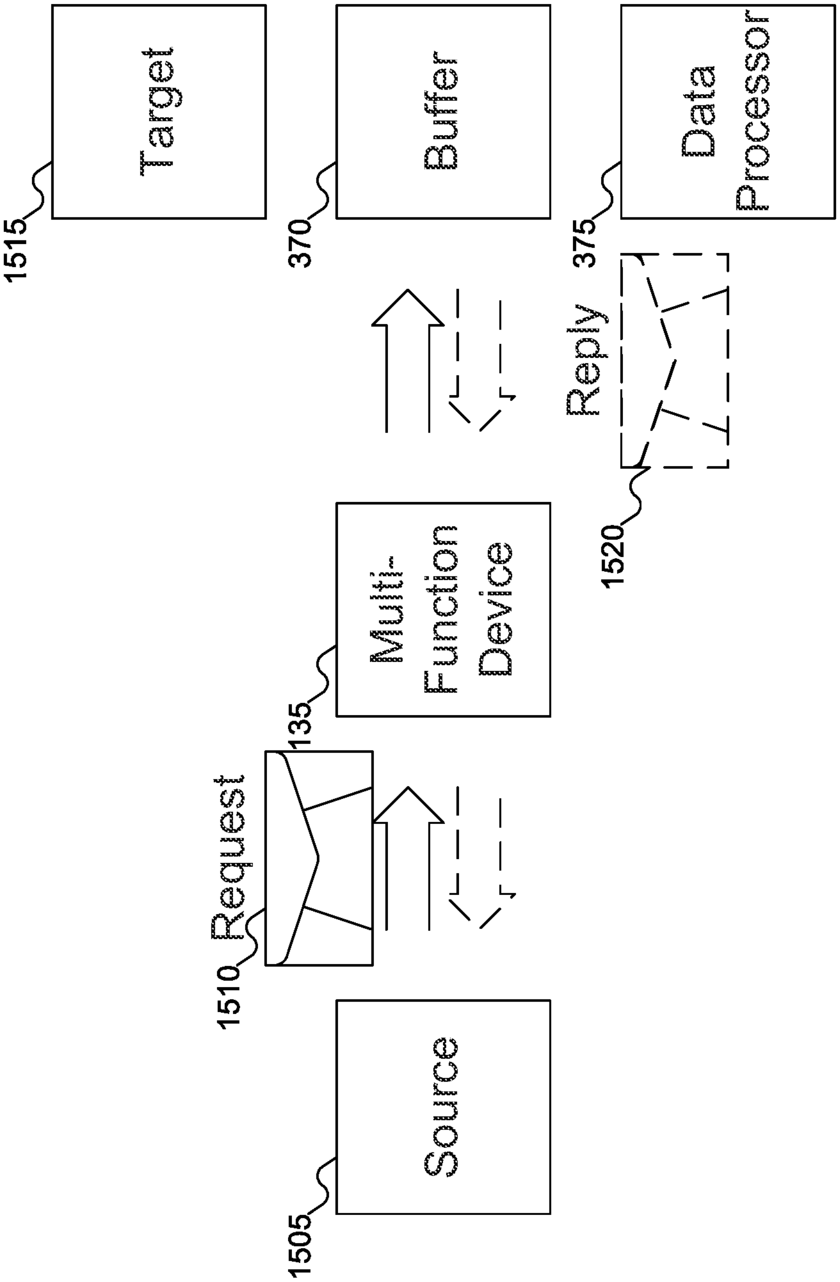
FIG. 15 shows the multi-function device of FIG. 1 receiving a request from a source and delivering the request to a target, according to embodiments of the disclosure.

FIG. 15 shows multi-function device 135 of FIG. 1 receiving a request from a source and delivering the request to a target, according to embodiments of the disclosure. As discussed above, multi-function device 135 may be connected to host processor 110 of FIG. 1 and to various devices, such as storage device 120 of FIG. 1 and/or computational storage unit 140 of FIG. 1. For purposes of FIG. 15, source 1505 may be any component connected to multi-function device 135 that may send request 1510. Source 1505 may therefore include host processor 110 of FIG. 1, storage device 120 of FIG. 1, or computational storage unit 140 of FIG. 1 (which may include, for example, FHE circuit 1405 of FIG. 14). In a similar manner, target 1515 may be any component to which source 1505 might send request 1510. Target 1515 therefore might also include host processor 110 of FIG. 1, storage device 120 of FIG. 1, or computational storage unit 140 of FIG. 1 (which may include, for example, FHE circuit 1405 of FIG. 14). But since source 1505 would send request 1510 to target 1515, source 1510 might need to know that target 1515 exists. Therefore, for example, if source 1510 is host processor 110 of FIG. 1, target 1515 might not include any device connected to multi-function device 135 that is hidden from host processor 110 of FIG. 1. (Note that since devices connected to multi-function device 135 are not necessarily hidden from each other, target 1515 being hidden from host processor 1505 does not necessarily mean that other sources might not be able to send request 1510 to target 1515.) For purposes of this discussion, target 1515 may include either the device itself or bridges 335 or 340 of FIG. 3 or bridge 1210 of FIG. 12 (since multi-function device 135 might deliver the request to bridges 335 or 340 of FIG. 3 or bridge 1210 of FIG. 12 rather than to the device itself), with bridges 335 or 340 of FIG. 3 or bridge 1210 of FIG. 12 handling the delivery to the device). In addition, target 1415 may also include data processor 375 (since host processor 110 of FIG. 1 and/or devices connected to multi-function device 135 might request that data processor 375 process data in buffer 370).

But in some situations, while source 1505 might send request 1510 to target 1515, multi-function device 135 (or bridges 335 or 340 of FIG. 3 or bridge 1210 of FIG. 12) might redirect the request to another destination. For example, as discussed above, the devices connected to multi-function device 135 might view buffer 370 as part of memory 115 of FIG. 1, and not be aware that buffer 370 exists as a component within multi-function device 135. But if multi-function device 135 (or bridges 335 or 340 of FIG. 3 or bridge 1210 of FIG. 12) determine that request 1510 involves accessing an address that is part of the address range of buffer 370, multi-function device 135 (or bridges 335 or 340 of FIG. 3 or bridge 1210 of FIG. 12) may redirect the request to buffer 370 instead (or may process request 1510 themselves using buffer 370), based on the address of request 1510 being in the address range associated with buffer 370.

In some embodiments of the disclosure, target 1515, buffer 370, or data processor 375 might send reply 1520 back to source 1505. In such situations, reply 1520 may be delivered back to source 1520 by multi-function device 135.

Note that target 1515 might send reply 1520 even if target 1515 is integrated into multi-function device 135 of FIG. 1. For example, FHE circuit 1405 of FIG. 14 might send reply 1520 to source 1505. The fact that FHE circuit 1405 of FIG. 14, or any other component, might be integrated into multi-function device 135 of FIG. 1 does not mean that source 1505 knows when target 1515 completes its operation.

Figure 16:
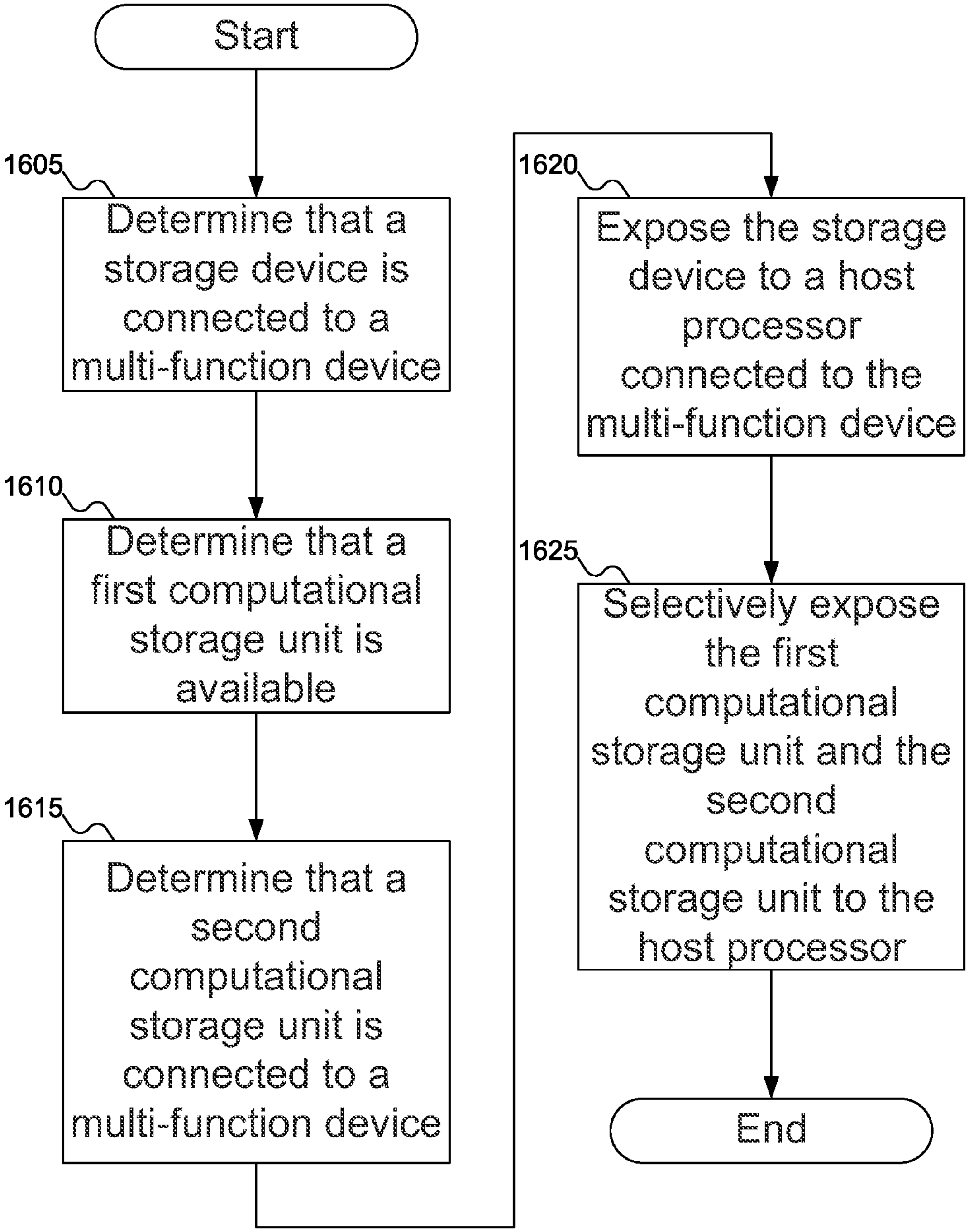
FIG. 16 shows a flowchart of an example procedure for exposing the devices attached to the multi-function device of FIG. 1 to the processor of FIG. 1, according to embodiments of the disclosure.

FIG. 16 shows a flowchart of an example procedure for exposing the devices attached to multi-function device 135 of FIG. 1 to the processor of FIG. 1, according to embodiments of the disclosure. In FIG. 16, at block 1605, multi-function device 135 of FIG. 1 may determine that storage device 120 of FIG. 1 is connected to multi-function device 135 of FIG. 1: for example, via connector 315 of FIG. 3. At block 1610, multi-function device 135 of FIG. 1 may determine that a first computational storage unit 140 of FIG. 1 is available. Note that in some embodiments of the disclosure, the first computational storage unit 140 of FIG. 1 may be FHE circuit 1405 of FIG. 14. At block 1615, multi-function device 135 of FIG. 1 may determine that a second computational storage unit 140 of FIG. 1 is connected to multi-function device 135 of FIG. 1: for example, via connector 320 of FIG. 3. Note that in some embodiments of the disclosure, the second computational storage unit 140 of FIG. 1 may be FHE circuit 1405 of FIG. 14.

At block 1620, multi-function device 135 of FIG. 1 may expose storage device 120 of FIG. 1 to host processor 110 of FIG. 1, which may also be connected to multi-function device 135 of FIG. 1: for example, via connector 305 of FIG. 3. At block 1625, multi-function device 135 of FIG. 1 may selectively expose the first and/or second computational storage units 140 of FIG. 1 to host processor 110 of FIG. 1. For example, configurations of either or both of computational storage units 140 of FIG. 1 may identify whether computational storage units 140 of FIG. 1 are to be exposed to host processor 110 of FIG. 1.

Figure 17:
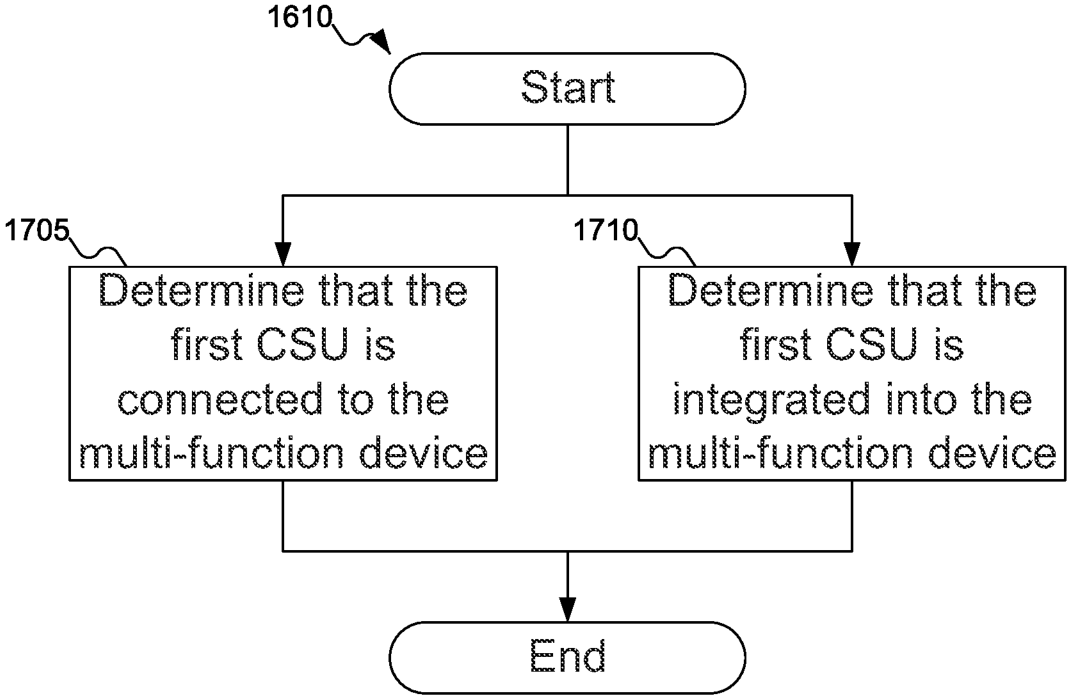
FIG. 17 shows a flowchart of an example procedure for the multi-function device of FIG. 1 to determine how a computational storage unit is available, according to embodiments of the disclosure.

FIG. 17 shows a flowchart of an example procedure for multi-function device 135 of FIG. 1 to determine how a computational storage unit is available, according to embodiments of the disclosure. At block 1705, multi-function device 135 of FIG. 1 may determine that computational storage unit 140 of FIG. 1 is connected to multi-function device 135 of FIG. 1: for example, via connector 320 of FIG. 3 or connector 1205 of FIG. 12. Alternatively, at block 1710, multi-function device 135 of FIG. 1 may determine that computational storage unit 140 of FIG. 1 is integrated into multi-function device 135 of FIG. 1: for example, like FHE circuit 1405 of FIG. 14. These determinations may be done in any desired manner: for example, host processor 110 of FIG. 1 may identify itself to multi-function device 135 of FIG. 1 when enumerating the devices attached to host processor 110 of FIG. 1, and multi-function device 135 of FIG. 1 may determine the devices attached to it by enumerating those devices.

Figure 18:
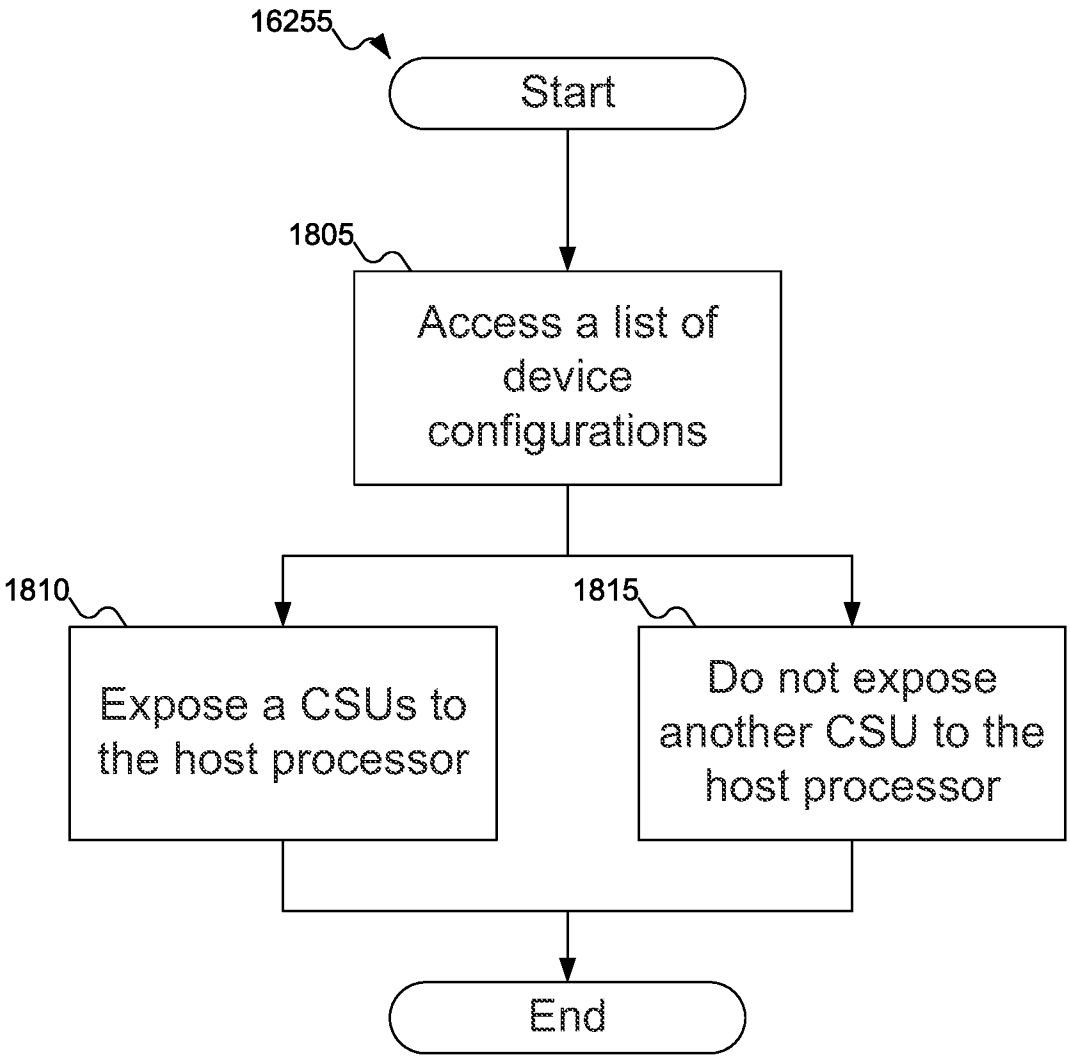
FIG. 18 shows a flowchart of an example procedure for the multi-function device of FIG. 1 to determine which devices to expose to the processor of FIG. 1, according to embodiments of the disclosure.

FIG. 18 shows a flowchart of an example procedure for multi-function device 135 of FIG. 1 to determine which devices to expose to the processor of FIG. 1, according to embodiments of the disclosure. At block 1805, multi-function device 135 of FIG. 1 may access list of device configurations 1305 of FIG. 13 from storage 1215 of FIG. 12. Multi-function device 135 of FIG. 1 may then identify entries 1325 of FIG. 13 that are for the devices connected to multi-function device 135 of FIG. 1. At block 1810, multi-function device 135 of FIG. 1 may expose a first computational storage unit 140 of FIG. 1 to host processor 110 of FIG. 1, whereas at block 1815, multi-function device 135 of FIG. 1 may not expose (i.e., hide) a second computational storage unit 140 of FIG. 1 to host processor 110 of FIG. 1. For example, whether computational storage units 140 of FIG. 1 are exposed to host processor 110 of FIG. 1 may be determined by the configurations of computational storage units 140 of FIG. 1.

While FIG. 18 suggests blocks 1810 and 1815 are alternatives, blocks 1810 and 1815 are alternatives only with respect to a single computational storage unit (or other device), as a device may be either exposed to host processor 110 of FIG. 1 or hidden from host processor 110 of FIG. 1. But whether one device is exposed to host processor 110 of FIG. 1 or hidden from host processor 110 of FIG. 1 may be independent of whether any other device is exposed to or hidden from host processor 110 of FIG. 1. Similarly, whether one device indicates that a particular function may be hidden from or exposed to other devices may be independent of whether any other device decides to hide or expose its functions.

Figure 19:
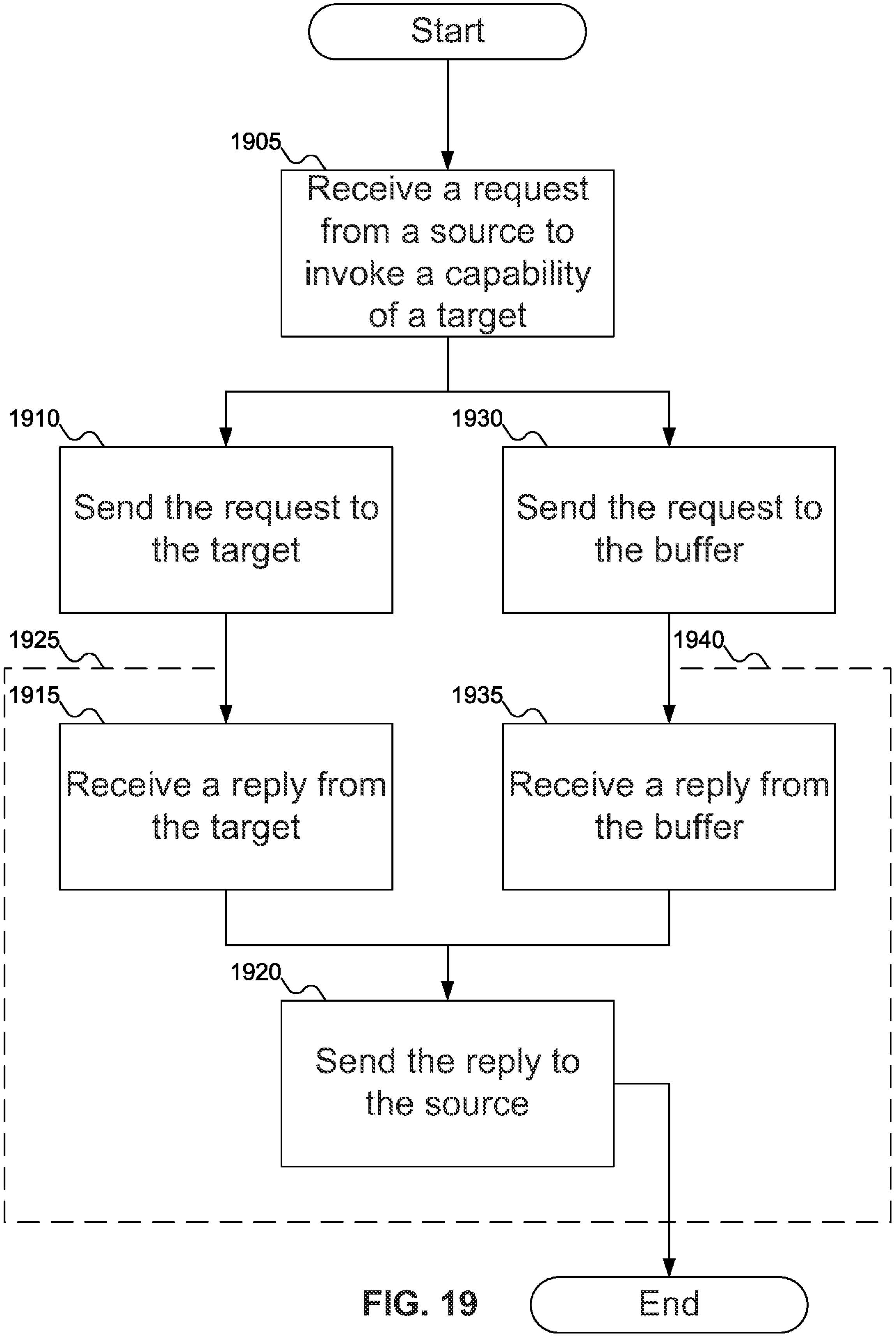
FIG. 19 shows a flowchart of an example procedure for the multi-function device of FIG. 1 to deliver messages between connected devices, according to embodiments of the disclosure.

FIG. 19 shows a flowchart of an example procedure for multi-function device 135 of FIG. 1 to deliver messages between connected devices, according to embodiments of the disclosure. In FIG. 19, at block 1905, multi-function device 135 of FIG. 1 may receive request 1510 of FIG. 15 from source 1505 of FIG. 1. Source 1505 of FIG. 15 may be host processor 110 of FIG. 1, storage device 120 of FIG. 1, computational storage unit 140 of FIG. 1, data processor 375 of FIG. 3, FHE circuit 1405 of FIG. 14, or any other device that may be integrated with or connected to multi-function device 135 of FIG. 1. At block 1910, multi-function device 135 of FIG. 1 may send request 1510 of FIG. 15 to target 1515 of FIG. 15. Target 1515 of FIG. 15 may be host processor 110 of FIG. 1, storage device 120 of FIG. 1, computational storage unit 140 of FIG. 1, data processor 375 of FIG. 3, FHE circuit 1405 of FIG. 14, or any other device that may be integrated with or connected to multi-function device 135 of FIG. 1, with the proviso that source 1505 of FIG. 15 knows that target 1515 of FIG. 15 exists. So, for example, if source 1505 of FIG. 15 is host processor 110 of FIG. 1, target 1515 of FIG. 15 may be storage device 120 of FIG. 1, computational storage unit 140 of FIG. 1, data processor 375 of FIG. 3, or FHE circuit 1405 of FIG. 14 that was exposed to host processor 110 of FIG. 1 (in other words, target 1515 of FIG. 13 might not be a device that has been hidden from host processor 110 of FIG. 1).

At block 1915, multi-function device 135 of FIG. 1 may receive reply 1520 of FIG. 15 from target 1515 of FIG. 15. In that case, at block 1920, multi-function device 135 of FIG. 1 may send reply 1520 of FIG. 15 to source 1505 of FIG. 15. In situations where target 1515 of FIG. 15 does not send reply 1520 of FIG. 15, blocks 1910 and 1915 may be omitted, as shown by dashed line 1925.

While request 1510 of FIG. 15 might be sent to target 1515 of FIG. 15, in some situations request 1510 of FIG. 15 might involve reading, writing, or otherwise manipulating data in buffer 370 of FIG. 3. In such situations, request 1510 of FIG. 15 may be sent to buffer 370 of FIGS. 3, 12, and 14 instead of target 1515 of FIG. 15. Thus, at block 1930, request 1510 of FIG. 15 may be sent to buffer 370 of FIG. 3, and at block 1935 reply 1520 of FIG. 15 may be received from buffer 370 of FIG. 3, which may then be sent to source 1505 of FIG. 15 at block 1920. In situations where buffer 370 of FIG. 3 does not send reply 1520 of FIG. 15, blocks 1930 and 1935 may be omitted, as shown by dashed line 1940. Whether request 1510 of FIG. 15 is sent to target 1515 of FIG. 15 or buffer 370 of FIGS. 3, 12, and 14 may be determined based on data in request 1510 of FIG. 15: for example, an address associated with buffer 370 of FIGS. 3, 12, and 14.

Figure 20:
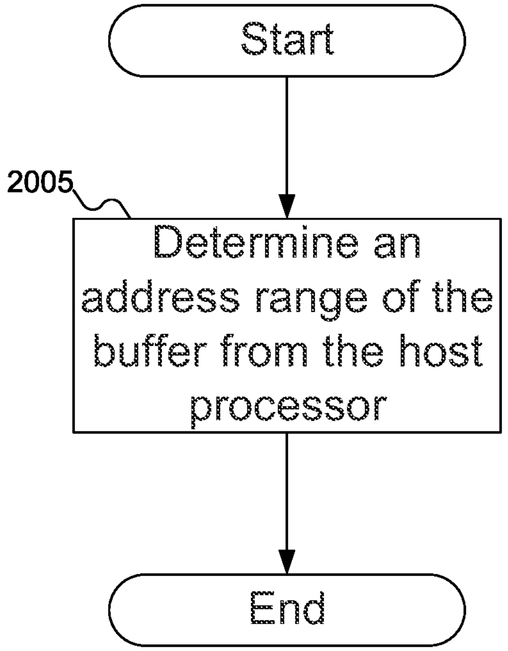
FIG. 20 shows a flowchart of an example procedure for the multi-function device of FIG. 1 to determine an address range of the buffer of FIGS. 3, 12, and 14 from the processor of FIG. 1, according to embodiments of the disclosure.

FIG. 20 shows a flowchart of an example procedure for multi-function device 135 of FIG. 1 to determine an address range of buffer 370 of FIGS. 3, 12, and 14 from the processor of FIG. 1, according to embodiments of the disclosure. At block 2005, host processor 110 of FIG. 1 may determine an address range for buffer 370 of FIGS. 3, 12, and 14, which may be provided to multi-function device 135 of FIG. 1. Multi-function device 135 of FIG. 1 may advertise to host processor 110 of FIG. 1 the capacity of buffer 370 of FIGS. 3, 12, and 14. So that host processor 110 of FIG. 1 may know how large an address range to assign to buffer 370 of FIGS. 3, 12, and 14.

Figure 21:
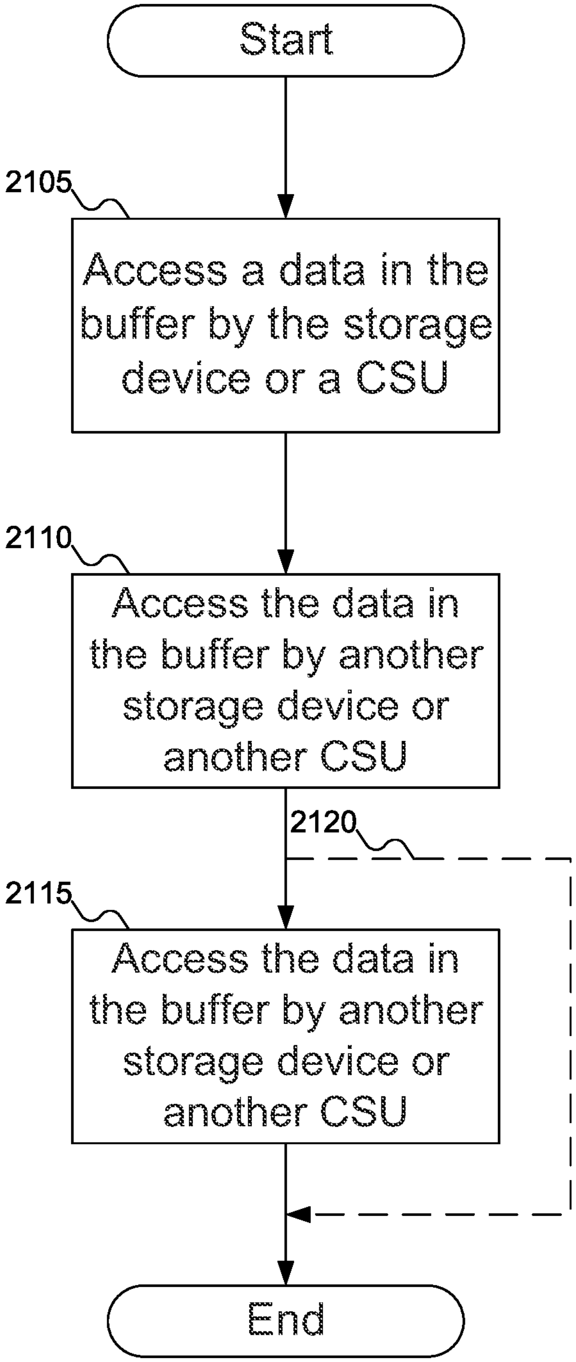
FIG. 21 shows a flowchart of an example procedure for the devices attached to the multi-function device of FIG. 1 to access data from the buffer of FIGS. 3, 12, and 14, according to embodiments of the disclosure.

FIG. 21 shows a flowchart of an example procedure for the devices attached to multi-function device 135 of FIG. 1 to access data from buffer 370 of FIGS. 3, 12, and 14, according to embodiments of the disclosure. In FIG. 21, at block 2105, a first storage device 120 of FIG. 1 or a first computational storage unit 140 of FIG. 1 (which may be, for example, FHE circuit 1405 of FIG. 14) may access data in buffer 370 of FIG. 3. At block 2110, a second storage device 120 of FIG. 1 or a second computational storage unit 140 of FIG. 1 (which may be, for example, FHE circuit 1405 of FIG. 14) may access data in buffer 370 of FIGS. 3, 12, and 14. At block 2115, a third storage device 120 of FIG. 1 or a third computational storage unit 140 of FIG. 1 (which may be, for example, FHE circuit 1405 of FIG. 14) may access data in buffer 370 of FIGS. 3, 12, and 14. If multi-function device 135 of FIG. 1 does not have third computational storage unit 140 of FIG. 1, then block 2115 may be omitted, as shown by dashed line 2120. Note that the device accessing data in buffer 370 of FIGS. 3, 12, and 14 in block 2110 may be the same type of device or a different type than the device accessing data in buffer 370 of FIGS. 3, 12, and 14 in block 2105. For example, storage device 120 of FIG. 1 might access buffer 370 of FIGS. 3, 12, and 14 in block 2105, whereas computational storage unit 140 of FIG. 1 might access buffer 370 of FIGS. 3, 12, and 14 in block 2110.

Figure 22:
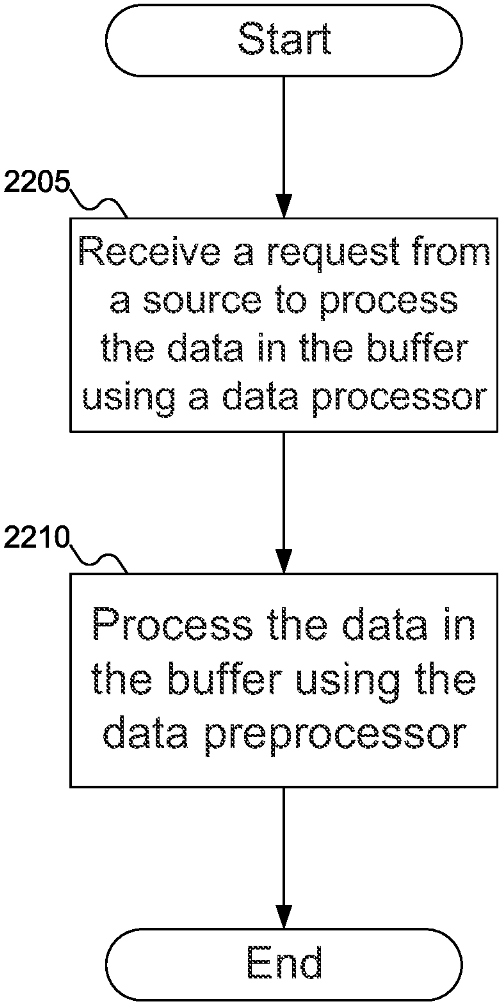
FIG. 22 shows a flowchart of an example procedure for the data processor of FIGS. 3, 12, and 14 to process data in the buffer of FIGS. 3, 12, and 14, according to embodiments of the disclosure.

FIG. 22 shows a flowchart of an example procedure for data processor 375 of FIGS. 3, 12, and 14 to process data in buffer 370 of FIGS. 3, 12, and 14, according to embodiments of the disclosure. In FIG. 22, at block 2205, data processor 375 of FIG. 3 may receive a request to process data in buffer 370 of FIG. 3. This request may be received from host processor 110 of FIG. 1, storage device 120 of FIG. 1, computational storage unit 140 of FIG. 1 (which may be, for example, FHE circuit 1405 of FIG. 3), or any other device connected to multi-function device 135 of FIG. 1. This request may trigger an exposed function of data processor 375 of FIG. 3, or may trigger a function of multi-function device 135 of FIG. 1 that may, in turn, trigger a function of data processor 375 of FIG. 3 (for example, via a mapping of the function exposed by multi-function device 135 of FIG. 1 to the function exposed by data processor 375 of FIG. 3). At block 2210, data processor 375 may process the data in buffer 370 of FIG. 3 as instructed.

Figure 23:
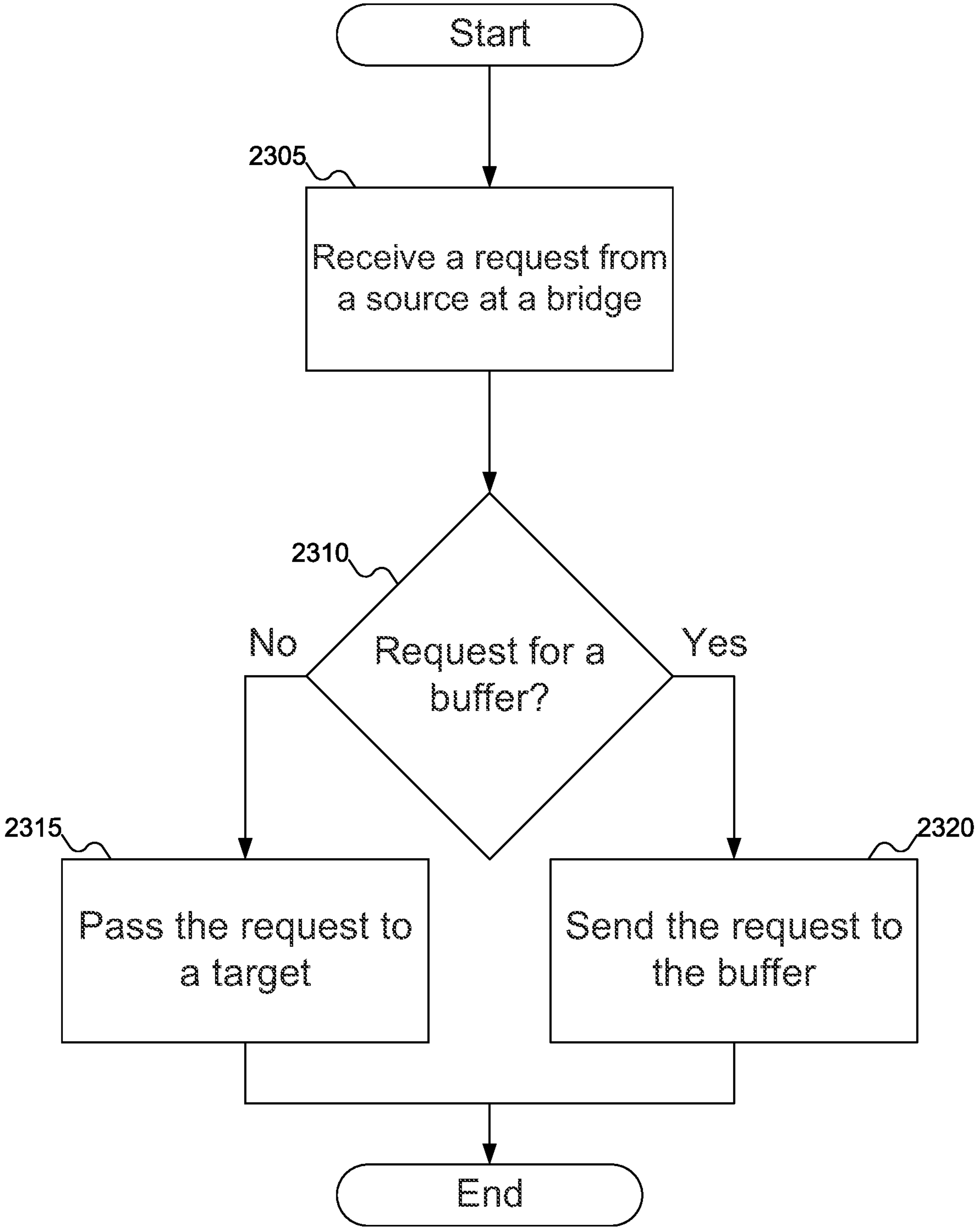
FIG. 23 shows a flowchart of an example procedure for the multi-function device of FIG. 1 to determine whether to deliver a request to a target device or to the buffer of FIGS. 3, 12, and 14, according to embodiments of the disclosure.

FIG. 23 shows a flowchart of an example procedure for multi-function device 135 of FIG. 1 to determine whether to deliver a request to target 1520 of FIG. 15 or to buffer 370 of FIGS. 3, 12, and 14, according to embodiments of the disclosure. In FIG. 23, at block 2305, multi-function device 135 of FIG. 1—more particularly, bridges 335 or 340 of FIG. 3 or bridge 1210 of FIG. 12—may receive request 1510 of FIG. 15. At block 2310, bridges 335 or 340 of FIG. 3 or bridge 1210 of FIG. 12 may determine if request 1510 of FIG. 15 should be directed to buffer 370 of FIG. 3: for example, if request 1510 of FIG. 15 includes an address in an address range associated with buffer 370 of FIG. 3. If request 1510 of FIG. 15 does not involve buffer 370 of FIG. 3, then at block 2315 bridges 335 or 340 of FIG. 3 or bridge 1210 of FIG. 12 may pass request 1510 of FIG. 15 to target 1515 of FIG. 15. Otherwise, at block 2320, bridges 335 or 340 of FIG. 3 or bridge 1210 of FIG. 12 may pass request 1510 of FIG. 15 to buffer 370 of FIG. 3.

Figure 24:
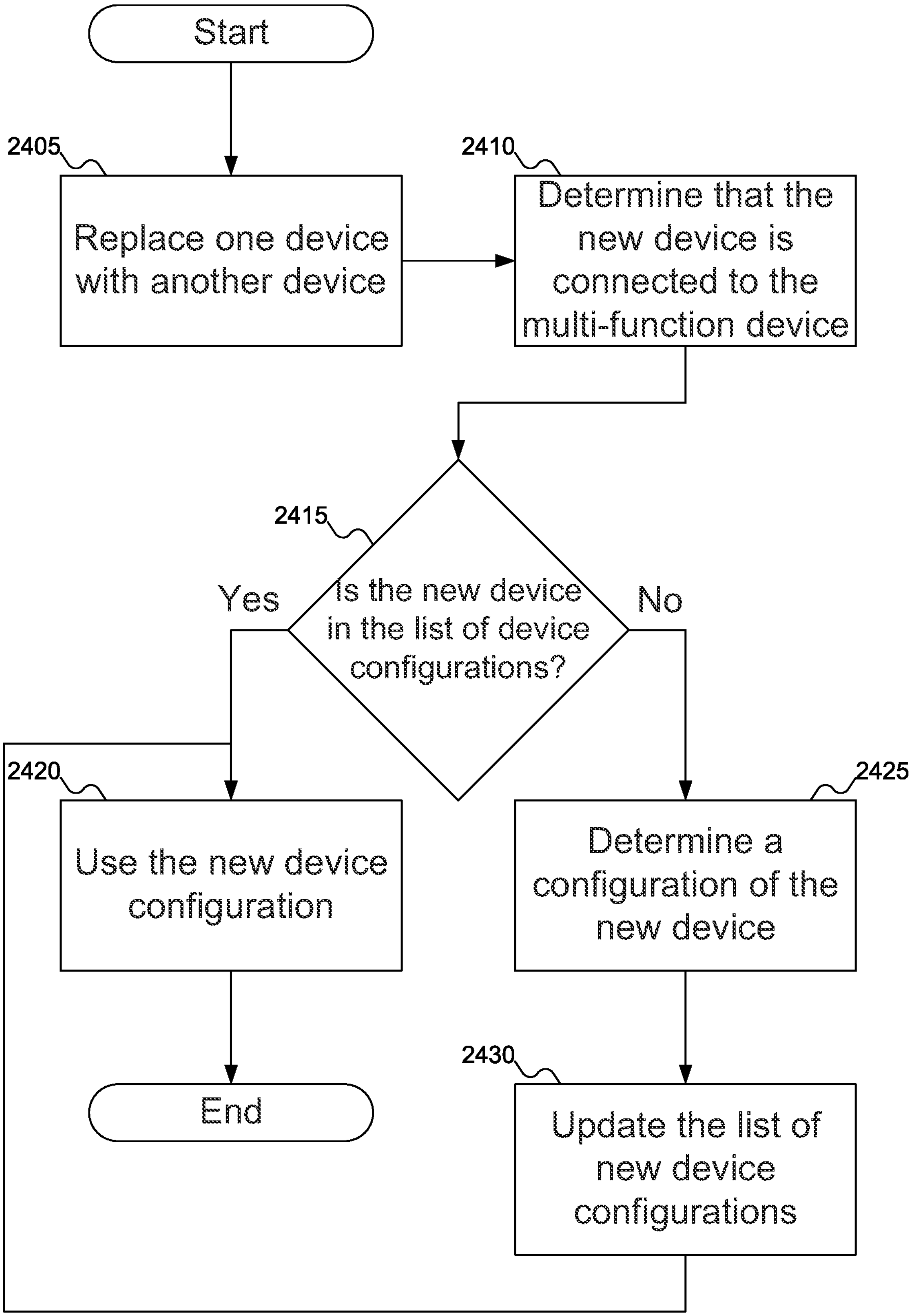
FIG. 24 shows a flowchart of an example procedure for the multi-function device of FIG. 1 to process a new device attached to the multi-function device of FIG. 1, according to embodiments of the disclosure.

FIG. 24 shows a flowchart of an example procedure for multi-function device 135 of FIG. 1 to process a new device attached to multi-function device 135 of FIG. 1, according to embodiments of the disclosure. In FIG. 24, at block 2405, one device connected to multi-function device 135 of FIG. 1 may be replaced with a new device. This replacement may be performed, for example, by the customer using multi-function device 135 of FIG. 1. In some embodiments of the disclosure, this replacement may include hot-swapping the device for the new device; in other embodiments of the disclosure, replacement may involve turning off the power to multi-function device 135 of FIG. 1. At block 2410, multi-function device 135 of FIG. 1 may determine that the new device is connected to multi-function device 135 of FIG. 1.

At block 2415, multi-function device 135 of FIG. 1 may determine if list of device configurations 1305 of FIG. 13 includes entry 1325 of FIG. 13 for the new device. If so, then at block 2420, multi-function device 135 of FIG. 1 may use entry 1325 of FIG. 13 to configure the new device. Multi-function device 135 of FIG. 1 may use entry 1325 of FIG. 13 to determine what functions of the new device to expose (or not expose) to host processor 110 of FIG. 1. Otherwise, at block 2425, multi-function device 135 of FIG. 1 may determine a configuration for the new device (for example, by interrogating the new device for its configuration, or by prompting an administrator to determine the configuration for the new device) and at block 2430 multi-function device 135 of FIG. 1 may update list of device configurations 1305 of FIG. 13 with the configuration for the new device, after which multi-function device 135 of FIG. 1 may use the device configuration at block 2420.

In FIGS. 6-11B and 16-24, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may have a multi-function device that may support connections to storage devices and computational storage units. The multi-function device may present to the host processor a single device supporting all the functions of the individual storage devices and computational storage units. In addition, some devices may be hidden from the host processor, and used solely by other devices connected to the multi-function device. Embodiments of the disclosure offer a technical advantage by enabling customers to mix and match which storage devices and which computational storage units to combine as though they were a single device. Embodiments of the disclosure also offer a technical advantage by enabling one device to access functions of another device attached to the multi-function device.

Embodiments of the disclosure may also include a buffer in the multi-function device. The buffer may act as a shared memory accessible by some or all of the attached storage devices and/or computational storage units. Embodiments of the disclosure offer a technical advantage by avoiding the need to use the main memory to move data between storage devices and/or computational storage units, or to process data in the main memory.

Various embodiments of the present disclosure include systems and methods for integrating a storage device such as solid-state drive (SSD) and compute device in an integrated storage device. In some embodiments of the disclosure, a Non-Volatile Memory Express (NVMe) controller and Compute may be exposed to a host independently using separate Peripheral Component Interconnect Express (PCIe) functions including physical functions (PFs)/Virtual Functions (VFs). A peer-to-peer data path may be provided between a storage device and a compute device. The compute device and SSD may be connected using connectors to provide flexibility to change various compute types such as graphics processing units (GPUs), Tensor Processing Units (TPUs), network interface controllers (NICs), Field Programmable Gate Arrays (FPGAs), Application-Specific Integrated Circuits (ASIC), System-on-a-Chips (SoC).

In some embodiments of the disclosure, applications may include those such as social networks, Artificial Intelligence/Machine Learning (AI/ML), Internet-of-things (JOT), and autonomous vehicles etc. which may generate large amounts of data. In some embodiments of the disclosure, such large datasets may require processing to generate monetarization from the datasets. In some embodiments, such processing may be expensive in terms of CPU cycles, memory bandwidth, energy spent. As such, some embodiments of the disclosure may process data near or inside a storage device to provide lower response latencies to the applications. Such near processing may also reduce energy consumption to move large data sets to and from a processor. Additionally, such near processing may enable distributed computing. As such, some embodiments of the disclosure may offload such application functions to a storage device and may minimize the compute resources needed, and hence may lower the cost of the database infrastructure including one or more of compute cycles, memory, network bandwidth, and energy consumed.

In some embodiments of the disclosure, one or more SSD Controllers and/or one or more Compute devices may be plugged/connected in the integrated storage device.

In some embodiments of the disclosure, the SSDs Controllers and/or Compute devices may be exposed to host in full or in part.

In some embodiments of the disclosure, subsets of SSD Controllers and/or Compute devices may not be exposed to the host and may be only internally.

In some embodiments of the disclosure, SSD Controllers and Compute devices may exposed using PCIe PF and/or VF.

In some embodiments of the disclosure, an FPGA performs a PCIe-PCIe bridging function, and host protocol pass-through.

In some embodiments of the disclosure, the SSD controllers and Compute devices may have their own device drivers and host software stack on the host that may access these device functions natively.

In some embodiments of the disclosure, SSD controllers and/or Compute devices may share peer-to-peer data buffer to exchange data being processed.

In some embodiments of the disclosure, one or more fixed compute devices such as a processor core may be used for certain pre-processing steps in FPGA.

In some embodiments of the disclosure, integrated devices may perform intelligent hosting directed device/function management such that those actions do not interfere with other SSD controllers and/or compute devices.

In some embodiments of the disclosure, SSD controllers and Compute devices may be pre-installed and configured in a flexible storage device.

In some embodiments of the disclosure, a flexible, integrated storage device may support a plug-and-play method of installing new computes into an existing flexible storage device.

Some embodiments of the disclosure may support integrating many different kinds of computes, such as TPU/GPU/FPGA/ASIC/SoC with SSD, for optimal data processing.

In some embodiments of the disclosure, different applications and use cases may benefit from cost and performance optimal computational storage solution.

Some embodiments of the disclosure may enable a broader set of applications customers.

Some embodiments of the disclosure may enable fewer product skews by having a base platform and different computes from partners.

Embodiments of the disclosure may include a proposed architecture for a flexible, integrated storage device that combines persistent storage and compute for optimal data processing. By processing data inside the storage device system, resource costs savings such as host bus bandwidth, host memory bandwidth, CPU cycles, energy spent in moving data may be achieved. Some embodiments of the disclosure may enable lower latencies as data processing may start sooner.

In some embodiments of the disclosure, a flexible and integrated storage device may be a processing element such as FPGA (or ASIC, SoC, etc.) and may be used to connect one or more SSD Controllers and/or one or more Compute resources to the host. In some embodiments of the disclosure, the SSD controllers and compute resources might be connected to such FPGA using connector so that different flavors could be connected as needed. In some embodiments of the disclosure, some of the SSD controllers and/or compute resources may be connected in a fixed manner if desirable.

One or more SSD controllers and one or more Compute resources may be exposed to the host through PCIe End Point (EP) Physical Functions (PF) or Virtual Functions (VF) in a transparent manner. The SSD controllers and compute resources may be connected to the FPGA using PCIe Root Port (RP). The FPGA logic may perform PCIe pass-through of the host and device interactions and host protocols. That is to say that a host system software stack such as SSD device drivers, compute drivers, and application frameworks may directly talk to the SSD controller and compute devices through the FPGA. In some embodiments, this facilitates easy integration of the proposed flexible storage device integration into existing application software stack.

In some embodiments of the disclosure, the number of PFs/VFs may match with the number of SSD Controllers and/or Computes exposed to the host. In some embodiments of the disclosure, the connected SSDs and Computes may be exposed or advertised to the host. In other embodiments of the disclosure, a subset of SSD controllers and/or computes may not be exposed to the host and may be used internally to the proposed storage device flexible storage device.

In some embodiments of the disclosure, a proposed flexible storage device may have other host interfaces such as one or more of Ethernet, TCP/IP, RDMA, NVMe-oF, UFS, eMMC, SAS, SATA, and so on in addition to or as an alternative to PCIe interfaces. Similarly, in some embodiments of the disclosure, the FPGA interface to the SSD Controller and Compute may have other protocols such as Ethernet, TCP/IP, RDMA, NVMe-oF, UFS, eMMC, SAS, SATA, and so on in addition to or as an alternative to PCIe interfaces. Although this disclosure uses examples with PCIe and NVMe as transport and host protocols for communication between host and flexible storage device, some embodiments of the disclosure may use other transports and host protocols to achieve optimal data processing operations in the proposed storage device.

In some embodiments of the disclosure, a PCIe bridge such as Light Weight Bridge (LWB) may forward the host PCIe packets and traffic to the SSD Controller and Compute resources attached to it with appropriate transactions if necessary. Similarly, in some embodiments of the disclosure, a PCIe bridge may forward the PCIe packets and traffic originating from SSD Controller and Compute device attached going to the host with appropriate translations if necessary.

In some embodiments of the disclosure, a flexible storage device may provide a peer-to-peer (P2P) data buffer that may be used to transfer data between SSD controller and compute device directly without sending it to the host memory. Such P2P data transfer may reduce the energy consumed, as well as the CPU cycles, the host memory bandwidth, and host bus bandwidth. Some embodiments of the disclosure may also enable a lower latency of data processing. In some embodiments of the disclosure, the P2P buffer may use on-chip SRAM, off-chip DRAM, or any other memory or combination of multiple memory elements.

In some embodiments of the disclosure, a flexible storage device may intercept any DMA transactions coming from an SSD controller and Compute device that fall in the P2P address range. The intercepted data transfer transactions may be re-directed to the P2P buffer instead of host memory. That is to say that SSD controller and/or Computes may be agnostic to the fact that some of their DMA transactions are automatically routed to the P2P buffer located in the storage device itself. From SSD Controller and Compute DMA point of view, they may just perform DMA operation using the memory addresses provided by their own device drivers. In some embodiments of the disclosure, no specific change or knowledge may be required by the SSD Controller and Compute device to participate in a P2P data transfer. As such, some embodiments of the disclosure may be very useful to enable usage of off-the-shelf SSD controllers and Compute devices into a flexible storage device to provide integrated solution with higher value.

In some embodiments of the disclosure, the P2P buffer may be accessed by SSD controllers using higher level protocols such as File Read or Write, and NVMe. In some embodiments of the disclosure, the P2P buffer may be accessed by the Compute devices using their own DMA engines under their own host device driver and software stack using any higher-level host protocols.

In some embodiments of the disclosure, a P2P buffer may be exposed to the host using a PCIe BAR mechanism. In some embodiments, the P2P buffer address range may be programmed or provided by the host into the flexible storage device. The method may be used by non PCIe host interfaces. In some embodiments of the disclosure, the P2P buffer address range available through BAR, or programming by host, or any other method may then be used by the FPGA to intercept the DMA transactions coming from the attached SSD Controllers and/or Compute resources.

In some embodiments of the disclosure, the P2P buffer may be shared between any number of devices connected to the FPGA including SSD controllers and Computes. That is to say that data may be exchanged between an SSD Controller and a compute device, a compute device and another compute device, an SSD controller and another SSD Controller, and/or any such combinations. In some embodiments of the disclosure, data may be shared or exchanged by one or more SSD Controllers or Computes to one or more SSD Controllers and/or compute devices. In another words, data exchange may be done in 1-to-1, many-to-1, or many-to-many manner. These forms of data exchange may be further described as unicast, or multicast, or broadcast type of data exchange.

In some embodiments of the disclosure, one or more SSD controllers may deposit data into the P2P buffer and then one or more Compute devices may operate or process that data by reading that data into their own local memory buffers.

In some embodiments of the disclosure, the FPGA may contain one or more processor cores or logic elements attached to the P2P buffer, to perform certain pre-processing data operations on the data contained in the P2P buffer itself. In some embodiments of the disclosure, such fixed, FPGA based pre-processing steps may be performed under device direction without host getting involved. In some embodiments of the disclosure, the FPGA based pro-processing steps may be performed under host direction. In some embodiments of the disclosure, the host may provide such instructions and orchestration using host bus interface to one or more PCIe functions.

In some embodiments of the disclosure, since multiple Compute functions and SSD controller functions may be exposed to the host, an integrated device may perform intelligent host directed device/function management such that those actions do not interfere with other SSD controllers and/or compute devices. Some examples of such device management functions are power management, reset, or interrupt settings.

In some embodiments of the disclosure, the flexible storage device, SSD controllers and Computes may be pre-installed and configured. In some embodiments of the disclosure, the flexible storage device supports plug-and-play method of installing new Computes and SSD controllers into an existing flexible storage device. In some embodiments of the disclosure, a FPGA uses local persistent memory to store configuration and capabilities of the SSD Controller and/or compute devices attached to it and may use local persistent memory to advertise devices attached to the FPGA to the host.

In some embodiments of the disclosure, after power-on, the logic in the FPGA may detect a newly connected device (SSD controller, and/or compute device) by checking the attached device identification information with its list of known device configurations stored in local persistent memory. If the device information does not match, the FPGA may read the host interface configuration and capabilities of the attached device and may store the read configuration and capability information in persistent memory. In other words, the FPGA may update its list of attached devices stored in local persistent memory. Then, on subsequent power-on events, the FPGA may use the host configuration and capability information stored in its local persistent memory to advertise configuration and capabilities matching a newly connected device. In this manner, a new compute device or SSD controller may be plugged into the flexible storage device base platform, and the storage device would automatically make it visible to the host.

Various embodiments of the disclosure include systems and methods for integrating a storage device such as Solid-State Drives (SSD) and Fully Homomorphic Encryption (FHE) acceleration engine in an integrated storage device. A Non-Volatile Memory Express (NVMe) controller and FHE acceleration engine may be exposed to the host independently using separate Peripheral Component Interconnect Express (PCIe) functions including physical functions (PFs)/Virtual Functions (VFs). A peer-to-peer data path may be provided between storage and FHE compute.

In some embodiments of the disclosure, applications may include those such as social networks, Artificial Intelligence/Machine Learning (AI/ML), Internet-of-things (IOT), and autonomous vehicles etc. which may generate large amounts of data. In some embodiments of the disclosure, such large datasets may require processing to generate monetarization from the datasets. In some embodiments of the disclosure, such processing may be expensive in terms of CPU cycles, memory bandwidth, energy spent. As such, some embodiments of the disclosure may process data near or inside a storage device to provide lower response latencies to the applications. Such near processing may also reduce energy consumption to move large data sets to and from a processor. Additionally, such near processing may enable distributed computing. As such, some embodiments of the disclosure may offload such application functions to a storage device and may minimize the compute resources needed, and hence may lower the cost of the database infrastructure including one or more of compute cycles, memory, network bandwidth, and energy consumed.

In some embodiments of the disclosure, one or more SSD Controllers and/or one or more FHE acceleration engines may be integrated in a storage device.

In some embodiments of the disclosure, off-the-shelf SSD controllers may be used to provide integrated solution.

In some embodiments of the disclosure, SSD controllers and FHE acceleration engine may have their own device drivers and host software stack on the host that may access these device functions natively.

In some embodiments of the disclosure, SSD controllers and/or FHE acceleration engines may share peer-to-peer data buffer to exchange data being processed.

In some embodiments of the disclosure, part of the P2P buffer may be reserved for FHE instructions as cache, or pre-fetch buffer.

In some embodiments of the disclosure, part of the P2P buffer may be reserved for input dataset as cache, or prefetch buffer.

In some embodiments of the disclosure, part of the P2P buffer may be reserved for intermediate results as cache or prefetch buffer.

In some embodiments of the disclosure, FHE processing may be performed on data stored in SSD efficiently, without moving it to the host memory.

In some embodiments of the disclosure, FHE processing instructions may be downloaded into the FHE engine quickly, resulting in lower latency.

In some embodiments of the disclosure, an off-the-shelf SSD may be used without re-spinning SSD controller.

In some embodiments of the disclosure, FHE acceleration may integrate into FHE framework and device driver smooth.

In embodiments of the disclosure, Fully Homomorphic Encryption (FHE) technology may be used to store sensitive data in encrypted form and then may process it for analytics without decrypting it. In some embodiments of the disclosure, this technology may enable secure data storage and processing without compromising confidentiality or misuse. A flexible, integrated storage device may combine persistent storage and an FHE acceleration engine. In some embodiments of the disclosure, by processing data inside the storage device system resource costs such as host bus bandwidth, host memory bandwidth, CPU cycles, energy spent in moving data may be achieved. In some embodiments of the disclosure, it also may enable lower latencies as data processing starts sooner.

In some embodiments of the disclosure, a flexible and integrated storage device may have a processing element such as a Field Programmable Gate Arrays (FPGA) (or Application-Specific Integrated Circuit (ASIC), or a System-on-a-Chip (SoC), etc.) used to connect one or more SSD Controllers and/or one or more Fully Homomorphic Encryption (FHE) processing engine to the host. The SSD controllers and FHE engine may be connected to FPGA using a connector so that different flavors or number of devices could be connected. In some embodiments of the disclosure, some of the SSD controllers and/or FHE engines may be connected in a fixed manner.

One or more SSD controllers and one or more FHE engines may be exposed to the host through PCIe End Point (EP) Physical Functions (PFs) or Virtual Functions (VFs) in a transparent manner. The FPGA logic may perform PCIe pass-through of the host and device interactions and host protocols. In other words, the FHE application and driver may communicate with FHE acceleration engine directly through the FPGA.

In some embodiments of the disclosure, a proposed flexible storage device with FHE acceleration engine may have other host interfaces such as one or more of Ethernet, TCP/IP, RDMA, NVMe-oF, UFS, eMMC, SAS, SATA, and so on in addition to or as an alternative to PCIe interfaces. Similarly, in some embodiments, the FPGA interface to the SSD Controller and Compute may have other protocols such as one or more of Ethernet, TCP/IP, RDMA, NVMe-oF, UFS, eMMC, SAS, SATA, and so on. Although this disclosure uses examples with PCIe and NVMe as transport and host protocols for communication between host and flexible storage device, some embodiments of the disclosure may use other transports and host protocols to achieve optimal data processing operations in the proposed storage device.

In some embodiments of the disclosure, the proposed flexible storage device FHE storage device may provide a peer-to-peer (P2P) data buffer that may be used to transfer data between SSD controller and FHE engine directly without sending it to the host memory. Such P2P data transfers may greatly reduce energy consumed, as well as CPU cycles, host memory bandwidth, and host bus bandwidth. In some embodiments of the disclosure, use of the P2P buffer may also enable lower latency of data processing. In some embodiments of the disclosure, the P2P buffer may use on-chip SRAM, off-chip DRAM, or any other memory or combination of multiple memory elements.

FHE processing instructions may be first downloaded into the FHE engine. In some embodiments of the disclosure, the FHE engine may receive DMA instructions from the host memory. In some embodiments of the disclosure, the FHE engine may receive DMA instructions from the P2P buffer in the integrated storage device. In some embodiments of the disclosure, the application and driver software may first read the instructions from SSD into the P2P buffer. In some embodiments of the disclosure, the system software may move instructions from host memory into the P2P buffer, and then may direct FHE engine to DMA instructions from P2P buffer.

In some embodiments of the disclosure, instructions kept in the P2P buffer may be kept there for future usage by reserving part of the P2P buffer for this purpose. That is to say that instructions kept in the P2P buffer may be cached there for subsequent usage. This may reduce latency of instruction loading into the FHE engine. In some embodiments of the disclosure, the system software may pre-fetch the desired instruction from SSD or host memory into the P2P buffer reserved for instructions.

In some embodiments of the disclosure, once the instructions are loaded into the FHE engine, input dataset may be provided to the engine for processing. In some embodiments of the disclosure, the input dataset may be present in host memory and FHE engine DMAs it from there through the FPGA in pass-through manner. In other embodiments of the disclosure, the input data set may be stored in the attached SSD and first may load it into the P2P buffer in the storage device. Such data loading may be done using higher level protocol such as File Read and NVMe Read commands to the attached SSD Controller. Once input data is DMA deposited into the P2P buffer by SSD Controller, application and/or system software may instruct the FHE engine to fetch that data for processing. At that point, the FHE engine may transfer data from P2P buffer into its local memory for processing.

In some embodiments of the disclosure, part of the P2P buffer may be reserved to store input data for future usage. In other words, P2P buffer may be used as cache or pre-fetch buffer for some of the processing inputs. Such caching and/or prefetching would reduce latency of data processing.

In some embodiments of the disclosure, once the FHE engine completes data processing, the completion may be conveyed to the application and system software through the FPGA in pass-through manner. At that point, application and/or system software may decide what to do with the FHE processing results. In some embodiments of the disclosure, the results may be transferred to the host memory using FHE engine DMA through the FPGA in pass-through manner. In some embodiments of the disclosure, the FHE processing results may be deposited into the P2P buffer for persistent storage in the attached SSD. Once results are transferred to P2P buffer, application and/or system software may instruct the SSD Controller to persist those results. That orchestration may be achieved using higher level protocol such as File Write and NVMe Write commands.

In some embodiments of the disclosure, part of the processing results may be kept in the P2P buffer for future usage. That is to say that part of the P2P buffer may be used as cache or prefetch buffer for intermediate results.

In some embodiments of the disclosure, a FHE engine may be integrated inside the FPGA instead of, or in addition to, connecting it externally. The other features mentioned earlier may apply to this integration method as well. An additional benefit of this integration method may be a reduced cost and reduction of power of devices. This method may also reduce overall latency of FHE operations as data may not need to cross the FPGA boundary or pass-through logic workbench (LWB) bridge logic.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a device, comprising:

a storage device, the storage device including storage for a data and a controller to manage access to the storage;

a network interface device to send the data across a network; and a host interface, the host interface to receive a request for the storage device or the network interface device.

Statement 2. An embodiment of the disclosure includes the device according to statement 1, wherein:

the storage device includes a Solid State Drive (SSD);

the controller includes an SSD controller; and the storage includes a not-AND flash storage.

Statement 3. An embodiment of the disclosure includes the device according to statement 1, wherein the host interface includes a Peripheral Component Interconnect Express (PCIe) interface or a cache-coherent interconnect interface.

Statement 4. An embodiment of the disclosure includes the device according to statement 3, wherein the cache-coherent interconnect interface includes a Compute Express Link (CXL) interface.

Statement 5. An embodiment of the disclosure includes the device according to statement 1, wherein the network interface device is configured to access the data from the storage of the storage device.

Statement 6. An embodiment of the disclosure includes the device according to statement 5, wherein the network interface device is further configured to access the data from the storage of the storage device using the controller.

Statement 7. An embodiment of the disclosure includes the device according to statement 1, further comprising a buffer connected to the storage device and the network interface device.

Statement 8. An embodiment of the disclosure includes the device according to statement 7, wherein:

the storage device is configured to store the data in the buffer; and the network interface device is configured to read the data from the buffer.

Statement 9. An embodiment of the disclosure includes the device according to statement 8, wherein:

the storage device is further configured to store the data in the buffer based at least in part on the request from a host processor; and the network interface device is further configured to read the data from the buffer based at least in part on the request from the host processor.

Statement 10. An embodiment of the disclosure includes the device according to statement 8, wherein the storage device is further configured to pause storing the data in the buffer based at least in part on the buffer reaching a first threshold.

Statement 11. An embodiment of the disclosure includes the device according to statement 10, wherein the storage device is further configured to store the data in the buffer based at least in part on the buffer reaching a second threshold.

Statement 12. An embodiment of the disclosure includes the device according to statement 10, wherein the storage device is further configured to signal a host processor based at least in part on the data in the buffer reaching the first threshold.

Statement 13. An embodiment of the disclosure includes the device according to statement 8, further comprising a circuit to process the data in the buffer.

Statement 14. An embodiment of the disclosure includes the device according to statement 13, wherein the circuit includes a Field Programmable Gate Array (FPGA), an Application-Specific Integrated Circuit (ASIC), a System-on-a-Chip (SoC), a Graphics Processing Unit (GPU), a General Purpose GPU (GPGPU), a Tensor Processing Unit (TPU), a Neural Processing Unit (NPU), or a processor.

Statement 15. An embodiment of the disclosure includes the device according to statement 13, wherein the circuit includes the buffer.

Statement 16. An embodiment of the disclosure includes the device according to statement 13, wherein:

the host interface, is configured to receive the request for the storage device and to receive a second request for the network interface device;

the request is sent from the host interface to the circuit and from the circuit to the storage device; and the second request is sent from the host interface to the circuit and from the circuit to the network interface device.

Statement 17. An embodiment of the disclosure includes the device according to statement 13, wherein the circuit is configured to transcode the data in the buffer.

Statement 18. An embodiment of the disclosure includes the device according to statement 8, wherein:

the buffer is partitioned into a first region and a second region;

the storage device is further configured to store the data in the first region of the buffer; and the device further comprises a second storage device, the second storage device including a second storage for a second data and a second controller, the second storage device connected to the buffer, the second storage device configured to store the second data in the second region of the buffer.

Statement 19. An embodiment of the disclosure includes the device according to statement 18, wherein the network interface device is further configured to read the data from the first region of the buffer and the second data from the second region of the buffer.

Statement 20. An embodiment of the disclosure includes the device according to statement 18, wherein:

the network interface device is configured to read the data from the first region of the buffer; and the device further comprises a second network interface device to send the second data across the network, the second network interface device connected to the buffer, the second network interface device configured to read the second data from the second region of the buffer.

Statement 21. An embodiment of the disclosure includes the device according to statement 8, wherein:

the buffer is partitioned into a first region and a second region;

the storage stores a second data; and the storage device is further configured to store the data in the first region of the buffer and the second data in the second region of the buffer.

Statement 22. An embodiment of the disclosure includes the device according to statement 21, wherein:

the network interface device is configured to read the data from the first region of the buffer; and the device further comprises a second network interface device to send the second data across the network, the second network interface device connected to the buffer, the second network interface device configured to read the second data from the second region of the buffer.

Statement 23. An embodiment of the disclosure includes the device according to statement 8, wherein:

the device further comprises a second buffer; and the device further comprises a second storage device, the second storage device including a second storage for a second data and a second controller, the second storage device connected to the second buffer, the second storage device configured to store the second data in the second buffer.

Statement 24. An embodiment of the disclosure includes the device according to statement 23, wherein:

the network interface device is connected to the second buffer; and the network interface device is further configured to read the second data from the second buffer.

Statement 25. An embodiment of the disclosure includes the device according to statement 24, further comprising a multiplexer connected to the network interface device, the buffer, and the second buffer.

Statement 26. An embodiment of the disclosure includes the device according to statement 23, further comprising a second network interface device to send the second data across the network, the second network interface device connected to the second buffer, the second network interface device configured to read the second data from the second buffer.

Statement 27. An embodiment of the disclosure includes the device according to statement 8, wherein:

the device further comprises a second buffer;

the storage stores a second data;

the storage device is connected to the second buffer; and the storage device is further configured to store the second data in the second buffer.

Statement 28. An embodiment of the disclosure includes the device according to statement 27, further comprising a demultiplexer connected to the storage device, the buffer, and the second buffer.

Statement 29. An embodiment of the disclosure includes the device according to statement 27, further comprising a second network interface device to send the second data across the network, the second network interface device connected to the second buffer, the second network interface device configured to read the second data from the second buffer.

Statement 30. An embodiment of the disclosure includes the device according to statement 1, wherein the host interface includes an endpoint exposing a first function to issue a first request to the storage device and a second function to issue a second request to the network interface device.

Statement 31. An embodiment of the disclosure includes the device according to statement 1, further comprising a root port.

Statement 32. An embodiment of the disclosure includes the device according to statement 31, wherein the root port connects to the storage device.

Statement 33. An embodiment of the disclosure includes the device according to statement 32, wherein:

the device further comprises a second storage device; and the root port further connects to the second storage device.

Statement 34. An embodiment of the disclosure includes the device according to statement 32, further comprising a second root port connected to the network interface device.

Statement 35. An embodiment of the disclosure includes the device according to statement 34, wherein:

the device further comprises a second network interface device; and the second root port further connects to the second network interface device.

Statement 36. An embodiment of the disclosure includes the device according to statement 31, wherein the root port connects to the network interface device.

Statement 37. An embodiment of the disclosure includes the device according to statement 36, wherein:

the device further comprises a second network interface device; and the root port further connects to the second network interface device.

Statement 38. An embodiment of the disclosure includes the device according to statement 1, wherein:

the storage device communicates with a host processor using a first protocol; and the network interface device communicates with the host processor using a second protocol.

Statement 39. An embodiment of the disclosure includes the device according to statement 1, wherein:

the device further comprises a circuit;

the storage device communicates with the circuit using a first protocol; and the network interface device communicates with the circuit using a second protocol.

Statement 40. An embodiment of the disclosure includes the device according to statement 39, wherein the circuit communicates with a host processor using a third protocol.

Statement 41. An embodiment of the disclosure includes a method, comprising:

receiving a request at a device;

accessing a data from a storage device of the device based at least in part on the request; and transmitting the data using a network interface device of the device.

Statement 42. An embodiment of the disclosure includes the method according to statement 41, wherein receiving the request at the device includes receiving the request at the device from a host processor.

Statement 43. An embodiment of the disclosure includes the method according to statement 41, wherein receiving the request at the device includes receiving the request at a host interface of the device.

Statement 44. An embodiment of the disclosure includes the method according to statement 43, wherein receiving the request at the host interface of the device includes receiving the request at a function exposed by the host interface of the device.

Statement 45. An embodiment of the disclosure includes the method according to statement 44, wherein receiving the request at the function exposed by the host interface of the device includes receiving the request at the function exposed by an endpoint of the device.

Statement 46. An embodiment of the disclosure includes the method according to statement 43, wherein the host interface includes a Peripheral Component Interconnect Express (PCIe) interface or a cache-coherent interconnect interface.

Statement 47. An embodiment of the disclosure includes the method according to statement 46, wherein the cache-coherent interconnect interface includes a Compute Express Link (CXL) interface.

Statement 48. An embodiment of the disclosure includes the method according to statement 41, wherein accessing the data from the storage device of the device includes accessing the data from a storage of the storage device of the device.

Statement 49. An embodiment of the disclosure includes the method according to statement 48, wherein:

the storage device includes a Solid State Drive (SSD);

the SSD includes an SSD controller; and the storage includes a not-AND flash storage.

Statement 50. An embodiment of the disclosure includes the method according to statement 41, wherein accessing the data from the storage device of the device includes accessing the data from the storage device of the device by the network interface device of the device.

Statement 51. An embodiment of the disclosure includes the method according to statement 41, wherein:

the method further comprises receiving a second request at the device; and transmitting the data using a network interface device of the device includes transmitting the data using a network interface device of the device based at least in part on the second request.

Statement 52. An embodiment of the disclosure includes the method according to statement 51, wherein receiving the second request at the device includes receiving the second request at the device from a host processor.

Statement 53. An embodiment of the disclosure includes the method according to statement 51, wherein receiving the second request at the device includes receiving the second request at a host interface of the device.

Statement 54. An embodiment of the disclosure includes the method according to statement 53, wherein receiving the second request at the host interface of the device includes receiving the second request at a function exposed by the host interface of the device.

Statement 55. An embodiment of the disclosure includes the method according to statement 54, wherein receiving the second request at the second function exposed by the host interface of the device includes receiving the second request at the second function exposed by an endpoint of the device.

Statement 56. An embodiment of the disclosure includes the method according to statement 41, wherein:

accessing the data from the storage device of the device based at least in part on the request includes storing the data in a buffer by the storage device based at least in part on the request, the device including the buffer, the buffer connected to the storage device of the device and the network interface of the device; and transmitting the data using the network interface device of the device includes reading the data from the buffer by the network interface device of the device.

Statement 57. An embodiment of the disclosure includes the method according to statement 56, wherein storing the data in the buffer by the storage device based at least in part on the request includes storing the data in the buffer by a storage controller of the storage device based at least in part on the request.

Statement 58. An embodiment of the disclosure includes the method according to statement 56, wherein storing the data in the buffer by the storage device based at least in part on the request includes prefetching the data by the storage device into the buffer based at least in part on the buffer crossing a threshold.

Statement 59. An embodiment of the disclosure includes the method according to statement 56, wherein storing the data in the buffer by the storage device based at least in part on the request includes pausing a prefetching of the data by the storage device into the buffer based at least in part on the buffer crossing a threshold.

Statement 60. An embodiment of the disclosure includes the method according to statement 56, further comprising processing the data in the buffer using a circuit of the device.

Statement 61. An embodiment of the disclosure includes the method according to statement 60, wherein the circuit of the device includes a Field Programmable Gate Array (FPGA), an Application-Specific Integrated Circuit (ASIC), a System-on-a-Chip (SoC), a Graphics Processing Unit (GPU), a General Purpose GPU (GPGPU), a Tensor Processing Unit (TPU), a Neural Processing Unit (NPU), or a processor.

Statement 62. An embodiment of the disclosure includes the method according to statement 60, wherein the circuit of the device includes the buffer.

Statement 63. An embodiment of the disclosure includes the method according to statement 60, wherein receiving the request at the device includes:

receiving the request at the circuit of the device; and sending the request from the circuit of the device to the storage device of the device.

Statement 64. An embodiment of the disclosure includes the method according to statement 63, wherein:

receiving the request at the circuit of the device includes receiving the request using a first protocol at the circuit of the device; and sending the request from the circuit of the device to the storage device of the device includes sending the request using a second protocol from the circuit of the device to the storage device of the device.

Statement 65. An embodiment of the disclosure includes the method according to statement 60, wherein;

the method further comprises receiving a second request at the circuit of the device; and transmitting the data using a network interface device of the device includes sending the second request from the circuit of the device to the network interface device of the device.

Statement 66. An embodiment of the disclosure includes the method according to statement 65, wherein:

receiving the second request at the circuit of the device includes receiving the second request using a first protocol at the circuit of the device; and sending the request from the circuit of the device to the storage device of the device includes sending the request using a second protocol from the circuit of the device to the network interface device of the device.

Statement 67. An embodiment of the disclosure includes the method according to statement 60, wherein processing the data in the buffer using the circuit of the device includes transcoding the data in the buffer using the circuit of the device.

Statement 68. An embodiment of the disclosure includes the method according to statement 56, wherein:

storing the data in the buffer based at least in part on the request includes storing the data in a first region of the buffer based at least in part on the request; and the method further comprises storing a second data in a second region of the buffer.

Statement 69. An embodiment of the disclosure includes the method according to statement 68, wherein storing the second data in the second region of the buffer includes accessing the second data from the storage device of the device.

Statement 70. An embodiment of the disclosure includes the method according to statement 68, wherein storing the second data in the second region of the buffer includes accessing the second data from a second storage device of the device, the buffer further connected to the second storage device of the device.

Statement 71. An embodiment of the disclosure includes the method according to statement 68, wherein reading the data from the buffer by the network interface device of the device includes reading the data from the first region of the buffer by the network interface device of the device.

Statement 72. An embodiment of the disclosure includes the method according to statement 71, further comprising:

reading the second data from the second region of the buffer by the network interface device; and transmitting the second data using the network interface device of the device.

Statement 73. An embodiment of the disclosure includes the method according to statement 71, further comprising:

reading the second data from the second region of the buffer by a second network interface device of the device, the buffer further connected to the second network interface of the device; and transmitting the second data using the second network interface device of the device.

Statement 74. An embodiment of the disclosure includes the method according to statement 56, further comprising storing a second data in a second buffer, the device including the second buffer, the second buffer connected to the storage device of the device and the network interface of the device.

Statement 75. An embodiment of the disclosure includes the method according to statement 74, wherein storing the second data in the second buffer includes accessing the second data from the storage device of the device.

Statement 76. An embodiment of the disclosure includes the method according to statement 75, wherein storing the second data in the second buffer further includes storing the second data in the second buffer via a demultiplexer.

Statement 77. An embodiment of the disclosure includes the method according to statement 74, wherein storing the second data in the second buffer includes accessing the second data from a second storage device of the device, the second buffer further connected to the second storage device of the device.

Statement 78. An embodiment of the disclosure includes the method according to statement 74, further comprising:

reading the second data from the second buffer by the network interface device; and transmitting the second data using the network interface device of the device.

Statement 79. An embodiment of the disclosure includes the method according to statement 78, wherein reading the second data from the second buffer by the network interface device includes reading the second data from the second buffer by the network interface device via a multiplexer.

Statement 80. An embodiment of the disclosure includes the method according to statement 78, further comprising:

reading the second data from the second buffer by a second network interface device of the device, the second buffer further connected to the second network interface of the device; and transmitting the second data using the second network interface device of the device.

Statement 81. An embodiment of the disclosure includes the method according to statement 41, wherein receiving the request at the device includes sending the request to the storage device of the device using a root port of the device.

Statement 82. An embodiment of the disclosure includes the method according to statement 81, wherein the storage device of the device and a second storage device of the device connect to the root port of the device.

Statement 83. An embodiment of the disclosure includes the method according to statement 41, wherein receiving the request at the device includes sending the request to the network interface device of the device using a root port of the device.

Statement 84. An embodiment of the disclosure includes the method according to statement 83, wherein the network interface device of the device and a second network interface device of the device connect to the root port of the device.

Statement 85. An embodiment of the disclosure includes a method, comprising:

sending a first request from a host processor to a storage device of a device, the device including the storage device and a network interface device; and sending a second request from the host processor to the network interface device of the device, wherein a data of storage device of the device is transmitted by the network interface device of the device.

Statement 86. An embodiment of the disclosure includes the method according to statement 85, wherein:

the data is read from the storage device of the device based at least in part on the first request; and the data is transmitted by the network interface device of the device based at least in part on the second request.

Statement 87. An embodiment of the disclosure includes the method according to statement 85, wherein the data of the storage device of the device is transmitted by the network interface device of the device without transferring the data to a main memory associated with the host processor.

Statement 88. An embodiment of the disclosure includes the method according to statement 85, wherein sending the first request from the host processor to the storage device of the device includes sending the second request from the host processor to the network interface device of the device.

Statement 89. An embodiment of the disclosure includes the method according to statement 85, wherein sending the first request from the host processor to the storage device of the device includes sending the first request using a first protocol from the host processor to the storage device of the device; and sending the second request from the host processor to the network interface device of the device includes sending the second request using a second protocol from the host processor to the network interface device of the device.

Statement 90. An embodiment of the disclosure includes the method according to statement 85, further comprising sending a third request from the host processor to a circuit of the device.

Statement 91. An embodiment of the disclosure includes the method according to statement 90, wherein the circuit includes a Field Programmable Gate Array (FPGA), an Application-Specific Integrated Circuit (ASIC), a System-on-a-Chip (SoC), a Graphics Processing Unit (GPU), a General Purpose GPU (GPGPU), a Tensor Processing Unit (TPU), a Neural Processing Unit (NPU), or a processor.

Statement 92. An embodiment of the disclosure includes the method according to statement 90, wherein the circuit transcodes the data from the storage device of the device for transmission by the network interface device of the device.

Statement 93. An embodiment of the disclosure includes the method according to statement 92, where the circuit transcodes the data from the storage device of the device for transmission by the network interface device of the device based at least in part on the third request.

Statement 94. An embodiment of the disclosure includes the method according to statement 85, further comprising sending a third request from the host processor to the device.

Statement 95. An embodiment of the disclosure includes the method according to statement 94, wherein the device transcodes the data from the storage device of the device for transmission by the network interface device of the device.

Statement 96. An embodiment of the disclosure includes the method according to statement 95, where the device transcodes the data from the storage device of the device for transmission by the network interface device of the device based at least in part on the third request.

Statement 97. An embodiment of the disclosure includes an article, comprising a non-transitory storage medium, the non-transitory storage medium having stored thereon instructions that, when executed by a machine, result in:

receiving a request at a device;

accessing a data from a storage device of the device based at least in part on the request; and transmitting the data using a network interface device of the device.

Statement 98. An embodiment of the disclosure includes the article according to statement 97, wherein receiving the request at the device includes receiving the request at the device from a host processor.

Statement 99. An embodiment of the disclosure includes the article according to statement 97, wherein receiving the request at the device includes receiving the request at a host interface of the device.

Statement 100. An embodiment of the disclosure includes the article according to statement 99, wherein receiving the request at the host interface of the device includes receiving the request at a function exposed by the host interface of the device.

Statement 101. An embodiment of the disclosure includes the article according to statement 100, wherein receiving the request at the function exposed by the host interface of the device includes receiving the request at the function exposed by an endpoint of the device.

Statement 102. An embodiment of the disclosure includes the article according to statement 99, wherein the host interface includes a Peripheral Component Interconnect Express (PCIe) interface or a cache-coherent interconnect interface.

Statement 103. An embodiment of the disclosure includes the article according to statement 102, wherein the cache-coherent interconnect interface includes a Compute Express Link (CXL) interface.

Statement 104. An embodiment of the disclosure includes the article according to statement 97, wherein accessing the data from the storage device of the device includes accessing the data from a storage of the storage device of the device.

Statement 105. An embodiment of the disclosure includes the article according to statement 104, wherein:

the storage device includes a Solid State Drive (SSD);

the SSD includes an SSD controller; and the storage includes a not-AND flash storage.

Statement 106. An embodiment of the disclosure includes the article according to statement 97, wherein accessing the data from the storage device of the device includes accessing the data from the storage device of the device by the network interface device of the device.

Statement 107. An embodiment of the disclosure includes the article according to statement 97, wherein:

the non-transitory storage medium has stored thereon further instructions that, when executed by the machine, result in receiving a second request at the device; and transmitting the data using a network interface device of the device includes transmitting the data using a network interface device of the device based at least in part on the second request.

Statement 108. An embodiment of the disclosure includes the article according to statement 107, wherein receiving the second request at the device includes receiving the second request at the device from a host processor.

Statement 109. An embodiment of the disclosure includes the article according to statement 107, wherein receiving the second request at the device includes receiving the second request at a host interface of the device.

Statement 110. An embodiment of the disclosure includes the article according to statement 109, wherein receiving the second request at the host interface of the device includes receiving the second request at a function exposed by the host interface of the device.

Statement 111. An embodiment of the disclosure includes the article according to statement 110, wherein receiving the second request at the second function exposed by the host interface of the device includes receiving the second request at the second function exposed by an endpoint of the device.

Statement 112. An embodiment of the disclosure includes the article according to statement 97, wherein:

accessing the data from the storage device of the device based at least in part on the request includes storing the data in a buffer by the storage device based at least in part on the request, the device including the buffer, the buffer connected to the storage device of the device and the network interface of the device; and transmitting the data using the network interface device of the device includes reading the data from the buffer by the network interface device of the device.

Statement 113. An embodiment of the disclosure includes the article according to statement 112, wherein storing the data in the buffer by the storage device based at least in part on the request includes storing the data in the buffer by a storage controller of the storage device based at least in part on the request.

Statement 114. An embodiment of the disclosure includes the article according to statement 112, wherein storing the data in the buffer by the storage device based at least in part on the request includes prefetching the data by the storage device into the buffer based at least in part on the buffer crossing a threshold.

Statement 115. An embodiment of the disclosure includes the article according to statement 112, wherein storing the data in the buffer by the storage device based at least in part on the request includes pausing a prefetching of the data by the storage device into the buffer based at least in part on the buffer crossing a threshold.

Statement 116. An embodiment of the disclosure includes the article according to statement 112, the non-transitory storage medium having stored thereon further instructions that, when executed by the machine, result in processing the data in the buffer using a circuit of the device.

Statement 117. An embodiment of the disclosure includes the article according to statement 116, wherein the circuit of the device includes a Field Programmable Gate Array (FPGA), an Application-Specific Integrated Circuit (ASIC), a System-on-a-Chip (SoC), a Graphics Processing Unit (GPU), a General Purpose GPU (GPGPU), a Tensor Processing Unit (TPU), a Neural Processing Unit (NPU), or a processor.

Statement 118. An embodiment of the disclosure includes the article according to statement 116, wherein the circuit of the device includes the buffer.

Statement 119. An embodiment of the disclosure includes the article according to statement 116, wherein receiving the request at the device includes:

receiving the request at the circuit of the device; and sending the request from the circuit of the device to the storage device of the device.

Statement 120. An embodiment of the disclosure includes the article according to statement 119, wherein:

receiving the request at the circuit of the device includes receiving the request using a first protocol at the circuit of the device; and sending the request from the circuit of the device to the storage device of the device includes sending the request using a second protocol from the circuit of the device to the storage device of the device.

Statement 121. An embodiment of the disclosure includes the article according to statement 116, wherein;

the non-transitory storage medium has stored thereon further instructions that, when executed by the machine, result in receiving a second request at the circuit of the device; and transmitting the data using a network interface device of the device includes sending the second request from the circuit of the device to the network interface device of the device.

Statement 122. An embodiment of the disclosure includes the article according to statement 121, wherein:

receiving the second request at the circuit of the device includes receiving the second request using a first protocol at the circuit of the device; and sending the request from the circuit of the device to the storage device of the device includes sending the request using a second protocol from the circuit of the device to the network interface device of the device.

Statement 123. An embodiment of the disclosure includes the article according to statement 116, wherein processing the data in the buffer using the circuit of the device includes transcoding the data in the buffer using the circuit of the device.

Statement 124. An embodiment of the disclosure includes the article according to statement 112, wherein:

storing the data in the buffer based at least in part on the request includes storing the data in a first region of the buffer based at least in part on the request; and the non-transitory storage medium has stored thereon further instructions that, when executed by the machine, result in storing a second data in a second region of the buffer.

Statement 125. An embodiment of the disclosure includes the article according to statement 124, wherein storing the second data in the second region of the buffer includes accessing the second data from the storage device of the device.

Statement 126. An embodiment of the disclosure includes the article according to statement 124, wherein storing the second data in the second region of the buffer includes accessing the second data from a second storage device of the device, the buffer further connected to the second storage device of the device.

Statement 127. An embodiment of the disclosure includes the article according to statement 124, wherein reading the data from the buffer by the network interface device of the device includes reading the data from the first region of the buffer by the network interface device of the device.

Statement 128. An embodiment of the disclosure includes the article according to statement 127, the non-transitory storage medium having stored thereon further instructions that, when executed by the machine, result in:

reading the second data from the second region of the buffer by the network interface device; and transmitting the second data using the network interface device of the device.

Statement 129. An embodiment of the disclosure includes the article according to statement 127, the non-transitory storage medium having stored thereon further instructions that, when executed by the machine, result in:

reading the second data from the second region of the buffer by a second network interface device of the device, the buffer further connected to the second network interface of the device; and transmitting the second data using the second network interface device of the device.

Statement 130. An embodiment of the disclosure includes the article according to statement 112, the non-transitory storage medium having stored thereon further instructions that, when executed by the machine, result in storing a second data in a second buffer, the device including the second buffer, the second buffer connected to the storage device of the device and the network interface of the device.

Statement 131. An embodiment of the disclosure includes the article according to statement 130, wherein storing the second data in the second buffer includes accessing the second data from the storage device of the device.

Statement 132. An embodiment of the disclosure includes the article according to statement 131, wherein storing the second data in the second buffer further includes storing the second data in the second buffer via a demultiplexer.

Statement 133. An embodiment of the disclosure includes the article according to statement 130, wherein storing the second data in the second buffer includes accessing the second data from a second storage device of the device, the second buffer further connected to the second storage device of the device.

Statement 134. An embodiment of the disclosure includes the article according to statement 130, the non-transitory storage medium having stored thereon further instructions that, when executed by the machine, result in:

reading the second data from the second buffer by the network interface device; and transmitting the second data using the network interface device of the device.

Statement 135. An embodiment of the disclosure includes the article according to statement 134, wherein reading the second data from the second buffer by the network interface device includes reading the second data from the second buffer by the network interface device via a multiplexer.

Statement 136. An embodiment of the disclosure includes the article according to statement 134, the non-transitory storage medium having stored thereon further instructions that, when executed by the machine, result in:

reading the second data from the second buffer by a second network interface device of the device, the second buffer further connected to the second network interface of the device; and transmitting the second data using the second network interface device of the device.

Statement 137. An embodiment of the disclosure includes the article according to statement 97, wherein receiving the request at the device includes sending the request to the storage device of the device using a root port of the device.

Statement 138. An embodiment of the disclosure includes the article according to statement 137, wherein the storage device of the device and a second storage device of the device connect to the root port of the device.

Statement 139. An embodiment of the disclosure includes the article according to statement 97, wherein receiving the request at the device includes sending the request to the network interface device of the device using a root port of the device.

Statement 140. An embodiment of the disclosure includes the article according to statement 139, wherein the network interface device of the device and a second network interface device of the device connect to the root port of the device.

Statement 141. An embodiment of the disclosure includes an article, comprising a non-transitory storage medium, the non-transitory storage medium having stored thereon instructions that, when executed by a machine, result in:

sending a first request from a host processor to a storage device of a device, the device including the storage device and a network interface device; and sending a second request from the host processor to the network interface device of the device, wherein a data of storage device of the device is transmitted by the network interface device of the device.

Statement 142. An embodiment of the disclosure includes the article according to statement 141, wherein:

the data is read from the storage device of the device based at least in part on the first request; and the data is transmitted by the network interface device of the device based at least in part on the second request.

Statement 143. An embodiment of the disclosure includes the article according to statement 141, wherein the data of the storage device of the device is transmitted by the network interface device of the device without transferring the data to a main memory associated with the host processor.

Statement 144. An embodiment of the disclosure includes the article according to statement 141, wherein sending the first request from the host processor to the storage device of the device includes sending the second request from the host processor to the network interface device of the device.

Statement 145. An embodiment of the disclosure includes the article according to statement 141, wherein sending the first request from the host processor to the storage device of the device includes sending the first request using a first protocol from the host processor to the storage device of the device; and sending the second request from the host processor to the network interface device of the device includes sending the second request using a second protocol from the host processor to the network interface device of the device.

Statement 146. An embodiment of the disclosure includes the article according to statement 141, the non-transitory storage medium having stored thereon further instructions that, when executed by the machine, result in sending a third request from the host processor to a circuit of the device.

Statement 147. An embodiment of the disclosure includes the article according to statement 146, wherein the circuit includes a Field Programmable Gate Array (FPGA), an Application-Specific Integrated Circuit (ASIC), a System-on-a-Chip (SoC), a Graphics Processing Unit (GPU), a General Purpose GPU (GPGPU), a Tensor Processing Unit (TPU), a Neural Processing Unit (NPU), or a processor.

Statement 148. An embodiment of the disclosure includes the article according to statement 146, wherein the circuit transcodes the data from the storage device of the device for transmission by the network interface device of the device.

Statement 149. An embodiment of the disclosure includes the article according to statement 148, where the circuit transcodes the data from the storage device of the device for transmission by the network interface device of the device based at least in part on the third request.

Statement 150. An embodiment of the disclosure includes the article according to statement 141, the non-transitory storage medium having stored thereon further instructions that, when executed by the machine, result in sending a third request from the host processor to the device.

Statement 151. An embodiment of the disclosure includes the article according to statement 150, wherein the device transcodes the data from the storage device of the device for transmission by the network interface device of the device.

Statement 152. An embodiment of the disclosure includes the article according to statement 151, where the device transcodes the data from the storage device of the device for transmission by the network interface device of the device based at least in part on the third request.

Statement 153. An embodiment of the disclosure includes a multi-function device, comprising:

a first connector for communicating with a storage device;

a second connector for communicating with a first computational storage unit;

a third connector for communicating with a second computational storage unit; and a fourth connector for communicating with a host processor;

wherein the multi-function device is configured to expose the storage device and the first computational storage unit to the host processor via the fourth connector.

Statement 154. An embodiment of the disclosure includes the multi-function device according to statement 153, wherein the multi-function device does not expose the second computational storage unit to the host processor.

Statement 155. An embodiment of the disclosure includes the multi-function device according to statement 153, wherein the multi-function device is implemented using at least one of a Field Programmable Gate Array (FPGA), an Application-Specific Integrated Circuit (ASIC), a System-on-a-Chip (SoC), a Graphics Processing Unit (GPU), a General Purpose GPU (GPGPU), a Central Processing Unit (CPU), a Tensor Processing Unit (TPU), or a Neural Processing Unit (NPU).

Statement 156. An embodiment of the disclosure includes the multi-function device according to statement 153, wherein the first computational storage unit is implemented using at least one of an FPGA, an ASIC, an SoC, a GPU, a GPGPU, a CPU, a TPU, or an NPU.

Statement 157. An embodiment of the disclosure includes the multi-function device according to statement 153, wherein the second computational storage unit is implemented using at least one of an FPGA, an ASIC, an SoC, a GPU, a GPGPU, a CPU, a TPU, or an NPU.

Statement 158. An embodiment of the disclosure includes the multi-function device according to statement 153, wherein the storage device includes a Solid State Drive (SSD).

Statement 159. An embodiment of the disclosure includes the multi-function device according to statement 153, wherein the first computational storage unit includes an accelerator circuit, a Fully Homomorphic Encryption (FHE) circuit, or a network interface device.

Statement 160. An embodiment of the disclosure includes the multi-function device according to statement 153, wherein the second computational storage unit includes an accelerator circuit, an FHE circuit, or a network interface device.

Statement 161. An embodiment of the disclosure includes the multi-function device according to statement 153, wherein the storage device is configured to invoke a capability of the first computational storage unit or the second computational storage unit.

Statement 162. An embodiment of the disclosure includes the multi-function device according to statement 161, wherein the multi-function device is configured to receive a request from the storage device and send the request to the first computational storage unit or the second computational storage unit.

Statement 163. An embodiment of the disclosure includes the multi-function device according to statement 162, wherein the multi-function device is configured to receive the request from the storage device and send the request to the first computational storage unit or the second computational storage unit without sending the request to the host processor.

Statement 164. An embodiment of the disclosure includes the multi-function device according to statement 161, wherein the storage device is configured to invoke the capability of the first computational storage unit or the second computational storage unit without management by the host processor.

Statement 165. An embodiment of the disclosure includes the multi-function device according to statement 161, wherein the multi-function device is configured to receive a reply from the first computational storage unit or the second computational storage unit and send the reply to the storage device.

Statement 166. An embodiment of the disclosure includes the multi-function device according to statement 165, wherein the multi-function device is configured to receive the reply from the first computational storage unit or the second computational storage unit and send the reply to the storage device without sending the reply to the host processor.

Statement 167. An embodiment of the disclosure includes the multi-function device according to statement 153, wherein the first computational storage unit is configured to invoke a capability of the storage device or the second computational storage unit.

Statement 168. An embodiment of the disclosure includes the multi-function device according to statement 167, wherein the multi-function device is configured to receive a request from the first computational storage unit and send the request to the storage device or the second computational storage unit.

Statement 169. An embodiment of the disclosure includes the multi-function device according to statement 168, wherein the multi-function device is configured to receive the request from the first computational storage unit and send the request to the storage device or the second computational storage unit without sending the request to the host processor.

Statement 170. An embodiment of the disclosure includes the multi-function device according to statement 167, wherein the first computational storage unit is configured to invoke the capability of the storage device or the second computational storage unit without management by the host processor.

Statement 171. An embodiment of the disclosure includes the multi-function device according to statement 167, wherein the multi-function device is configured to receive a reply from the storage device or the second computational storage unit and send the reply to the first computational storage unit.

Statement 172. An embodiment of the disclosure includes the multi-function device according to statement 171, wherein the multi-function device is configured to receive the reply from the storage device or the second computational storage unit and send the reply to the first computational storage unit without sending the reply to the host processor.

Statement 173. An embodiment of the disclosure includes the multi-function device according to statement 153, wherein the second computational storage unit is configured to invoke a capability of the storage device or the first computational storage unit.

Statement 174. An embodiment of the disclosure includes the multi-function device according to statement 173, wherein the multi-function device is configured to receive a request from the second computational storage unit and send the request to the storage device or the first computational storage unit.

Statement 175. An embodiment of the disclosure includes the multi-function device according to statement 174, wherein the multi-function device is configured to receive the request from the second computational storage unit and send the request to the storage device or the first computational storage unit without sending the request to the host processor.

Statement 176. An embodiment of the disclosure includes the multi-function device according to statement 173, wherein the second computational storage unit is configured to invoke the capability of the storage device or the first computational storage unit without management by the host processor.

Statement 177. An embodiment of the disclosure includes the multi-function device according to statement 173, wherein the multi-function device is configured to receive a reply from the storage device or the first computational storage unit and send the reply to the second computational storage unit.

Statement 178. An embodiment of the disclosure includes the multi-function device according to statement 177, wherein the multi-function device is configured to receive the reply from the storage device or the first computational storage unit and send the reply to the second computational storage unit without sending the reply to the host processor.

Statement 179. An embodiment of the disclosure includes the multi-function device according to statement 153, further comprising a buffer connected to the storage device, the first computational storage unit, and the second computational storage unit.

Statement 180. An embodiment of the disclosure includes the multi-function device according to statement 179, wherein the storage device, the first computational storage unit, and the second computational storage unit are configured to access a data in the buffer.

Statement 181. An embodiment of the disclosure includes the multi-function device according to statement 179, wherein the buffer includes an address range.

Statement 182. An embodiment of the disclosure includes the multi-function device according to statement 181, wherein the host processor determines the address range of the buffer.

Statement 183. An embodiment of the disclosure includes the multi-function device according to statement 179, wherein the storage device is configured to access the buffer using a protocol.

Statement 184. An embodiment of the disclosure includes the multi-function device according to statement 183, wherein the protocol includes at least one of a File Read protocol, a File Write protocol, a Direct Memory Access (DMA) protocol, or a Non-Volatile Memory Express (NVMe) protocol.

Statement 185. An embodiment of the disclosure includes the multi-function device according to statement 179, wherein the first computational storage unit is configured to access the buffer using a protocol.

Statement 186. An embodiment of the disclosure includes the multi-function device according to statement 185, wherein the protocol includes at least one of a File Read protocol, a File Write protocol, a Direct Memory Access (DMA) protocol, or a Non-Volatile Memory Express (NVMe) protocol.

Statement 187. An embodiment of the disclosure includes the multi-function device according to statement 179, wherein the second computational storage unit is configured to access the buffer using a protocol.

Statement 188. An embodiment of the disclosure includes the multi-function device according to statement 187, wherein the protocol includes at least one of a File Read protocol, a File Write protocol, a Direct Memory Access (DMA) protocol, or a Non-Volatile Memory Express (NVMe) protocol.

Statement 189. An embodiment of the disclosure includes the multi-function device according to statement 179, further comprising a data processor connected to the buffer, the data processor configured to process a data in the buffer.

Statement 190. An embodiment of the disclosure includes the multi-function device according to statement 189, wherein the data processor is configured to process the data in the buffer based at least in part on a request from at least one of the host processor, the storage device, the first computational storage unit, or the second computational storage unit.

Statement 191. An embodiment of the disclosure includes the multi-function device according to statement 190, wherein:

the data processor is configured to expose a function;

the request is from the host processor; and the request triggers the function of the data processor.

Statement 192. An embodiment of the disclosure includes the multi-function device according to statement 191, wherein the function includes a Peripheral Component Interconnect Express (PCIe) function.

Statement 193. An embodiment of the disclosure includes the multi-function device according to statement 192, wherein the PCIe function includes a first physical function (PF) or a first virtual function (VF).

Statement 194. An embodiment of the disclosure includes the multi-function device according to statement 191, wherein:

the multi-function device is configured to expose a second function to the host processor via the fourth connector;

the multi-function device is configured to receive the request from the host processor via the fourth connector; and the multi-function device triggers the function of the data processor.

Statement 195. An embodiment of the disclosure includes the multi-function device according to statement 194, wherein:

the request includes the second function; and the multi-function device is configured to map the second function to the function of the data processor.

Statement 196. An embodiment of the disclosure includes the multi-function device according to statement 153, further comprising:

a first bridge connecting the fourth connector and the first connector; and a second bridge connecting the fourth connector and the second connector.

Statement 197. An embodiment of the disclosure includes the multi-function device according to statement 196, wherein:

the first bridge supports pass-through of a first request between the host processor and the storage device; and the second bridge supports pass-through of a second request between the host processor and the first computational storage unit.

Statement 198. An embodiment of the disclosure includes the multi-function device according to statement 196, further comprising a third bridge connecting the fourth connector and the third connector.

Statement 199. An embodiment of the disclosure includes the multi-function device according to statement 198, wherein the third bridge supports pass-through of a request between the host processor and the second computational storage unit.

Statement 200. An embodiment of the disclosure includes the multi-function device according to statement 196, wherein:

the storage device is configured to expose a first function to the multi-function device via the first connector;

the first computational storage unit is configured to expose a second function to the multi-function device via the second connector;

the second computational storage unit is configured to expose a third function to the multi-function device via the third connector;

the multi-function device is configured to expose a fourth function and a fifth function to the host processor via the fourth connector;

the first bridge is configured to map a first request using the fourth function to a second request using the first function;

the second bridge is configured to map a third request using the fifth function to a fourth request using the second function; and a third bridge is configured to map a fifth request using a sixth function to a sixth request using the third function.

Statement 201. An embodiment of the disclosure includes the multi-function device according to statement 200, wherein:

the multi-function device is configured to direct the first request to the first bridge;

the multi-function device is configured to direct the third request to the second bridge; and the multi-function device is configured to direct the fifth request to the third bridge.

Statement 202. An embodiment of the disclosure includes the multi-function device according to statement 201, wherein:

the multi-function device is configured to receive the first request from the host processor, the first computational storage unit, or the second computational storage unit;

the multi-function device is configured to receive the third request from the host processor, the storage device, or the second computational storage unit; and the multi-function device is configured to receive the fifth request from storage device or the first computational storage unit.

Statement 203. An embodiment of the disclosure includes the multi-function device according to statement 200, wherein:

the multi-function device is configured to expose the fourth function to the first computational storage unit via the second connector and to the second computational storage unit via the third connector;

the multi-function device is configured to expose the fifth function to the storage device via the first connector and to the second computational storage unit via the third connector; and the multi-function device is configured to expose the sixth function to the storage device via the first connector and to the first computational storage unit via the second connector.

Statement 204. An embodiment of the disclosure includes the multi-function device according to statement 200, wherein the multi-function device is configured not to expose the sixth function to the host processor via the fourth connector.

Statement 205. An embodiment of the disclosure includes the multi-function device according to statement 196, further comprising:

a third bridge connecting the fourth connector and the third connector; and a buffer connected to the first bridge, the second bridge, and the third bridge.

Statement 206. An embodiment of the disclosure includes the multi-function device according to statement 205, wherein the first bridge is configured to receive a request sent from the storage device and direct the request to the buffer.

Statement 207. An embodiment of the disclosure includes the multi-function device according to statement 206, wherein the request is sent from the storage device to the host processor.

Statement 208. An embodiment of the disclosure includes the multi-function device according to statement 206, wherein the storage device is agnostic to the first bridge redirecting the request to the buffer.

Statement 209. An embodiment of the disclosure includes the multi-function device according to statement 206, wherein the first bridge is configured to direct the request to the buffer based at least in part on an address, the request including the address.

Statement 210. An embodiment of the disclosure includes the multi-function device according to statement 209, wherein the buffer includes an address range including the address.

Statement 211. An embodiment of the disclosure includes the multi-function device according to statement 205, wherein the second bridge is configured to receive a request sent from the first computational storage unit and direct the request to the buffer.

Statement 212. An embodiment of the disclosure includes the multi-function device according to statement 211, wherein the request is sent from the first computational storage unit to the host processor.

Statement 213. An embodiment of the disclosure includes the multi-function device according to statement 211, wherein the first computational storage unit is agnostic to the second bridge redirecting the request to the buffer.

Statement 214. An embodiment of the disclosure includes the multi-function device according to statement 211, wherein the second bridge is configured to direct the request to the buffer based at least in part on an address, the request including the address.

Statement 215. An embodiment of the disclosure includes the multi-function device according to statement 214, wherein the buffer includes an address range including the address.

Statement 216. An embodiment of the disclosure includes the multi-function device according to statement 205, wherein the third bridge is configured to receive a request sent from the second computational storage unit and direct the request to the buffer.

Statement 217. An embodiment of the disclosure includes the multi-function device according to statement 216, wherein the second computational storage unit is agnostic to the third bridge redirecting the request to the buffer.

Statement 218. An embodiment of the disclosure includes the multi-function device according to statement 216, wherein the third bridge is configured to direct the request to the buffer based at least in part on an address, the request including the address.

Statement 219. An embodiment of the disclosure includes the multi-function device according to statement 218, wherein the buffer includes an address range including the address.

Statement 220. An embodiment of the disclosure includes the multi-function device according to statement 153, further comprising a storage for a list of device configurations.

Statement 221. An embodiment of the disclosure includes the multi-function device according to statement 220, wherein the list of device configurations includes a first entry for the storage device, a second entry for the first computational storage unit, and a third entry for the second computational storage unit.

Statement 222. An embodiment of the disclosure includes the multi-function device according to statement 220, wherein the storage includes a persistent storage.

Statement 223. An embodiment of the disclosure includes the multi-function device according to statement 220, wherein the multi-function device is configured to expose the storage device and the first computational storage unit to the host processor based at least in part on the list of device configurations.

Statement 224. An embodiment of the disclosure includes the multi-function device according to statement 220, wherein the multi-function device is configured not to expose the second computational storage unit to the host processor based at least in part on the list of device configurations.

Statement 225. An embodiment of the disclosure includes the multi-function device according to statement 220, wherein the multi-function device is configured to detect a device connected to at least one of the second connector or the third connector, determine a configuration of the device, and update the list of device configurations based at least in part on the configuration of the device.

Statement 226. An embodiment of the disclosure includes the multi-function device according to statement 225, wherein the device includes a second storage device, a third computational storage unit, a FHE circuit, or a network interface device.

Statement 227. An embodiment of the disclosure includes the multi-function device according to statement 220, wherein the multi-function device is configured to determine the configuration of the device and update the list of device configurations based at least in part on the list of configurations omitting a configuration of the device.

Statement 228. An embodiment of the disclosure includes the multi-function device according to statement 153, wherein the storage device is replaceable.

Statement 229. An embodiment of the disclosure includes the multi-function device according to statement 153, wherein the first computational storage unit is replaceable.

Statement 230. An embodiment of the disclosure includes the multi-function device according to statement 153, wherein the second computational storage unit is replaceable.

Statement 231. An embodiment of the disclosure includes the multi-function device according to statement 153, wherein:

the first connector includes a first PCIe port;

the second connector includes a second PCIe port;

the third connector includes a third PCIe port; and the fourth connector includes a fourth PCIe port.

Statement 232. An embodiment of the disclosure includes the multi-function device according to statement 231, wherein:

the first PCIe port includes a first root port;

the second PCIe port includes a second root port;

the third PCIe port includes a third root port; and the fourth PCIe port includes an endpoint.

Statement 233. An embodiment of the disclosure includes the multi-function device according to statement 153, wherein:

the storage device is configured to expose a first PCIe function to the multi-function device via the first connector;

the first computational storage unit is configured to expose a second PCIe function to the multi-function device via the second connector;

the second computational storage unit is configured to expose a third PCIe function to the multi-function device via the third connector; and the multi-function device is configured to expose a fourth PCIe function to the host processor via the fourth connector.

Statement 234. An embodiment of the disclosure includes the multi-function device according to statement 233, wherein:

the first PCIe function includes a first PF or a first VF;

the second PCIe function includes a second PF or a second VF;

the third PCIe function includes a third PF or a third VF;

the fourth PCIe function includes a fourth PF or a fourth VF.

Statement 235. An embodiment of the disclosure includes the multi-function device according to statement 153, wherein the first connector supports at least one of an Ethernet protocol, a Transmission Control Protocol/Internet Protocol (TCP/IP) protocol, a Remote DMA (RDMA) protocol, an NVMe protocol, an NVMe over Fabrics (NVMe-oF) protocol, a Universal Flash Storage (UFS) protocol, an embedded MultiMediaCard (eMMC) protocol, a Serial Attached Small Computer System Interface (SCSI) (SAS) protocol, or a Serial AT Attachment (SATA) protocol.

Statement 236. An embodiment of the disclosure includes the multi-function device according to statement 153, wherein the second connector supports at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 237. An embodiment of the disclosure includes the multi-function device according to statement 153, wherein the third connector supports at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 238. An embodiment of the disclosure includes the multi-function device according to statement 153, wherein the fourth connector supports at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 239. An embodiment of the disclosure includes a multi-function device, comprising:

a first connector for communicating with a storage device;

a first computational storage unit integrated into the multi-function device;

a second connector for communicating with a second computational storage unit; and a third connector for communicating with a host processor;

wherein the multi-function device is configured to expose the storage device and at least one of the first computational storage unit or the second computational storage unit to the host processor via the third connector.

Statement 240. An embodiment of the disclosure includes the multi-function device according to statement 239, wherein the multi-function device does not expose at least one of the first computational storage unit or the second computational storage unit to the host processor.

Statement 241. An embodiment of the disclosure includes the multi-function device according to statement 239, wherein the multi-function device is implemented using at least one of a Field Programmable Gate Array (FPGA), an Application-Specific Integrated Circuit (ASIC), a System-on-a-Chip (SoC), a Graphics Processing Unit (GPU), a General Purpose GPU (GPGPU), a Central Processing Unit (CPU), a Tensor Processing Unit (TPU), or a Neural Processing Unit (NPU).

Statement 242. An embodiment of the disclosure includes the multi-function device according to statement 239, wherein the second computational storage unit is implemented using at least one of an FPGA, an ASIC, an SoC, a GPU, a GPGPU, a CPU, a TPU, or an NPU.

Statement 243. An embodiment of the disclosure includes the multi-function device according to statement 239, wherein the storage device is configured to invoke a capability of the first computational storage unit or the second computational storage unit.

Statement 244. An embodiment of the disclosure includes the multi-function device according to statement 243, wherein the multi-function device is configured to receive a request from the storage device and send the request to the first computational storage unit or the second computational storage unit.

Statement 245. An embodiment of the disclosure includes the multi-function device according to statement 244, wherein the multi-function device is configured to receive the request from the storage device and send the request to the first computational storage unit or the second computational storage unit without sending the request to the host processor.

Statement 246. An embodiment of the disclosure includes the multi-function device according to statement 243, wherein the storage device is configured to invoke the capability of the first computational storage unit or the second computational storage unit without management by the host processor.

Statement 247. An embodiment of the disclosure includes the multi-function device according to statement 243, wherein the multi-function device is configured to receive a reply from the first computational storage unit or the second computational storage unit and send the reply to the storage device.

Statement 248. An embodiment of the disclosure includes the multi-function device according to statement 247, wherein the multi-function device is configured to receive the reply from the first computational storage unit or the second computational storage unit and send the reply to the storage device without sending the reply to the host processor.

Statement 249. An embodiment of the disclosure includes the multi-function device according to statement 239, wherein the first computational storage unit is configured to invoke a capability of the storage device or the second computational storage unit.

Statement 250. An embodiment of the disclosure includes the multi-function device according to statement 249, wherein the multi-function device is configured to receive a request from the first computational storage unit and send the request to the storage device or the second computational storage unit.

Statement 251. An embodiment of the disclosure includes the multi-function device according to statement 250, wherein the multi-function device is configured to receive the request from the first computational storage unit and send the request to the storage device or the second computational storage unit without sending the request to the host processor.

Statement 252. An embodiment of the disclosure includes the multi-function device according to statement 249, wherein the first computational storage unit is configured to invoke the capability of the storage device or the second computational storage unit without management by the host processor.

Statement 253. An embodiment of the disclosure includes the multi-function device according to statement 249, wherein the multi-function device is configured to receive a reply from the storage device or the second computational storage unit and send the reply to the first computational storage unit.

Statement 254. An embodiment of the disclosure includes the multi-function device according to statement 253, wherein the multi-function device is configured to receive the reply from the storage device or the second computational storage unit and send the reply to the first computational storage unit without sending the reply to the host processor.

Statement 255. An embodiment of the disclosure includes the multi-function device according to statement 239, wherein the second computational storage unit is configured to invoke a capability of the storage device or the first computational storage unit.

Statement 256. An embodiment of the disclosure includes the multi-function device according to statement 255, wherein the multi-function device is configured to receive a request from the second computational storage unit and send the request to the storage device or the first computational storage unit.

Statement 257. An embodiment of the disclosure includes the multi-function device according to statement 256, wherein the multi-function device is configured to receive the request from the second computational storage unit and send the request to the storage device or the first computational storage unit without sending the request to the host processor.

Statement 258. An embodiment of the disclosure includes the multi-function device according to statement 255, wherein the second computational storage unit is configured to invoke the capability of the storage device or the first computational storage unit without management by the host processor.

Statement 259. An embodiment of the disclosure includes the multi-function device according to statement 255, wherein the multi-function device is configured to receive a reply from the storage device or the first computational storage unit and send the reply to the second computational storage unit.

Statement 260. An embodiment of the disclosure includes the multi-function device according to statement 259, wherein the multi-function device is configured to receive the reply from the storage device or the first computational storage unit and send the reply to the second computational storage unit without sending the reply to the host processor.

Statement 261. An embodiment of the disclosure includes the multi-function device according to statement 239, wherein the storage device includes a Solid State Drive (SSD).

Statement 262. An embodiment of the disclosure includes the multi-function device according to statement 239, wherein the first computational storage unit includes an accelerator circuit, a Fully Homomorphic Encryption (FHE) circuit, or a network interface device.

Statement 263. An embodiment of the disclosure includes the multi-function device according to statement 239, wherein the second computational storage unit includes an accelerator circuit, a Fully Homomorphic Encryption (FHE) circuit, or a network interface device.

Statement 264. An embodiment of the disclosure includes the multi-function device according to statement 239, further comprising a buffer connected to the storage device, the first computational storage unit, and the second computational storage unit.

Statement 265. An embodiment of the disclosure includes the multi-function device according to statement 264, wherein the storage device, the first computational storage unit, and the second computational storage unit are configured to access a data in the buffer.

Statement 266. An embodiment of the disclosure includes the multi-function device according to statement 264, wherein the buffer includes an address range.

Statement 267. An embodiment of the disclosure includes the multi-function device according to statement 266, wherein the host processor determines the address range of the buffer.

Statement 268. An embodiment of the disclosure includes the multi-function device according to statement 264, wherein the storage device is configured to access the buffer using a protocol.

Statement 269. An embodiment of the disclosure includes the multi-function device according to statement 268, wherein the protocol includes at least one of a File Read protocol, a File Write protocol, a Direct Memory Access (DMA) protocol, or a Non-Volatile Memory Express (NVMe) protocol.

Statement 270. An embodiment of the disclosure includes the multi-function device according to statement 264, wherein the first computational storage unit is configured to access the buffer using a protocol.

Statement 271. An embodiment of the disclosure includes the multi-function device according to statement 270, wherein the protocol includes at least one of a File Read protocol, a File Write protocol, a Direct Memory Access (DMA) protocol, or a Non-Volatile Memory Express (NVMe) protocol.

Statement 272. An embodiment of the disclosure includes the multi-function device according to statement 264, wherein the second computational storage unit is configured to access the buffer using a protocol.

Statement 273. An embodiment of the disclosure includes the multi-function device according to statement 272, wherein the protocol includes at least one of a File Read protocol, a File Write protocol, a Direct Memory Access (DMA) protocol, or a Non-Volatile Memory Express (NVMe) protocol.

Statement 274. An embodiment of the disclosure includes the multi-function device according to statement 264, further comprising a data processor connected to the buffer, the data processor configured to process a data in the buffer.

Statement 275. An embodiment of the disclosure includes the multi-function device according to statement 274, wherein the data processor is configured to process the data in the buffer based at least in part on a request from at least one of the host processor, the storage device, the first computational storage unit, or the second computational storage unit.

Statement 276. An embodiment of the disclosure includes the multi-function device according to statement 275, wherein:

the data processor is configured to expose a function;

the request is from the host processor; and the request triggers the function of the data processor.

Statement 277. An embodiment of the disclosure includes the multi-function device according to statement 276, wherein the function includes a Peripheral Component Interconnect Express (PCIe) function.

Statement 278. An embodiment of the disclosure includes the multi-function device according to statement 277, wherein the PCIe function includes a first physical function (PF) or a first virtual function (VF).

Statement 279. An embodiment of the disclosure includes the multi-function device according to statement 276, wherein:

the multi-function device is configured to expose a second function to the host processor via the third connector;

the multi-function device is configured to receive the request from the host processor via the third connector; and the multi-function device triggers the function of the data processor.

Statement 280. An embodiment of the disclosure includes the multi-function device according to statement 279, wherein:

the request includes the second function; and the multi-function device is configured to map the second function to the function of the data processor.

Statement 281. An embodiment of the disclosure includes the multi-function device according to statement 239, further comprising:

a first bridge connecting the third connector and the first connector; and a second bridge connecting the third connector and the second connector.

Statement 282. An embodiment of the disclosure includes the multi-function device according to statement 281, wherein:

the first bridge supports pass-through of a first request between the host processor and the storage device; and the second bridge supports pass-through of a second request between the host processor and the second computational storage unit.

Statement 283. An embodiment of the disclosure includes the multi-function device according to statement 281, wherein:

the storage device is configured to expose a first function to the multi-function device via the first connector;

the first computational storage unit is configured to expose a second function;

the second computational storage unit is configured to expose a third function to the multi-function device via the second connector;

the multi-function device is configured to expose a fourth function to the host processor via the third connector;

the first bridge is configured to map a first request using the fourth function to a second request using the first function;

the second bridge is configured to map a third request using a fifth function to a fourth request using the third function.

Statement 284. An embodiment of the disclosure includes the multi-function device according to statement 283, wherein the multi-function device is configured to expose the fifth function to the host processor via the third connector.

Statement 285. An embodiment of the disclosure includes the multi-function device according to statement 284, wherein the multi-function device does not expose the second function to the host processor via the third connector.

Statement 286. An embodiment of the disclosure includes the multi-function device according to statement 283, wherein the multi-function device is configured to expose the second function to the host processor via the third connector.

Statement 287. An embodiment of the disclosure includes the multi-function device according to statement 286, wherein the multi-function device does not expose the fifth function to the host via the third connector.

Statement 288. An embodiment of the disclosure includes the multi-function device according to statement 283, wherein:

the multi-function device is configured to direct the first request to the first bridge;

the multi-function device is configured to direct the third request to the second bridge; and the multi-function device is configured to direct a fifth request to the first computational storage unit.

Statement 289. An embodiment of the disclosure includes the multi-function device according to statement 288, wherein the multi-function device is configured to receive the first request from the host processor, the first computational storage unit, or the second computational storage unit.

Statement 290. An embodiment of the disclosure includes the multi-function device according to statement 288, wherein the multi-function device is configured to receive the third request from the host processor, the storage device, or the first computational storage unit.

Statement 291. An embodiment of the disclosure includes the multi-function device according to statement 288, wherein the multi-function device is configured to receive the third request from the storage device or the first computational storage unit.

Statement 292. An embodiment of the disclosure includes the multi-function device according to statement 288, wherein the multi-function device is configured to receive the fifth request from the host processor, the storage device, or the second computational storage unit.

Statement 293. An embodiment of the disclosure includes the multi-function device according to statement 288, wherein the multi-function device is configured to receive the fifth request from the storage device or the second computational storage unit.

Statement 294. An embodiment of the disclosure includes the multi-function device according to statement 283, wherein:

the multi-function device is configured to expose the fourth function to the second computational storage unit via the second connector and to the first computational storage unit;

the multi-function device is configured to expose the second function to the storage device via the first connector and to the second computational storage unit via the second connector; and the multi-function device is configured to expose the fifth function to the storage device via the first connector and to the first computational storage unit.

Statement 295. An embodiment of the disclosure includes the multi-function device according to statement 281, further comprising a buffer connected to the first bridge, the second bridge, and the first computational storage unit.

Statement 296. An embodiment of the disclosure includes the multi-function device according to statement 295, wherein the first bridge is configured to receive a request sent from the storage device and direct the request to the buffer.

Statement 297. An embodiment of the disclosure includes the multi-function device according to statement 296, wherein the request is sent from the storage device to the host processor.

Statement 298. An embodiment of the disclosure includes the multi-function device according to statement 296, wherein the storage device is agnostic to the first bridge redirecting the request to the buffer.

Statement 299. An embodiment of the disclosure includes the multi-function device according to statement 296, wherein the first bridge is configured to direct the request to the buffer based at least in part on an address, the request including the address.

Statement 300. An embodiment of the disclosure includes the multi-function device according to statement 299, wherein the buffer includes an address range including the address.

Statement 301. An embodiment of the disclosure includes the multi-function device according to statement 295, wherein the second bridge is configured to receive a request sent from the second computational storage unit and direct the request to the buffer.

Statement 302. An embodiment of the disclosure includes the multi-function device according to statement 301, wherein the request is sent from the second computational storage unit to the host processor.

Statement 303. An embodiment of the disclosure includes the multi-function device according to statement 301, wherein the second computational storage unit is agnostic to the second bridge redirecting the request to the buffer.

Statement 304. An embodiment of the disclosure includes the multi-function device according to statement 301, wherein the second bridge is configured to direct the request to the buffer based at least in part on an address, the request including the address.

Statement 305. An embodiment of the disclosure includes the multi-function device according to statement 304, wherein the buffer includes an address range including the address.

Statement 306. An embodiment of the disclosure includes the multi-function device according to statement 295, wherein the multi-function device is configured to receive a request sent from the first computational storage unit and direct the request to the buffer.

Statement 307. An embodiment of the disclosure includes the multi-function device according to statement 306, wherein the first computational storage unit is agnostic to the multi-function device redirecting the request to the buffer.

Statement 308. An embodiment of the disclosure includes the multi-function device according to statement 306, wherein the multi-function device is configured to direct the request to the buffer based at least in part on an address, the request including the address.

Statement 309. An embodiment of the disclosure includes the multi-function device according to statement 308, wherein the buffer includes an address range including the address.

Statement 310. An embodiment of the disclosure includes the multi-function device according to statement 239, further comprising a storage for a list of device configurations.

Statement 311. An embodiment of the disclosure includes the multi-function device according to statement 310, wherein the storage includes a persistent storage.

Statement 312. An embodiment of the disclosure includes the multi-function device according to statement 310, wherein the multi-function device is configured to expose the storage device and the first computational storage unit to the host processor based at least in part on the list of device configurations.

Statement 313. An embodiment of the disclosure includes the multi-function device according to statement 310, wherein the multi-function device is configured not to expose the second computational storage unit to the host processor based at least in part on the list of device configurations.

Statement 314. An embodiment of the disclosure includes the multi-function device according to statement 310, wherein the multi-function device is configured to expose the storage device and the second computational storage unit to the host processor based at least in part on the list of device configurations.

Statement 315. An embodiment of the disclosure includes the multi-function device according to statement 310, wherein the multi-function device is configured not to expose the first computational storage unit to the host processor based at least in part on the list of device configurations.

Statement 316. An embodiment of the disclosure includes the multi-function device according to statement 310, wherein the multi-function device is configured to detect a device connected to the second connector, determine a configuration of the device, and update the list of device configurations based at least in part on the configuration of the device.

Statement 317. An embodiment of the disclosure includes the multi-function device according to statement 316, wherein the device includes a second storage device, a third computational storage unit, a FHE circuit, or a network interface device.

Statement 318. An embodiment of the disclosure includes the multi-function device according to statement 310, wherein the multi-function device is configured to determine the configuration of the device and update the list of device configurations based at least in part on the list of configurations omitting a configuration of the device.

Statement 319. An embodiment of the disclosure includes the multi-function device according to statement 239, wherein the storage device is replaceable.

Statement 320. An embodiment of the disclosure includes the multi-function device according to statement 239, wherein the second computational storage unit is replaceable.

Statement 321. An embodiment of the disclosure includes the multi-function device according to statement 239, wherein:

the first connector includes a first PCIe port;

the second connector includes a second PCIe port;

the third connector includes a third PCIe port.

Statement 322. An embodiment of the disclosure includes the multi-function device according to statement 321, wherein:

the first PCIe port includes a first root port;

the second PCIe port includes a second root port; and the third PCIe port includes an endpoint.

Statement 323. An embodiment of the disclosure includes the multi-function device according to statement 239, wherein:

the storage device is configured to expose a first PCIe function to the multi-function device via the first connector;

the first computational storage unit is configured to expose a second PCIe function to the multi-function device;

the second computational storage unit is configured to expose a third PCIe function to the multi-function device via the second connector; and the multi-function device is configured to expose a fourth PCIe function to the host processor via the third connector.

Statement 324. An embodiment of the disclosure includes the multi-function device according to statement 323, wherein:

the first PCIe function includes a first PF or a first VF;

the second PCIe function includes a second PF or a second VF;

the third PCIe function includes a third PF or a third VF;

the fourth PCIe function includes a fourth PF or a fourth VF.

Statement 325. An embodiment of the disclosure includes the multi-function device according to statement 239, wherein the first connector supports at least one of an Ethernet protocol, a Transmission Control Protocol/Internet Protocol (TCP/IP) protocol, a Remote DMA (RDMA) protocol, an NVMe protocol, an NVMe over Fabrics (NVMe-oF) protocol, a Universal Flash Storage (UFS) protocol, an embedded MultiMediaCard (eMMC) protocol, a Serial Attached Small Computer System Interface (SCSI) (SAS) protocol, or a Serial AT Attachment (SATA) protocol.

Statement 326. An embodiment of the disclosure includes the multi-function device according to statement 239, wherein the second connector supports at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 327. An embodiment of the disclosure includes the multi-function device according to statement 239, wherein the third connector supports at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 328. An embodiment of the disclosure includes a method, comprising:

determining that a storage device is connected to a multi-function device;

determining that a first computational storage unit is available;

determining that a second computational storage unit is connected to the multi-function device;

exposing the storage device to a host processor connected to the multi-function device; and selectively exposing the first computational storage unit and the second computational storage unit to the host processor.

Statement 329. An embodiment of the disclosure includes the method according to statement 328, wherein the multi-function device is implemented using at least one of a Field Programmable Gate Array (FPGA), an Application-Specific Integrated Circuit (ASIC), a System-on-a-Chip (SoC), a Graphics Processing Unit (GPU), a General Purpose GPU (GPGPU), a Central Processing Unit (CPU), a Tensor Processing Unit (TPU), or a Neural Processing Unit (NPU).

Statement 330. An embodiment of the disclosure includes the method according to statement 328, wherein the first computational storage unit is implemented using at least one of an FPGA, an ASIC, an SoC, a GPU, a GPGPU, a CPU, a TPU, or an NPU.

Statement 331. An embodiment of the disclosure includes the method according to statement 328, wherein the second computational storage unit is implemented using at least one of an FPGA, an ASIC, an SoC, a GPU, a GPGPU, a CPU, a TPU, or an NPU.

Statement 332. An embodiment of the disclosure includes the method according to statement 328, wherein the storage device includes a Solid State Drive (SSD).

Statement 333. An embodiment of the disclosure includes the method according to statement 328, wherein the first computational storage unit includes an accelerator circuit, a Fully Homomorphic Encryption (FHE) circuit, or a network interface device.

Statement 334. An embodiment of the disclosure includes the method according to statement 328, wherein the second computational storage unit includes an accelerator circuit, an FHE circuit, or a network interface device.

Statement 335. An embodiment of the disclosure includes the method according to statement 328, wherein determining that the first computational storage unit is available includes determining that the first computational storage unit is connected to the multi-function device.

Statement 336. An embodiment of the disclosure includes the method according to statement 335, wherein determining that the first computational storage unit is connected to the multi-function device includes determining that the first computational storage unit is connected to the multi-function device via a connector.

Statement 337. An embodiment of the disclosure includes the method according to statement 328, wherein determining that the first computational storage unit is available includes determining that the first computational storage unit is integrated into the multi-function device.

Statement 338. An embodiment of the disclosure includes the method according to statement 328, wherein determining that the storage device is connected to the multi-function device includes determining that the storage device is connected to the multi-function device via a first connector; and determining that the second computational storage unit is connected to the multi-function device includes determining that the second computational storage unit is connected to the multi-function device via a second connector.

Statement 339. An embodiment of the disclosure includes the method according to statement 328, wherein selectively exposing the first computational storage unit and the second computational storage unit to a host processor connected to the multi-function device includes:

exposing the first computational storage unit to the host processor; and not exposing the second computational storage unit to the host processor.

Statement 340. An embodiment of the disclosure includes the method according to statement 328, further comprising:

receiving a request at the multi-function device from the storage device to invoke a capability of the first computational storage unit or the second computational storage unit; and sending the request to the first computational storage unit or the second computational storage unit.

Statement 341. An embodiment of the disclosure includes the method according to statement 340, wherein sending the request to the first computational storage unit or the second computational storage unit includes sending the request to the first computational storage unit or the second computational storage unit without sending the request to the host processor.

Statement 342. An embodiment of the disclosure includes the method according to statement 340, wherein sending the request to the first computational storage unit or the second computational storage unit includes sending the request to the first computational storage unit or the second computational storage unit without management by the host processor.

Statement 343. An embodiment of the disclosure includes the method according to statement 340, further comprising:

receiving a reply at the multi-function device from the first computational storage unit or the second computational storage unit; and sending the reply to the storage device.

Statement 344. An embodiment of the disclosure includes the method according to statement 343, wherein sending the reply to the storage device includes sending the reply to the storage device without sending the reply to the host processor.

Statement 345. An embodiment of the disclosure includes the method according to statement 328, further comprising:

receiving a request at the multi-function device from the first computational storage unit to invoke a capability of the storage device or the second computational storage unit; and sending the request to the storage device or the second computational storage unit.

Statement 346. An embodiment of the disclosure includes the method according to statement 345, wherein sending the request to the storage device or the second computational storage unit includes sending the request to the storage device or the second computational storage unit without sending the request to the host processor.

Statement 347. An embodiment of the disclosure includes the method according to statement 345, wherein sending the request to the storage device or the second computational storage unit includes sending the request to the storage device or the second computational storage unit without management by the host processor.

Statement 348. An embodiment of the disclosure includes the method according to statement 345, further comprising:

receiving a reply at the multi-function device from the storage device or the second computational storage unit; and sending the reply to the first computational storage unit.

Statement 349. An embodiment of the disclosure includes the method according to statement 348, wherein sending the reply to the first computational storage unit includes sending the reply to the first computational storage unit without sending the reply to the host processor.

Statement 350. An embodiment of the disclosure includes the method according to statement 328, further comprising:

receiving a request at the multi-function device from the second computational storage unit to invoke a capability of the storage device or the first computational storage unit; and sending the request to the storage device or the first computational storage unit.

Statement 351. An embodiment of the disclosure includes the method according to statement 350, wherein sending the request to the storage device or the first computational storage unit includes sending the request to the storage device or the first computational storage unit without sending the request to the host processor.

Statement 352. An embodiment of the disclosure includes the method according to statement 350, wherein sending the request to the storage device or the first computational storage unit includes sending the request to the storage device or the first computational storage unit without management by the host processor.

Statement 353. An embodiment of the disclosure includes the method according to statement 350, further comprising:

receiving a reply at the multi-function device from the storage device or the first computational storage unit; and sending the reply to the second computational storage unit.

Statement 354. An embodiment of the disclosure includes the method according to statement 353, wherein sending the reply to the second computational storage unit includes sending the reply to the second computational storage unit without sending the reply to the host processor.

Statement 355. An embodiment of the disclosure includes the method according to statement 328, further comprising:

accessing a data in a buffer in the multi-function device by the storage device; and accessing the data in the buffer in the multi-function device by the first computational storage unit.

Statement 356. An embodiment of the disclosure includes the method according to statement 355, further comprising:

accessing the data in the buffer in the multi-function device by the second computational storage unit.

Statement 357. An embodiment of the disclosure includes the method according to statement 355, wherein:

the buffer includes an address range; and the method further comprises determining the address range of the buffer from the host processor.

Statement 358. An embodiment of the disclosure includes the method according to statement 355, wherein:

accessing the data in the buffer in the multi-function device by the storage device includes accessing the data in the buffer in the multi-function device by the storage device using a first protocol; and accessing the data in the buffer in the multi-function device by the first computational storage unit includes accessing the data in the buffer in the multi-function device by the first computational storage unit using a second protocol.

Statement 359. An embodiment of the disclosure includes the method according to statement 358, wherein:

the first protocol includes at least one of a File Read protocol, a File Write protocol, a Direct Memory Access (DMA) protocol, or a Non-Volatile Memory Express (NVMe) protocol; and the second protocol includes at least one of the File Read protocol, the File Write protocol, the DMA protocol, or the NVMe protocol.

Statement 360. An embodiment of the disclosure includes the method according to statement 358, further comprising accessing the data in the buffer in the multi-function device by the second computational storage unit using a third protocol.

Statement 361. An embodiment of the disclosure includes the method according to statement 360, wherein the third protocol includes at least one of the File Read protocol, the File Write protocol, the DMA protocol, or the NVMe protocol.

Statement 362. An embodiment of the disclosure includes the method according to statement 355, further comprising processing the data in the buffer using a data processor of the multi-function device.

Statement 363. An embodiment of the disclosure includes the method according to statement 362, wherein processing the data in the buffer using the data processor of the multi-function device includes processing the data in the buffer using the data processor of the multi-function device based at least in part on a request from one of the host processor, the storage device, the first computational storage unit, or the second computational storage unit.

Statement 364. An embodiment of the disclosure includes the method according to statement 363, wherein:

the method further comprises:

determining that a function is exposed by the data processor; and exposing the function by the multi-function device; and processing the data in the buffer using the data processor of the multi-function device based at least in part on a request from one of the host processor, the storage device, the first computational storage unit, or the second computational storage unit includes receiving the request from at least one of the host processor, the storage device, the first computational storage unit, or the second computational storage unit, the request triggering the function.

Statement 365. An embodiment of the disclosure includes the method according to statement 364, wherein determining that the function is exposed by the data processor includes determining that a Peripheral Component Interconnect Express (PCIe) function is exposed by the data processor.

Statement 366. An embodiment of the disclosure includes the method according to statement 365, wherein the PCIe function includes a first physical function (PF) or a first virtual function (VF).

Statement 367. An embodiment of the disclosure includes the method according to statement 363, wherein:

the method further comprises:

determining that a function is exposed by the data processor; and exposing a second function by the multi-function device; and processing the data in the buffer using the data processor of the multi-function device based at least in part on a request from one of the host processor, the storage device, the first computational storage unit, or the second computational storage unit includes:

receiving the request from at least one of the host processor, the storage device, the first computational storage unit, or the second computational storage unit, the request triggering the second function; and triggering the function of the data processor.

Statement 368. An embodiment of the disclosure includes the method according to statement 367, wherein triggering the function of the data processor includes mapping the second function to the function of the data processor.

Statement 369. An embodiment of the disclosure includes the method according to statement 328, further comprising:

receiving a request from the host processor, the storage device, the first computational storage unit, or the second computational storage unit at a bridge of the multi-function device; and passing the request through the bridge to the host processor, the storage device, the first computational storage unit, or the second computational storage unit.

Statement 370. An embodiment of the disclosure includes the method according to statement 328, further comprising:

receiving a request from the host processor, the storage device, the first computational storage unit, or the second computational storage unit at a bridge of the multi-function device, the request triggering a function exposed by the storage device, the first computational storage unit, or the second computational storage unit; and sending the request from the bridge to the storage device, the first computational storage unit, or the second computational storage unit based at least in part on the function exposed by the storage device, the first computational storage unit, or the second computational storage unit.

Statement 371. An embodiment of the disclosure includes the method according to statement 370, wherein receiving the request from the host processor, the storage device, the first computational storage unit, or the second computational storage unit at the bridge of the multi-function device includes:

receiving the request from the host processor, the storage device, the first computational storage unit, or the second computational storage unit at the multi-function device; and sending the request to the bridge based at least in part on the function exposed by the storage device, the first computational storage unit, or the second computational storage unit.

Statement 372. An embodiment of the disclosure includes the method according to statement 370, wherein:

receiving the request from the host processor, the storage device, the first computational storage unit, or the second computational storage unit at the bridge of the multi-function device, the request triggering a second function exposed by the multi-function device;

the method further comprises mapping the second function to the function exposed by the storage device, the first computational storage unit, or the second computational storage unit; and sending the request from the bridge to the storage device, the first computational storage unit, or the second computational storage unit based at least in part on the function exposed by the storage device, the first computational storage unit, or the second computational storage unit.

Statement 373. An embodiment of the disclosure includes the method according to statement 372, wherein receiving the request from the host processor, the storage device, the first computational storage unit, or the second computational storage unit at the bridge of the multi-function device includes:

receiving the request from the host processor, the storage device, the first computational storage unit, or the second computational storage unit at the multi-function device; and sending the request to the bridge based at least in part on the second function exposed by the multi-function device.

Statement 374. An embodiment of the disclosure includes the method according to statement 370, wherein the multi-function device does not expose the function to the host processor.

Statement 375. An embodiment of the disclosure includes the method according to statement 328, further comprising:

receiving a request from the storage device, the first computational storage unit, or the second computational storage unit at a bridge of the multi-function device; and sending the request from the bridge to a buffer of the multi-function device.

Statement 376. An embodiment of the disclosure includes the method according to statement 375, wherein the request is sent from the storage device, the first computational storage unit, or the second computational storage unit to the host processor.

Statement 377. An embodiment of the disclosure includes the method according to statement 375, wherein sending the request from the bridge to the buffer of the multi-function device includes sending the request from the bridge to the buffer of the multi-function device without notifying the storage device, the first computational storage unit, or the second computational storage unit.

Statement 378. An embodiment of the disclosure includes the method according to statement 375, wherein sending the request from the bridge to the buffer of the multi-function device includes sending the request from the bridge to the buffer of the multi-function device based at least in part on an address, the request including the address.

Statement 379. An embodiment of the disclosure includes the method according to statement 378, wherein the buffer includes an address range including the address.

Statement 380. An embodiment of the disclosure includes the method according to statement 379, further comprising receiving the address range for the buffer from the host processor.

Statement 381. An embodiment of the disclosure includes the method according to statement 328, wherein:

exposing the storage device to the host processor connected to the multi-function device includes exposing the storage device to the host processor connected to the multi-function device based at least in part on a list of device configurations; and selectively exposing the first computational storage unit and the second computational storage unit to the host processor includes selectively exposing the first computational storage unit and the second computational storage unit to the host processor based at least in part on the list of device configurations.

Statement 382. An embodiment of the disclosure includes the method according to statement 381, wherein further comprising accessing the list of device configurations from a storage of the multi-function device.

Statement 383. An embodiment of the disclosure includes the method according to statement 382, wherein accessing the list of device configurations from the storage of the multi-function device includes accessing the list of device configurations from a persistent storage of the multi-function device.

Statement 384. An embodiment of the disclosure includes the method according to statement 381, further comprising:

determining that a device is connected to the multi-function device;

determining a configuration of the device; and updating the list of device configurations based at least in part on the configuration of the device.

Statement 385. An embodiment of the disclosure includes the method according to statement 384, wherein the device includes a second storage device, a third computational storage unit, a FHE circuit, or a network interface device.

Statement 386. An embodiment of the disclosure includes the method according to statement 384, wherein updating the list of device configurations based at least in part on the configuration of the device includes determining that the list of device configurations omits the configuration of the device.

Statement 387. An embodiment of the disclosure includes the method according to statement 328, further comprising replacing the storage device with a device.

Statement 388. An embodiment of the disclosure includes the method according to statement 328, further comprising replacing the first computational storage unit with a device.

Statement 389. An embodiment of the disclosure includes the method according to statement 328, further comprising replacing the second computational storage unit with a device.

Statement 390. An embodiment of the disclosure includes the method according to statement 328, wherein the multi-function device communicates with the storage device using at least one of an Ethernet protocol, a Transmission Control Protocol/Internet Protocol (TCP/IP) protocol, a Remote DMA (RDMA) protocol, an NVMe protocol, an NVMe over Fabrics (NVMe-oF) protocol, a Universal Flash Storage (UFS) protocol, an embedded MultiMediaCard (eMMC) protocol, a Serial Attached Small Computer System Interface (SCSI) (SAS) protocol, or a Serial AT Attachment (SATA) protocol.

Statement 391. An embodiment of the disclosure includes the method according to statement 328, wherein the multi-function device communicates with the first computational storage unit using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 392. An embodiment of the disclosure includes the method according to statement 328, wherein the multi-function device communicates with the second computational storage unit using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 393. An embodiment of the disclosure includes the method according to statement 328, wherein the multi-function device communicates with the host processor using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 394. An embodiment of the disclosure includes an article, comprising a non-transitory storage medium, the non-transitory storage medium having stored thereon instructions that, when executed by a machine, result in:

determining that a storage device is connected to a multi-function device;

determining that a first computational storage unit is available;

determining that a second computational storage unit is connected to the multi-function device;

exposing the storage device to a host processor connected to the multi-function device; and selectively exposing the first computational storage unit and the second computational storage unit to the host processor.

Statement 395. An embodiment of the disclosure includes the article according to statement 394, wherein the multi-function device is implemented using at least one of a Field Programmable Gate Array (FPGA), an Application-Specific Integrated Circuit (ASIC), a System-on-a-Chip (SoC), a Graphics Processing Unit (GPU), a General Purpose GPU (GPGPU), a Central Processing Unit (CPU), a Tensor Processing Unit (TPU), or a Neural Processing Unit (NPU).

Statement 396. An embodiment of the disclosure includes the article according to statement 394, wherein the first computational storage unit is implemented using at least one of an FPGA, an ASIC, an SoC, a GPU, a GPGPU, a CPU, a TPU, or an NPU.

Statement 397. An embodiment of the disclosure includes the article according to statement 394, wherein the second computational storage unit is implemented using at least one of an FPGA, an ASIC, an SoC, a GPU, a GPGPU, a CPU, a TPU, or an NPU.

Statement 398. An embodiment of the disclosure includes the article according to statement 394, wherein the storage device includes a Solid State Drive (SSD).

Statement 399. An embodiment of the disclosure includes the article according to statement 394, wherein the first computational storage unit includes an accelerator circuit, a Fully Homomorphic Encryption (FHE) circuit, or a network interface device.

Statement 400. An embodiment of the disclosure includes the article according to statement 394, wherein the second computational storage unit includes an accelerator circuit, an FHE circuit, or a network interface device.

Statement 401. An embodiment of the disclosure includes the article according to statement 394, wherein determining that the first computational storage unit is available includes determining that the first computational storage unit is connected to the multi-function device.

Statement 402. An embodiment of the disclosure includes the article according to statement 401, wherein determining that the first computational storage unit is connected to the multi-function device includes determining that the first computational storage unit is connected to the multi-function device via a connector.

Statement 403. An embodiment of the disclosure includes the article according to statement 394, wherein determining that the first computational storage unit is available includes determining that the first computational storage unit is integrated into the multi-function device.

Statement 404. An embodiment of the disclosure includes the article according to statement 394, wherein determining that the storage device is connected to the multi-function device includes determining that the storage device is connected to the multi-function device via a first connector; and determining that the second computational storage unit is connected to the multi-function device includes determining that the second computational storage unit is connected to the multi-function device via a second connector.

Statement 405. An embodiment of the disclosure includes the article according to statement 394, wherein selectively exposing the first computational storage unit and the second computational storage unit to a host processor connected to the multi-function device includes:

exposing the first computational storage unit to the host processor; and not exposing the second computational storage unit to the host processor.

Statement 406. An embodiment of the disclosure includes the article according to statement 394, the non-transitory storage medium having stored thereon further instructions that, when executed by the machine, result in:

receiving a request at the multi-function device from the storage device to invoke a capability of the first computational storage unit or the second computational storage unit; and sending the request to the first computational storage unit or the second computational storage unit.

Statement 407. An embodiment of the disclosure includes the article according to statement 406, wherein sending the request to the first computational storage unit or the second computational storage unit includes sending the request to the first computational storage unit or the second computational storage unit without sending the request to the host processor.

Statement 408. An embodiment of the disclosure includes the article according to statement 406, wherein sending the request to the first computational storage unit or the second computational storage unit includes sending the request to the first computational storage unit or the second computational storage unit without management by the host processor.

Statement 409. An embodiment of the disclosure includes the article according to statement 406, the non-transitory storage medium having stored thereon further instructions that, when executed by the machine, result in:

receiving a reply at the multi-function device from the first computational storage unit or the second computational storage unit; and sending the reply to the storage device.

Statement 410. An embodiment of the disclosure includes the article according to statement 409, wherein sending the reply to the storage device includes sending the reply to the storage device without sending the reply to the host processor.

Statement 411. An embodiment of the disclosure includes the article according to statement 394, the non-transitory storage medium having stored thereon further instructions that, when executed by the machine, result in:

receiving a request at the multi-function device from the first computational storage unit to invoke a capability of the storage device or the second computational storage unit; and sending the request to the storage device or the second computational storage unit.

Statement 412. An embodiment of the disclosure includes the article according to statement 411, wherein sending the request to the storage device or the second computational storage unit includes sending the request to the storage device or the second computational storage unit without sending the request to the host processor.

Statement 413. An embodiment of the disclosure includes the article according to statement 411, wherein sending the request to the storage device or the second computational storage unit includes sending the request to the storage device or the second computational storage unit without management by the host processor.

Statement 414. An embodiment of the disclosure includes the article according to statement 411, the non-transitory storage medium having stored thereon further instructions that, when executed by the machine, result in:

receiving a reply at the multi-function device from the storage device or the second computational storage unit; and sending the reply to the first computational storage unit.

Statement 415. An embodiment of the disclosure includes the article according to statement 414, wherein sending the reply to the first computational storage unit includes sending the reply to the first computational storage unit without sending the reply to the host processor.

Statement 416. An embodiment of the disclosure includes the article according to statement 394, the non-transitory storage medium having stored thereon further instructions that, when executed by the machine, result in:

receiving a request at the multi-function device from the second computational storage unit to invoke a capability of the storage device or the first computational storage unit; and sending the request to the storage device or the first computational storage unit.

Statement 417. An embodiment of the disclosure includes the article according to statement 416, wherein sending the request to the storage device or the first computational storage unit includes sending the request to the storage device or the first computational storage unit without sending the request to the host processor.

Statement 418. An embodiment of the disclosure includes the article according to statement 416, wherein sending the request to the storage device or the first computational storage unit includes sending the request to the storage device or the first computational storage unit without management by the host processor.

Statement 419. An embodiment of the disclosure includes the article according to statement 416, the non-transitory storage medium having stored thereon further instructions that, when executed by the machine, result in:

receiving a reply at the multi-function device from the storage device or the first computational storage unit; and sending the reply to the second computational storage unit.

Statement 420. An embodiment of the disclosure includes the article according to statement 419, wherein sending the reply to the second computational storage unit includes sending the reply to the second computational storage unit without sending the reply to the host processor.

Statement 421. An embodiment of the disclosure includes the article according to statement 394, the non-transitory storage medium having stored thereon further instructions that, when executed by the machine, result in:

accessing a data in a buffer in the multi-function device by the storage device; and accessing the data in the buffer in the multi-function device by the first computational storage unit.

Statement 422. An embodiment of the disclosure includes the article according to statement 421, the non-transitory storage medium having stored thereon further instructions that, when executed by the machine, result in:

accessing the data in the buffer in the multi-function device by the second computational storage unit.

Statement 423. An embodiment of the disclosure includes the article according to statement 421, wherein:

the buffer includes an address range; and the non-transitory storage medium has stored thereon further instructions that, when executed by the machine, result in determining the address range of the buffer from the host processor.

Statement 424. An embodiment of the disclosure includes the article according to statement 421, wherein:

accessing the data in the buffer in the multi-function device by the storage device includes accessing the data in the buffer in the multi-function device by the storage device using a first protocol; and accessing the data in the buffer in the multi-function device by the first computational storage unit includes accessing the data in the buffer in the multi-function device by the first computational storage unit using a second protocol.

Statement 425. An embodiment of the disclosure includes the article according to statement 424, wherein:

the first protocol includes at least one of a File Read protocol, a File Write protocol, a Direct Memory Access (DMA) protocol, or a Non-Volatile Memory Express (NVMe) protocol; and the second protocol includes at least one of the File Read protocol, the File Write protocol, the DMA protocol, or the NVMe protocol.

Statement 426. An embodiment of the disclosure includes the article according to statement 424, the non-transitory storage medium having stored thereon further instructions that, when executed by the machine, result in accessing the data in the buffer in the multi-function device by the second computational storage unit using a third protocol.

Statement 427. An embodiment of the disclosure includes the article according to statement 426, wherein the third protocol includes at least one of the File Read protocol, the File Write protocol, the DMA protocol, or the NVMe protocol.

Statement 428. An embodiment of the disclosure includes the article according to statement 421, the non-transitory storage medium having stored thereon further instructions that, when executed by the machine, result in processing the data in the buffer using a data processor of the multi-function device.

Statement 429. An embodiment of the disclosure includes the article according to statement 428, wherein processing the data in the buffer using the data processor of the multi-function device includes processing the data in the buffer using the data processor of the multi-function device based at least in part on a request from one of the host processor, the storage device, the first computational storage unit, or the second computational storage unit.

Statement 430. An embodiment of the disclosure includes the article according to statement 429, wherein:

the non-transitory storage medium has stored thereon further instructions that, when executed by the machine, result in:

determining that a function is exposed by the data processor; and exposing the function by the multi-function device; and processing the data in the buffer using the data processor of the multi-function device based at least in part on a request from one of the host processor, the storage device, the first computational storage unit, or the second computational storage unit includes receiving the request from at least one of the host processor, the storage device, the first computational storage unit, or the second computational storage unit, the request triggering the function.

Statement 431. An embodiment of the disclosure includes the article according to statement 430, wherein determining that the function is exposed by the data processor includes determining that a Peripheral Component Interconnect Express (PCIe) function is exposed by the data processor.

Statement 432. An embodiment of the disclosure includes the article according to statement 431, wherein the PCIe function includes a first physical function (PF) or a first virtual function (VF).

Statement 433. An embodiment of the disclosure includes the article according to statement 429, wherein:

the non-transitory storage medium has stored thereon further instructions that, when executed by the machine, result in:

determining that a function is exposed by the data processor; and exposing a second function by the multi-function device; and processing the data in the buffer using the data processor of the multi-function device based at least in part on a request from one of the host processor, the storage device, the first computational storage unit, or the second computational storage unit includes:

receiving the request from at least one of the host processor, the storage device, the first computational storage unit, or the second computational storage unit, the request triggering the second function; and triggering the function of the data processor.

Statement 434. An embodiment of the disclosure includes the article according to statement 433, wherein triggering the function of the data processor includes mapping the second function to the function of the data processor.

Statement 435. An embodiment of the disclosure includes the article according to statement 394, the non-transitory storage medium having stored thereon further instructions that, when executed by the machine, result in:

receiving a request from the host processor, the storage device, the first computational storage unit, or the second computational storage unit at a bridge of the multi-function device; and passing the request through the bridge to the host processor, the storage device, the first computational storage unit, or the second computational storage unit.

Statement 436. An embodiment of the disclosure includes the article according to statement 394, the non-transitory storage medium having stored thereon further instructions that, when executed by the machine, result in:

receiving a request from the host processor, the storage device, the first computational storage unit, or the second computational storage unit at a bridge of the multi-function device, the request triggering a function exposed by the storage device, the first computational storage unit, or the second computational storage unit; and sending the request from the bridge to the storage device, the first computational storage unit, or the second computational storage unit based at least in part on the function exposed by the storage device, the first computational storage unit, or the second computational storage unit.

Statement 437. An embodiment of the disclosure includes the article according to statement 436, wherein receiving the request from the host processor, the storage device, the first computational storage unit, or the second computational storage unit at the bridge of the multi-function device includes:

receiving the request from the host processor, the storage device, the first computational storage unit, or the second computational storage unit at the multi-function device; and sending the request to the bridge based at least in part on the function exposed by the storage device, the first computational storage unit, or the second computational storage unit.

Statement 438. An embodiment of the disclosure includes the article according to statement 436, wherein:

receiving the request from the host processor, the storage device, the first computational storage unit, or the second computational storage unit at the bridge of the multi-function device, the request triggering a second function exposed by the multi-function device;

the non-transitory storage medium has stored thereon further instructions that, when executed by the machine, result in mapping the second function to the function exposed by the storage device, the first computational storage unit, or the second computational storage unit; and sending the request from the bridge to the storage device, the first computational storage unit, or the second computational storage unit based at least in part on the function exposed by the storage device, the first computational storage unit, or the second computational storage unit.

Statement 439. An embodiment of the disclosure includes the article according to statement 438, wherein receiving the request from the host processor, the storage device, the first computational storage unit, or the second computational storage unit at the bridge of the multi-function device includes:

receiving the request from the host processor, the storage device, the first computational storage unit, or the second computational storage unit at the multi-function device; and sending the request to the bridge based at least in part on the second function exposed by the multi-function device.

Statement 440. An embodiment of the disclosure includes the article according to statement 436, wherein the multi-function device does not expose the function to the host processor.

Statement 441. An embodiment of the disclosure includes the article according to statement 394, the non-transitory storage medium having stored thereon further instructions that, when executed by the machine, result in:

receiving a request from the storage device, the first computational storage unit, or the second computational storage unit at a bridge of the multi-function device; and sending the request from the bridge to a buffer of the multi-function device.

Statement 442. An embodiment of the disclosure includes the article according to statement 441, wherein the request is sent from the storage device, the first computational storage unit, or the second computational storage unit to the host processor.

Statement 443. An embodiment of the disclosure includes the article according to statement 441, wherein sending the request from the bridge to the buffer of the multi-function device includes sending the request from the bridge to the buffer of the multi-function device without notifying the storage device, the first computational storage unit, or the second computational storage unit.

Statement 444. An embodiment of the disclosure includes the article according to statement 441, wherein sending the request from the bridge to the buffer of the multi-function device includes sending the request from the bridge to the buffer of the multi-function device based at least in part on an address, the request including the address.

Statement 445. An embodiment of the disclosure includes the article according to statement 444, wherein the buffer includes an address range including the address.

Statement 446. An embodiment of the disclosure includes the article according to statement 445, the non-transitory storage medium having stored thereon further instructions that, when executed by the machine, result in receiving the address range for the buffer from the host processor.

Statement 447. An embodiment of the disclosure includes the article according to statement 394, wherein:

exposing the storage device to the host processor connected to the multi-function device includes exposing the storage device to the host processor connected to the multi-function device based at least in part on a list of device configurations; and selectively exposing the first computational storage unit and the second computational storage unit to the host processor includes selectively exposing the first computational storage unit and the second computational storage unit to the host processor based at least in part on the list of device configurations.

Statement 448. An embodiment of the disclosure includes the article according to statement 447, wherein the non-transitory storage medium having stored thereon further instructions that, when executed by the machine, result in accessing the list of device configurations from a storage of the multi-function device.

Statement 449. An embodiment of the disclosure includes the article according to statement 448, wherein accessing the list of device configurations from the storage of the multi-function device includes accessing the list of device configurations from a persistent storage of the multi-function device.

Statement 450. An embodiment of the disclosure includes the article according to statement 447, the non-transitory storage medium having stored thereon further instructions that, when executed by the machine, result in:

determining that a device is connected to the multi-function device;

determining a configuration of the device; and updating the list of device configurations based at least in part on the configuration of the device.

Statement 451. An embodiment of the disclosure includes the article according to statement 450, wherein the device includes a second storage device, a third computational storage unit, a FHE circuit, or a network interface device.

Statement 452. An embodiment of the disclosure includes the article according to statement 450, wherein updating the list of device configurations based at least in part on the configuration of the device includes determining that the list of device configurations omits the configuration of the device.

Statement 453. An embodiment of the disclosure includes the article according to statement 394, the non-transitory storage medium having stored thereon further instructions that, when executed by the machine, result in replacing the storage device with a device.

Statement 454. An embodiment of the disclosure includes the article according to statement 394, the non-transitory storage medium having stored thereon further instructions that, when executed by the machine, result in replacing the first computational storage unit with a device.

Statement 455. An embodiment of the disclosure includes the article according to statement 394, the non-transitory storage medium having stored thereon further instructions that, when executed by the machine, result in replacing the second computational storage unit with a device.

Statement 456. An embodiment of the disclosure includes the article according to statement 394, wherein the multi-function device communicates with the storage device using at least one of an Ethernet protocol, a Transmission Control Protocol/Internet Protocol (TCP/IP) protocol, a Remote DMA (RDMA) protocol, an NVMe protocol, an NVMe over Fabrics (NVMe-oF) protocol, a Universal Flash Storage (UFS) protocol, an embedded MultiMediaCard (eMMC) protocol, a Serial Attached Small Computer System Interface (SCSI) (SAS) protocol, or a Serial AT Attachment (SATA) protocol.

Statement 457. An embodiment of the disclosure includes the article according to statement 394, wherein the multi-function device communicates with the first computational storage unit using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 458. An embodiment of the disclosure includes the article according to statement 394, wherein the multi-function device communicates with the second computational storage unit using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 459. An embodiment of the disclosure includes the article according to statement 394, wherein the multi-function device communicates with the host processor using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 460. An embodiment of the disclosure includes a multi-function device, comprising:

a first connector for communicating with a storage device;

a second connector for communicating with a Fully Homomorphic Encryption (FHE) circuit; and a third connector for communicating with a host processor;

wherein the multi-function device is configured to expose the storage device to the host processor via the third connector.

Statement 461. An embodiment of the disclosure includes the multi-function device according to statement 460, wherein the multi-function device is implemented using at least one of a Field Programmable Gate Array (FPGA), an Application-Specific Integrated Circuit (ASIC), a System-on-a-Chip (SoC), a Graphics Processing Unit (GPU), a General Purpose GPU (GPGPU), a Central Processing Unit (CPU), a Tensor Processing Unit (TPU), or a Neural Processing Unit (NPU).

Statement 462. An embodiment of the disclosure includes the multi-function device according to statement 460, wherein the FHE circuit is implemented using at least one of an FPGA, an ASIC, an SoC, a GPU, a GPGPU, a CPU, a TPU, or an NPU.

Statement 463. An embodiment of the disclosure includes the multi-function device according to statement 460, wherein the multi-function device is configured to expose the storage device and the FHE circuit to the host processor via the third connector.

Statement 464. An embodiment of the disclosure includes the multi-function device according to statement 460, wherein the multi-function device does not expose the FHE circuit to the host processor via the third connector.

Statement 465. An embodiment of the disclosure includes the multi-function device according to statement 460, wherein the FHE circuit is configured to invoke a capability of the storage device.

Statement 466. An embodiment of the disclosure includes the multi-function device according to statement 465, wherein the multi-function device is configured to receive a request from the FHE circuit and send the request to the storage device.

Statement 467. An embodiment of the disclosure includes the multi-function device according to statement 466, wherein the multi-function device is configured to receive the request from the FHE circuit and send the request to the storage device without sending the request to the host processor.

Statement 468. An embodiment of the disclosure includes the multi-function device according to statement 465, wherein the FHE circuit is configured to invoke the capability of the storage device without management by the host processor.

Statement 469. An embodiment of the disclosure includes the multi-function device according to statement 465, wherein the multi-function device is configured to receive a reply from the storage device and send the reply to the FHE circuit.

Statement 470. An embodiment of the disclosure includes the multi-function device according to statement 469, wherein the multi-function device is configured to receive the reply from the storage device and send the reply to the FHE circuit without sending the reply to the host processor.

Statement 471. An embodiment of the disclosure includes the multi-function device according to statement 460, wherein the storage device is configured to invoke a capability of the FHE circuit.

Statement 472. An embodiment of the disclosure includes the multi-function device according to statement 471, wherein the multi-function device is configured to receive a request from the storage device and send the request to the FHE circuit.

Statement 473. An embodiment of the disclosure includes the multi-function device according to statement 472, wherein the multi-function device is configured to receive the request from the storage device and send the request to the FHE circuit without sending the request to the host processor.

Statement 474. An embodiment of the disclosure includes the multi-function device according to statement 471, wherein the storage device is configured to invoke the capability of the FHE circuit without management by the host processor.

Statement 475. An embodiment of the disclosure includes the multi-function device according to statement 471, wherein the multi-function device is configured to receive a reply from the FHE circuit and send the reply to the storage device.

Statement 476. An embodiment of the disclosure includes the multi-function device according to statement 475, wherein the multi-function device is configured to receive the reply from the FHE circuit and send the reply to the storage device without sending the reply to the host processor.

Statement 477. An embodiment of the disclosure includes the multi-function device according to statement 460, wherein the storage device includes a Solid State Drive (SSD).

Statement 478. An embodiment of the disclosure includes the multi-function device according to statement 460, further comprising a buffer connected to the storage device and the FHE circuit.

Statement 479. An embodiment of the disclosure includes the multi-function device according to statement 478, wherein the storage device and the FHE circuit are configured to access a data in the buffer.

Statement 480. An embodiment of the disclosure includes the multi-function device according to statement 478, wherein the buffer includes an address range.

Statement 481. An embodiment of the disclosure includes the multi-function device according to statement 480, wherein the host processor determines the address range of the buffer.

Statement 482. An embodiment of the disclosure includes the multi-function device according to statement 478, wherein the storage device is configured to access the buffer using a protocol.

Statement 483. An embodiment of the disclosure includes the multi-function device according to statement 482, wherein the protocol includes at least one of a File Read protocol, a File Write protocol, a Direct Memory Access (DMA) protocol, or a Non-Volatile Memory Express (NVMe) protocol.

Statement 484. An embodiment of the disclosure includes the multi-function device according to statement 478, wherein the FHE circuit is configured to access the buffer using a protocol.

Statement 485. An embodiment of the disclosure includes the multi-function device according to statement 484, wherein the protocol includes at least one of a File Read protocol, a File Write protocol, a Direct Memory Access (DMA) protocol, or a Non-Volatile Memory Express (NVMe) protocol.

Statement 486. An embodiment of the disclosure includes the multi-function device according to statement 478, wherein:

the multi-function device further comprises a fourth connector for communicating with a computational storage unit; and the buffer is connected to the storage device, the FHE circuit, and the computational storage unit.

Statement 487. An embodiment of the disclosure includes the multi-function device according to statement 486, wherein the storage device, the FHE circuit, and the computational storage unit are configured to access a data in the buffer.

Statement 488. An embodiment of the disclosure includes the multi-function device according to statement 486, wherein the computational storage unit is configured to access the buffer using a protocol.

Statement 489. An embodiment of the disclosure includes the multi-function device according to statement 488, wherein the protocol includes at least one of a File Read protocol, a File Write protocol, a Direct Memory Access (DMA) protocol, or a Non-Volatile Memory Express (NVMe) protocol.

Statement 490. An embodiment of the disclosure includes the multi-function device according to statement 478, further comprising a data processor, the data processor configured to process a data in the buffer, wherein the buffer is connected to the storage device, the FHE circuit, and the data processor.

Statement 491. An embodiment of the disclosure includes the multi-function device according to statement 490, wherein the data processor is configured to process the data in the buffer based at least in part on a request from at least one of the host processor the storage device, or the FHE circuit.

Statement 492. An embodiment of the disclosure includes the multi-function device according to statement 491, wherein:

the multi-function device includes a fourth connector for communicating with a computational storage unit; and the data processor is configured to process the data in the buffer based at least in part on a request from at least one of the host processor, the storage device, the FHE circuit, or a computational storage unit.

Statement 493. An embodiment of the disclosure includes the multi-function device according to statement 491, wherein:

the data processor is configured to expose a function;

the request is from the host processor; and the request triggers the function of the data processor.

Statement 494. An embodiment of the disclosure includes the multi-function device according to statement 493, wherein the function includes a Peripheral Component Interconnect Express (PCIe) function.

Statement 495. An embodiment of the disclosure includes the multi-function device according to statement 494, wherein the PCIe function includes a first physical function (PF) or a first virtual function (VF).

Statement 496. An embodiment of the disclosure includes the multi-function device according to statement 493, wherein:

the multi-function device is configured to expose a second function to the host processor via the third connector;

the multi-function device is configured to receive the request from the host processor via the third connector; and the multi-function device triggers the function of the data processor.

Statement 497. An embodiment of the disclosure includes the multi-function device according to statement 496, wherein:

the request includes the second function; and the multi-function device is configured to map the second function to the function of the data processor.

Statement 498. An embodiment of the disclosure includes the multi-function device according to statement 460, further comprising a first bridge connecting the third connector and the first connector.

Statement 499. An embodiment of the disclosure includes the multi-function device according to statement 498, wherein the first bridge supports pass-through of a first request between the host processor and the storage device.

Statement 500. An embodiment of the disclosure includes the multi-function device according to statement 498, further comprising a second bridge connecting the third connector and the second connector.

Statement 501. An embodiment of the disclosure includes the multi-function device according to statement 500, wherein the second bridge supports pass-through of a second request between the host processor and the FHE circuit.

Statement 502. An embodiment of the disclosure includes the multi-function device according to statement 498, wherein:

the storage device is configured to expose a first function to the multi-function device via the first connector;

the FHE circuit is configured to expose a second function to the multi-function device via the second connector;

the multi-function device is configured to expose a third function to the host processor via the third connector; and the first bridge is configured to map a first request using the third function to a second request using the first function; and the second bridge is configured to map a third request using a fourth function to a fourth request using the second function.

Statement 503. An embodiment of the disclosure includes the multi-function device according to statement 502, wherein the multi-function device is configured to expose the fourth function to the host processor via the third connector.

Statement 504. An embodiment of the disclosure includes the multi-function device according to statement 502, wherein the multi-function device does not expose the fourth function to the host processor via the third connector.

Statement 505. An embodiment of the disclosure includes the multi-function device according to statement 502, wherein:

the multi-function device is configured to direct the first request to the first bridge; and the multi-function device is configured to direct the third request to the second bridge.

Statement 506. An embodiment of the disclosure includes the multi-function device according to statement 505, wherein:

the multi-function device is configured to receive the first request from the host processor or the FHE circuit; and the multi-function device is configured to receive the third request from the host processor or the storage device.

Statement 507. An embodiment of the disclosure includes the multi-function device according to statement 506, wherein:

the multi-function device is configured to receive the first request from the host processor, the FHE circuit, or a computational storage unit;

the multi-function device is configured to receive the third request from the host processor, the storage device, or the computational storage unit.

Statement 508. An embodiment of the disclosure includes the multi-function device according to statement 498, further comprising a buffer connected to the first bridge and the second bridge.

Statement 509. An embodiment of the disclosure includes the multi-function device according to statement 508, wherein the first bridge is configured to receive a request sent from the storage device and direct the request to the buffer.

Statement 510. An embodiment of the disclosure includes the multi-function device according to statement 509, wherein the request is sent from the storage device to the host processor.

Statement 511. An embodiment of the disclosure includes the multi-function device according to statement 509, wherein the storage device is agnostic to the first bridge redirecting the request to the buffer.

Statement 512. An embodiment of the disclosure includes the multi-function device according to statement 509, wherein the first bridge is configured to direct the request to the buffer based at least in part on an address, the request including the address.

Statement 513. An embodiment of the disclosure includes the multi-function device according to statement 512, wherein the buffer includes an address range including the address.

Statement 514. An embodiment of the disclosure includes the multi-function device according to statement 508, wherein the second bridge is configured to receive a request sent from the FHE circuit and direct the request to the buffer.

Statement 515. An embodiment of the disclosure includes the multi-function device according to statement 514, wherein the request is sent from the FHE circuit to the host processor.

Statement 516. An embodiment of the disclosure includes the multi-function device according to statement 514, wherein the FHE circuit is agnostic to the second bridge redirecting the request to the buffer.

Statement 517. An embodiment of the disclosure includes the multi-function device according to statement 514, wherein the second bridge is configured to direct the request to the buffer based at least in part on an address, the request including the address.

Statement 518. An embodiment of the disclosure includes the multi-function device according to statement 517, wherein the buffer includes an address range including the address.

Statement 519. An embodiment of the disclosure includes the multi-function device according to statement 460, further comprising a storage for a list of device configurations.

Statement 520. An embodiment of the disclosure includes the multi-function device according to statement 519, wherein the storage includes a persistent storage.

Statement 521. An embodiment of the disclosure includes the multi-function device according to statement 519, wherein the multi-function device is configured to expose the storage device to the host processor based at least in part on the list of device configurations.

Statement 522. An embodiment of the disclosure includes the multi-function device according to statement 521, wherein the multi-function device is configured to expose the storage device and the FHE circuit to the host processor based at least in part on the list of device configurations.

Statement 523. An embodiment of the disclosure includes the multi-function device according to statement 521, wherein the multi-function device is configured not to expose the FHE circuit to the host processor based at least in part on the list of device configurations.

Statement 524. An embodiment of the disclosure includes the multi-function device according to statement 519, wherein the multi-function device is configured to detect a device connected to the second connector, determine a configuration of the device, and update the list of device configurations based at least in part on the configuration of the device.

Statement 525. An embodiment of the disclosure includes the multi-function device according to statement 524, wherein the device includes a second storage device, a second FHE circuit, a computational storage unit, or a network interface device.

Statement 526. An embodiment of the disclosure includes the multi-function device according to statement 519, wherein the multi-function device is configured to determine the configuration of the device and update the list of device configurations based at least in part on the list of configurations omitting a configuration of the device.

Statement 527. An embodiment of the disclosure includes the multi-function device according to statement 460, wherein the storage device is replaceable.

Statement 528. An embodiment of the disclosure includes the multi-function device according to statement 460, wherein the FHE circuit is replaceable.

Statement 529. An embodiment of the disclosure includes the multi-function device according to statement 460, wherein:

the first connector includes a first PCIe port;

the second connector includes a second PCIe port;

the third connector includes a third PCIe port.

Statement 530. An embodiment of the disclosure includes the multi-function device according to statement 529, wherein:

the first PCIe port includes a first root port;

the second PCIe port includes a second root port;

the third PCIe port includes an endpoint.

Statement 531. An embodiment of the disclosure includes the multi-function device according to statement 460, wherein:

the storage device is configured to expose a first PCIe function to the multi-function device via the first connector;

the FHE circuit is configured to expose a second PCIe function to the multi-function device via the second connector; and the multi-function device is configured to expose a third PCIe function to the host processor via the third connector.

Statement 532. An embodiment of the disclosure includes the multi-function device according to statement 531, wherein:

the first PCIe function includes a first PF or a first VF;

the second PCIe function includes a second PF or a second VF; and the third PCIe function includes a third PF or a third VF.

Statement 533. An embodiment of the disclosure includes the multi-function device according to statement 460, wherein the first connector supports at least one of an Ethernet protocol, a Transmission Control Protocol/Internet Protocol (TCP/IP) protocol, a Remote DMA (RDMA) protocol, an NVMe protocol, an NVMe over Fabrics (NVMe-oF) protocol, a Universal Flash Storage (UFS) protocol, an embedded MultiMediaCard (eMMC) protocol, a Serial Attached Small Computer System Interface (SCSI) (SAS) protocol, or a Serial AT Attachment (SATA) protocol.

Statement 534. An embodiment of the disclosure includes the multi-function device according to statement 460, wherein the second connector supports at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 535. An embodiment of the disclosure includes the multi-function device according to statement 460, wherein the third connector supports at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 536. An embodiment of the disclosure includes the multi-function device according to statement 460, further comprising a fourth connector for communicating with a device.

Statement 537. An embodiment of the disclosure includes the multi-function device according to statement 536, wherein the device includes a second storage device, a second FHE circuit, a computational storage unit, or a network interface device.

Statement 538. An embodiment of the disclosure includes the multi-function device according to statement 536, wherein the device is implemented using at least one of an FPGA, an ASIC, an SoC, a GPU, a GPGPU, a CPU, a TPU, or an NPU.

Statement 539. An embodiment of the disclosure includes the multi-function device according to statement 536, wherein the multi-function device does not expose the device to the host processor.

Statement 540. An embodiment of the disclosure includes the multi-function device according to statement 536, wherein the FHE circuit is configured to invoke a capability of the device.

Statement 541. An embodiment of the disclosure includes the multi-function device according to statement 540, wherein the multi-function device is configured to receive a request from the FHE circuit and send the request to the device.

Statement 542. An embodiment of the disclosure includes the multi-function device according to statement 541, wherein the multi-function device is configured to receive the request from the FHE circuit and send the request to the device without sending the request to the host processor.

Statement 543. An embodiment of the disclosure includes the multi-function device according to statement 540, wherein the FHE circuit is configured to invoke the capability of the device without management by the host processor.

Statement 544. An embodiment of the disclosure includes the multi-function device according to statement 540, wherein the multi-function device is configured to receive a reply from the device and send the reply to the FHE circuit.

Statement 545. An embodiment of the disclosure includes the multi-function device according to statement 544, wherein the multi-function device is configured to receive the reply from the device and send the reply to the FHE circuit without sending the reply to the host processor.

Statement 546. An embodiment of the disclosure includes the multi-function device according to statement 536, wherein the storage device is configured to invoke a capability of the device.

Statement 547. An embodiment of the disclosure includes the multi-function device according to statement 546, wherein the multi-function device is configured to receive a request from the storage device and send the request to the device.

Statement 548. An embodiment of the disclosure includes the multi-function device according to statement 547, wherein the multi-function device is configured to receive the request from the storage device and send the request to the device without sending the request to the host processor.

Statement 549. An embodiment of the disclosure includes the multi-function device according to statement 546, wherein the storage device is configured to invoke the capability of the device without management by the host processor.

Statement 550. An embodiment of the disclosure includes the multi-function device according to statement 546, wherein the multi-function device is configured to receive a reply from the device and send the reply to the storage device.

Statement 551. An embodiment of the disclosure includes the multi-function device according to statement 550, wherein the multi-function device is configured to receive the reply from the device and send the reply to the storage device without sending the reply to the host processor.

Statement 552. An embodiment of the disclosure includes the multi-function device according to statement 536, wherein the device is configured to invoke a capability of the storage device or the FHE circuit.

Statement 553. An embodiment of the disclosure includes the multi-function device according to statement 552, wherein the multi-function device is configured to receive a request from the device and send the request to the storage device or the FHE circuit.

Statement 554. An embodiment of the disclosure includes the multi-function device according to statement 553, wherein the multi-function device is configured to receive the request from the device and send the request to the storage device or the FHE circuit without sending the request to the host processor.

Statement 555. An embodiment of the disclosure includes the multi-function device according to statement 552, wherein the device is configured to invoke the capability of the storage device or the FHE circuit without management by the host processor.

Statement 556. An embodiment of the disclosure includes the multi-function device according to statement 552, wherein the multi-function device is configured to receive a reply from the storage device or the FHE circuit and send the reply to the device.

Statement 557. An embodiment of the disclosure includes the multi-function device according to statement 556, wherein the multi-function device is configured to receive the reply from the storage device or the FHE circuit and send the reply to the device without sending the reply to the host processor.

Statement 558. An embodiment of the disclosure includes the multi-function device according to statement 536, wherein the device includes an accelerator circuit, a second FHE circuit, or a network interface device.

Statement 559. An embodiment of the disclosure includes the multi-function device according to statement 536, further comprising:

- a first bridge connecting the third connector and the first connector;
- a second bridge connecting the third connector and the second connector; and
- a third bridge connecting the third connector and the fourth connector.

Statement 560. An embodiment of the disclosure includes the multi-function device according to statement 559, wherein the third bridge supports pass-through of a request between the host processor and the device.

Statement 561. An embodiment of the disclosure includes the multi-function device according to statement 559, wherein:

- the storage device is configured to expose a first function to the multi-function device via the first connector;
- the FHE circuit is configured to expose a second function to the multi-function device via the second connector;
- the device is configured to expose a third function to the multi-function device via the fourth connector;
- the multi-function device is configured to expose a fourth function and a fifth function to the host processor via the third connector;
- the multi-function device is configured to expose the fourth function to the FHE circuit via the second connector and to the device via the fourth connector;
- the multi-function device is configured to expose the fifth function to the storage device via the first connector and to the device via the fourth connector;
- the multi-function device is configured to expose a sixth function to the storage device via the first connector and to the FHE circuit via the second connector;
- the first bridge is configured to map a first request using the fourth function to a second request using the first function;
- the second bridge is configured to map a third request using the fifth function to a fourth request using the second function; and
- the third bridge is configured to map a fifth request using the sixth function to a sixth request using the third function.

Statement 562. An embodiment of the disclosure includes the multi-function device according to statement 559, further comprising a buffer connected to the first bridge, the second bridge, and the third bridge.

Statement 563. An embodiment of the disclosure includes the multi-function device according to statement 562, wherein the third bridge is configured to receive a request sent from the device and direct the request to the buffer.

Statement 564. An embodiment of the disclosure includes the multi-function device according to statement 563, wherein the device is agnostic to the third bridge redirecting the request to the buffer.

Statement 565. An embodiment of the disclosure includes the multi-function device according to statement 563, wherein the third bridge is configured to direct the request to the buffer based at least in part on an address, the request including the address.

Statement 566. An embodiment of the disclosure includes the multi-function device according to statement 565, wherein the buffer includes an address range including the address.

Statement 567. An embodiment of the disclosure includes the multi-function device according to statement 536, wherein the multi-function device is configured not to expose the device to the host processor based at least in part on a list of device configurations.

Statement 568. An embodiment of the disclosure includes a multi-function device, comprising:

a first connector for communicating with a storage device;

a Fully Homomorphic Encryption (FHE) circuit integrated with the multi-function device; and a second connector for communicating with a host processor;

wherein the multi-function device is configured to expose the storage device to the host processor via the second connector.

Statement 569. An embodiment of the disclosure includes the multi-function device according to statement 568, wherein the multi-function device is implemented using at least one of a Field Programmable Gate Array (FPGA), an Application-Specific Integrated Circuit (ASIC), a System-on-a-Chip (SoC), a Graphics Processing Unit (GPU), a General Purpose GPU (GPGPU), a Central Processing Unit (CPU), a Tensor Processing Unit (TPU), or a Neural Processing Unit (NPU).

Statement 570. An embodiment of the disclosure includes the multi-function device according to statement 568, wherein the FHE circuit is implemented using at least one of an FPGA, an ASIC, an SoC, a GPU, a GPGPU, a CPU, a TPU, or an NPU.

Statement 571. An embodiment of the disclosure includes the multi-function device according to statement 568, wherein the multi-function device is configured to expose the storage device and the FHE circuit to the host processor via the second connector.

Statement 572. An embodiment of the disclosure includes the multi-function device according to statement 568, wherein the multi-function device does not expose the FHE circuit to the host processor via the second connector.

Statement 573. An embodiment of the disclosure includes the multi-function device according to statement 568, wherein the FHE circuit is configured to invoke a capability of the storage device.

Statement 574. An embodiment of the disclosure includes the multi-function device according to statement 573, wherein the multi-function device is configured to receive a request from the FHE circuit and send the request to the storage device.

Statement 575. An embodiment of the disclosure includes the multi-function device according to statement 574, wherein the multi-function device is configured to receive the request from the FHE circuit and send the request to the storage device without sending the request to the host processor.

Statement 576. An embodiment of the disclosure includes the multi-function device according to statement 573, wherein the FHE circuit is configured to invoke the capability of the storage device without management by the host processor.

Statement 577. An embodiment of the disclosure includes the multi-function device according to statement 573, wherein the multi-function device is configured to receive a reply from the storage device and send the reply to the FHE circuit.

Statement 578. An embodiment of the disclosure includes the multi-function device according to statement 577, wherein the multi-function device is configured to receive the reply from the storage device and send the reply to the FHE circuit without sending the reply to the host processor.

Statement 579. An embodiment of the disclosure includes the multi-function device according to statement 568, wherein the storage device is configured to invoke a capability of the FHE circuit.

Statement 580. An embodiment of the disclosure includes the multi-function device according to statement 579, wherein the multi-function device is configured to receive a request from the storage device and send the request to the FHE circuit.

Statement 581. An embodiment of the disclosure includes the multi-function device according to statement 580, wherein the multi-function device is configured to receive the request from the storage device and send the request to the FHE circuit without sending the request to the host processor.

Statement 582. An embodiment of the disclosure includes the multi-function device according to statement 579, wherein the storage device is configured to invoke the capability of the FHE circuit without management by the host processor.

Statement 583. An embodiment of the disclosure includes the multi-function device according to statement 579, wherein the multi-function device is configured to receive a reply from the FHE circuit and send the reply to the storage device.

Statement 584. An embodiment of the disclosure includes the multi-function device according to statement 583, wherein the multi-function device is configured to receive the reply from the FHE circuit and send the reply to the storage device without sending the reply to the host processor.

Statement 585. An embodiment of the disclosure includes the multi-function device according to statement 568, wherein the storage device includes a Solid State Drive (SSD).

Statement 586. An embodiment of the disclosure includes the multi-function device according to statement 568, further comprising a buffer connected to the storage device and the FHE circuit.

Statement 587. An embodiment of the disclosure includes the multi-function device according to statement 586, wherein the storage device and the FHE circuit are configured to access a data in the buffer.

Statement 588. An embodiment of the disclosure includes the multi-function device according to statement 586, wherein the buffer includes an address range.

Statement 589. An embodiment of the disclosure includes the multi-function device according to statement 588, wherein the host processor determines the address range of the buffer.

Statement 590. An embodiment of the disclosure includes the multi-function device according to statement 586, wherein the storage device is configured to access the buffer using a protocol.

Statement 591. An embodiment of the disclosure includes the multi-function device according to statement 590, wherein the protocol includes at least one of a File Read protocol, a File Write protocol, a Direct Memory Access (DMA) protocol, or a Non-Volatile Memory Express (NVMe) protocol.

Statement 592. An embodiment of the disclosure includes the multi-function device according to statement 586, wherein the FHE circuit is configured to access the buffer using a protocol.

Statement 593. An embodiment of the disclosure includes the multi-function device according to statement 592, wherein the protocol includes at least one of a File Read protocol, a File Write protocol, a Direct Memory Access (DMA) protocol, or a Non-Volatile Memory Express (NVMe) protocol.

Statement 594. An embodiment of the disclosure includes the multi-function device according to statement 586, wherein:

the multi-function device further comprises a third connector for communicating with a computational storage unit; and the buffer is connected to the storage device, the FHE circuit, and the computational storage unit.

Statement 595. An embodiment of the disclosure includes the multi-function device according to statement 594, wherein the storage device, the FHE circuit, and the computational storage unit are configured to access a data in the buffer.

Statement 596. An embodiment of the disclosure includes the multi-function device according to statement 594, wherein the computational storage unit is configured to access the buffer using a protocol.

Statement 597. An embodiment of the disclosure includes the multi-function device according to statement 596, wherein the protocol includes at least one of a File Read protocol, a File Write protocol, a Direct Memory Access (DMA) protocol, or a Non-Volatile Memory Express (NVMe) protocol.

Statement 598. An embodiment of the disclosure includes the multi-function device according to statement 586, further comprising a data processor, the data processor configured to process a data in the buffer, wherein the buffer is connected to the storage device, the FHE circuit, and the data processor.

Statement 599. An embodiment of the disclosure includes the multi-function device according to statement 598, wherein the data processor is configured to process the data in the buffer based at least in part on a request from at least one of the host processor the storage device, or the FHE circuit.

Statement 600. An embodiment of the disclosure includes the multi-function device according to statement 599, wherein:

the multi-function device includes a third connector for communicating with a computational storage unit; and the data processor is configured to process the data in the buffer based at least in part on a request from at least one of the host processor, the storage device, the FHE circuit, or a computational storage unit.

Statement 601. An embodiment of the disclosure includes the multi-function device according to statement 599, wherein:

the data processor is configured to expose a function;

the request is from the host processor; and the request triggers the function of the data processor.

Statement 602. An embodiment of the disclosure includes the multi-function device according to statement 601, wherein the function includes a Peripheral Component Interconnect Express (PCIe) function.

Statement 603. An embodiment of the disclosure includes the multi-function device according to statement 602, wherein the PCIe function includes a first physical function (PF) or a first virtual function (VF).

Statement 604. An embodiment of the disclosure includes the multi-function device according to statement 601, wherein:

the multi-function device is configured to expose a second function to the host processor via the second connector;

the multi-function device is configured to receive the request from the host processor via the second connector; and the multi-function device triggers the function of the data processor.

Statement 605. An embodiment of the disclosure includes the multi-function device according to statement 604, wherein:

the request includes the second function; and the multi-function device is configured to map the second function to the function of the data processor.

Statement 606. An embodiment of the disclosure includes the multi-function device according to statement 568, further comprising a bridge connecting the second connector and the first connector.

Statement 607. An embodiment of the disclosure includes the multi-function device according to statement 606, wherein the bridge supports pass-through of a first request between the host processor and the storage device.

Statement 608. An embodiment of the disclosure includes the multi-function device according to statement 606, wherein:

the storage device is configured to expose a first function to the multi-function device via the first connector;

the FHE circuit is configured to expose a second function;

the multi-function device is configured to expose a third function to the host processor via the second connector; and the bridge is configured to map a request using the third function to a second request using the first function.

Statement 609. An embodiment of the disclosure includes the multi-function device according to statement 608, wherein the multi-function device is configured to expose the second function to the host processor via the second connector.

Statement 610. An embodiment of the disclosure includes the multi-function device according to statement 608, wherein the multi-function device does not expose the second function to the host processor via the second connector.

Statement 611. An embodiment of the disclosure includes the multi-function device according to statement 608, wherein:

the multi-function device is configured to direct the request to the bridge; and the multi-function device is configured to direct a third request to the FHE circuit.

Statement 612. An embodiment of the disclosure includes the multi-function device according to statement 611, wherein:

the multi-function device is configured to receive the first request from the host processor or the FHE circuit; and the multi-function device is configured to receive the third request from the storage device.

Statement 613. An embodiment of the disclosure includes the multi-function device according to statement 612, wherein:

the multi-function device is configured to receive the first request from the host processor, the FHE circuit, or a computational storage unit;

the multi-function device is configured to receive the third request from the storage device or the computational storage unit.

Statement 614. An embodiment of the disclosure includes the multi-function device according to statement 611, wherein:

the multi-function device is configured to expose the second function to the host processor via the second connector; and the multi-function device is configured to receive the third request from the host processor.

Statement 615. An embodiment of the disclosure includes the multi-function device according to statement 606, further comprising a buffer connected to the bridge and the FHE circuit.

Statement 616. An embodiment of the disclosure includes the multi-function device according to statement 615, wherein the bridge is configured to receive a request sent from the storage device and direct the request to the buffer.

Statement 617. An embodiment of the disclosure includes the multi-function device according to statement 616, wherein the request is sent from the storage device to the host processor.

Statement 618. An embodiment of the disclosure includes the multi-function device according to statement 616, wherein the storage device is agnostic to the bridge redirecting the request to the buffer.

Statement 619. An embodiment of the disclosure includes the multi-function device according to statement 616, wherein the bridge is configured to direct the request to the buffer based at least in part on an address, the request including the address.

Statement 620. An embodiment of the disclosure includes the multi-function device according to statement 619, wherein the buffer includes an address range including the address.

Statement 621. An embodiment of the disclosure includes the multi-function device according to statement 615, wherein the multi-function device is configured to receive a request sent from the FHE circuit and direct the request to the buffer.

Statement 622. An embodiment of the disclosure includes the multi-function device according to statement 621, wherein the request is sent from the FHE circuit to the host processor.

Statement 623. An embodiment of the disclosure includes the multi-function device according to statement 621, wherein the FHE circuit is agnostic to the multi-function device redirecting the request to the buffer.

Statement 624. An embodiment of the disclosure includes the multi-function device according to statement 621, wherein the multi-function device is configured to direct the request to the buffer based at least in part on an address, the request including the address.

Statement 625. An embodiment of the disclosure includes the multi-function device according to statement 624, wherein the buffer includes an address range including the address.

Statement 626. An embodiment of the disclosure includes the multi-function device according to statement 568, further comprising a storage for a list of device configurations.

Statement 627. An embodiment of the disclosure includes the multi-function device according to statement 626, wherein the storage includes a persistent storage.

Statement 628. An embodiment of the disclosure includes the multi-function device according to statement 626, wherein the multi-function device is configured to expose the storage device to the host processor based at least in part on the list of device configurations.

Statement 629. An embodiment of the disclosure includes the multi-function device according to statement 628, wherein the multi-function device is configured to expose the storage device and the FHE circuit to the host processor based at least in part on the list of device configurations.

Statement 630. An embodiment of the disclosure includes the multi-function device according to statement 628, wherein the multi-function device is configured not to expose the FHE circuit to the host processor based at least in part on the list of device configurations.

Statement 631. An embodiment of the disclosure includes the multi-function device according to statement 626, wherein the multi-function device is configured to detect a device connected to a third connector, determine a configuration of the device, and update the list of device configurations based at least in part on the configuration of the device.

Statement 632. An embodiment of the disclosure includes the multi-function device according to statement 631, wherein the device includes a second storage device, a second FHE circuit, a computational storage unit, or a network interface device.

Statement 633. An embodiment of the disclosure includes the multi-function device according to statement 626, wherein the multi-function device is configured to determine the configuration of the device and update the list of device configurations based at least in part on the list of configurations omitting a configuration of the device.

Statement 634. An embodiment of the disclosure includes the multi-function device according to statement 568, wherein the storage device is replaceable.

Statement 635. An embodiment of the disclosure includes the multi-function device according to statement 568, wherein:

the first connector includes a first PCIe port; and the second connector includes a second PCIe port.

Statement 636. An embodiment of the disclosure includes the multi-function device according to statement 635, wherein:

the first PCIe port includes a first root port; and the second PCIe port includes an endpoint.

Statement 637. An embodiment of the disclosure includes the multi-function device according to statement 568, wherein:

the storage device is configured to expose a first PCIe function to the multi-function device via the first connector;

the FHE circuit is configured to expose a second PCIe function; and the multi-function device is configured to expose a third PCIe function to the host processor via the second connector.

Statement 638. An embodiment of the disclosure includes the multi-function device according to statement 637, wherein:

the first PCIe function includes a first PF or a first VF;

the second PCIe function includes a second PF or a second VF; and the third PCIe function includes a third PF or a third VF.

Statement 639. An embodiment of the disclosure includes the multi-function device according to statement 568, wherein the first connector supports at least one of an Ethernet protocol, a Transmission Control Protocol/Internet Protocol (TCP/IP) protocol, a Remote DMA (RDMA) protocol, an NVMe protocol, an NVMe over Fabrics (NVMe-oF) protocol, a Universal Flash Storage (UFS) protocol, an embedded MultiMediaCard (eMMC) protocol, a Serial Attached Small Computer System Interface (SCSI) (SAS) protocol, or a Serial AT Attachment (SATA) protocol.

Statement 640. An embodiment of the disclosure includes the multi-function device according to statement 568, wherein the second connector supports at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 641. An embodiment of the disclosure includes the multi-function device according to statement 568, further comprising a third connector for communicating with a device.

Statement 642. An embodiment of the disclosure includes the multi-function device according to statement 641, wherein the device includes a second storage device, a second FHE circuit, a computational storage unit, or a network interface device.

Statement 643. An embodiment of the disclosure includes the multi-function device according to statement 641, wherein the device is implemented using at least one of an FPGA, an ASIC, an SoC, a GPU, a GPGPU, a CPU, a TPU, or an NPU.

Statement 644. An embodiment of the disclosure includes the multi-function device according to statement 641, wherein the multi-function device does not expose the device to the host processor.

Statement 645. An embodiment of the disclosure includes the multi-function device according to statement 641, wherein the FHE circuit is configured to invoke a capability of the device.

Statement 646. An embodiment of the disclosure includes the multi-function device according to statement 645, wherein the multi-function device is configured to receive a request from the FHE circuit and send the request to the device.

Statement 647. An embodiment of the disclosure includes the multi-function device according to statement 646, wherein the multi-function device is configured to receive the request from the FHE circuit and send the request to the device without sending the request to the host processor.

Statement 648. An embodiment of the disclosure includes the multi-function device according to statement 645, wherein the FHE circuit is configured to invoke the capability of the device without management by the host processor.

Statement 649. An embodiment of the disclosure includes the multi-function device according to statement 645, wherein the multi-function device is configured to receive a reply from the device and send the reply to the FHE circuit.

Statement 650. An embodiment of the disclosure includes the multi-function device according to statement 649, wherein the multi-function device is configured to receive the reply from the device and send the reply to the FHE circuit without sending the reply to the host processor.

Statement 651. An embodiment of the disclosure includes the multi-function device according to statement 641, wherein the storage device is configured to invoke a capability of the device.

Statement 652. An embodiment of the disclosure includes the multi-function device according to statement 651, wherein the multi-function device is configured to receive a request from the storage device and send the request to the device.

Statement 653. An embodiment of the disclosure includes the multi-function device according to statement 652, wherein the multi-function device is configured to receive the request from the storage device and send the request to the device without sending the request to the host processor.

Statement 654. An embodiment of the disclosure includes the multi-function device according to statement 651, wherein the storage device is configured to invoke the capability of the device without management by the host processor.

Statement 655. An embodiment of the disclosure includes the multi-function device according to statement 651, wherein the multi-function device is configured to receive a reply from the device and send the reply to the storage device.

Statement 656. An embodiment of the disclosure includes the multi-function device according to statement 655, wherein the multi-function device is configured to receive the reply from the device and send the reply to the storage device without sending the reply to the host processor.

Statement 657. An embodiment of the disclosure includes the multi-function device according to statement 641, wherein the device is configured to invoke a capability of the storage device or the FHE circuit.

Statement 658. An embodiment of the disclosure includes the multi-function device according to statement 657, wherein the multi-function device is configured to receive a request from the device and send the request to the storage device or the FHE circuit.

Statement 659. An embodiment of the disclosure includes the multi-function device according to statement 658, wherein the multi-function device is configured to receive the request from the device and send the request to the storage device or the FHE circuit without sending the request to the host processor.

Statement 660. An embodiment of the disclosure includes the multi-function device according to statement 657, wherein the device is configured to invoke the capability of the storage device or the FHE circuit without management by the host processor.

Statement 661. An embodiment of the disclosure includes the multi-function device according to statement 657, wherein the multi-function device is configured to receive a reply from the storage device or the FHE circuit and send the reply to the device.

Statement 662. An embodiment of the disclosure includes the multi-function device according to statement 661, wherein the multi-function device is configured to receive the reply from the storage device or the FHE circuit and send the reply to the device without sending the reply to the host processor.

Statement 663. An embodiment of the disclosure includes the multi-function device according to statement 641, further comprising:

a first bridge connecting the third connector and the first connector; and a second bridge connecting the third connector and the third connector.

Statement 664. An embodiment of the disclosure includes the multi-function device according to statement 663, wherein the second bridge supports pass-through of a request between the host processor and the device.

Statement 665. An embodiment of the disclosure includes the multi-function device according to statement 663, wherein:

the storage device is configured to expose a first function to the multi-function device via the first connector;

the FHE circuit is configured to expose a second function;

the device is configured to expose a third function to the multi-function device via the third connector;

the multi-function device is configured to expose a fourth function and a fifth function to the host processor via the second connector;

the multi-function device is configured to expose the fourth function to the device via the third connector and to the FHE circuit;

the multi-function device is configured to expose the fifth function to the storage device via the first connector and to the device via the third connector;

the multi-function device is configured to expose a sixth function to the storage device via the first connector and to the FHE circuit;

the first bridge is configured to map a first request using the fourth function to a second request using the first function; and the second bridge is configured to map a third request using the fifth function to a fourth request using the third function.

Statement 666. An embodiment of the disclosure includes the multi-function device according to statement 663, further comprising a buffer connected to the first bridge, the FHE circuit, and the second bridge.

Statement 667. An embodiment of the disclosure includes the multi-function device according to statement 666, wherein the second bridge is configured to receive a request sent from the device and direct the request to the buffer.

Statement 668. An embodiment of the disclosure includes the multi-function device according to statement 667, wherein the device is agnostic to the second bridge redirecting the request to the buffer.

Statement 669. An embodiment of the disclosure includes the multi-function device according to statement 667, wherein the second bridge is configured to direct the request to the buffer based at least in part on an address, the request including the address.

Statement 670. An embodiment of the disclosure includes the multi-function device according to statement 669, wherein the buffer includes an address range including the address.

Statement 671. An embodiment of the disclosure includes the multi-function device according to statement 641, wherein the multi-function device is configured not to expose the device to the host processor based at least in part on a list of device configurations.

Statement 672. An embodiment of the disclosure includes a method, comprising:

determining that a storage device is connected to a multi-function device;

determining that a Fully Homomorphic Encryption (FHE) circuit is available;

determining that a computational storage unit is connected to the multi-function device;

exposing the storage device to a host processor connected to the multi-function device; and selectively exposing the FHE circuit and the computational storage unit to the host processor.

Statement 673. An embodiment of the disclosure includes the method according to statement 672, wherein the multi-function device is implemented using at least one of a Field Programmable Gate Array (FPGA), an Application-Specific Integrated Circuit (ASIC), a System-on-a-Chip (SoC), a Graphics Processing Unit (GPU), a General Purpose GPU (GPGPU), a Central Processing Unit (CPU), a Tensor Processing Unit (TPU), or a Neural Processing Unit (NPU).

Statement 674. An embodiment of the disclosure includes the method according to statement 672, wherein the FHE circuit is implemented using at least one of an FPGA, an ASIC, an SoC, a GPU, a GPGPU, a CPU, a TPU, or an NPU.

Statement 675. An embodiment of the disclosure includes the method according to statement 672, wherein the computational storage unit is implemented using at least one of an FPGA, an ASIC, an SoC, a GPU, a GPGPU, a CPU, a TPU, or an NPU.

Statement 676. An embodiment of the disclosure includes the method according to statement 672, wherein the storage device includes a Solid State Drive (SSD).

Statement 677. An embodiment of the disclosure includes the method according to statement 672, wherein the computational storage unit includes an accelerator circuit, a second FHE circuit, or a network interface device.

Statement 678. An embodiment of the disclosure includes the method according to statement 672, wherein determining that the FHE circuit is available includes determining that the FHE circuit is connected to the multi-function device.

Statement 679. An embodiment of the disclosure includes the method according to statement 678, wherein determining that the FHE circuit is connected to the multi-function device includes determining that the FHE circuit is connected to the multi-function device via a connector.

Statement 680. An embodiment of the disclosure includes the method according to statement 672, wherein determining that the FHE circuit is available includes determining that the FHE circuit is integrated into the multi-function device.

Statement 681. An embodiment of the disclosure includes the method according to statement 672, wherein:

determining that the storage device is connected to the multi-function device includes determining that the storage device is connected to the multi-function device via a first connector; and determining that the computational storage unit is connected to the multi-function device includes determining that the computational storage unit is connected to the multi-function device via a second connector.

Statement 682. An embodiment of the disclosure includes the method according to statement 672, wherein selectively exposing the FHE circuit and the computational storage unit to a host processor connected to the multi-function device includes:

exposing the FHE circuit to the host processor; and not exposing the computational storage unit to the host processor.

Statement 683. An embodiment of the disclosure includes the method according to statement 672, wherein selectively exposing the FHE circuit and the computational storage unit to a host processor connected to the multi-function device includes:

exposing the computational storage unit to the host processor; and not exposing the FHE circuit to the host processor.

Statement 684. An embodiment of the disclosure includes the method according to statement 672, further comprising:

receiving a request at the multi-function device from the storage device to invoke a capability of the FHE circuit or the computational storage unit; and sending the request to the FHE circuit or the computational storage unit.

Statement 685. An embodiment of the disclosure includes the method according to statement 684, wherein sending the request to the FHE circuit or the computational storage unit includes sending the request to the FHE circuit or the computational storage unit without sending the request to the host processor.

Statement 686. An embodiment of the disclosure includes the method according to statement 684, wherein sending the request to the FHE circuit or the computational storage unit includes sending the request to the FHE circuit or the computational storage unit without management by the host processor.

Statement 687. An embodiment of the disclosure includes the method according to statement 684, further comprising:

receiving a reply at the multi-function device from the FHE circuit or the computational storage unit; and sending the reply to the storage device.

Statement 688. An embodiment of the disclosure includes the method according to statement 687, wherein sending the reply to the storage device includes sending the reply to the storage device without sending the reply to the host processor.

Statement 689. An embodiment of the disclosure includes the method according to statement 672, further comprising:

receiving a request at the multi-function device from the FHE circuit to invoke a capability of the storage device or the computational storage unit; and sending the request to the storage device or the computational storage unit.

Statement 690. An embodiment of the disclosure includes the method according to statement 689, wherein sending the request to the storage device or the computational storage unit includes sending the request to the storage device or the computational storage unit without sending the request to the host processor.

Statement 691. An embodiment of the disclosure includes the method according to statement 689, wherein sending the request to the storage device or the computational storage unit includes sending the request to the storage device or the computational storage unit without management by the host processor.

Statement 692. An embodiment of the disclosure includes the method according to statement 689, further comprising:

receiving a reply at the multi-function device from the storage device or the computational storage unit; and sending the reply to the FHE circuit.

Statement 693. An embodiment of the disclosure includes the method according to statement 692, wherein sending the reply to the FHE circuit includes sending the reply to the FHE circuit without sending the reply to the host processor.

Statement 694. An embodiment of the disclosure includes the method according to statement 672, further comprising:

receiving a request at the multi-function device from the computational storage unit to invoke a capability of the storage device or the FHE circuit; and sending the request to the storage device or the FHE circuit.

Statement 695. An embodiment of the disclosure includes the method according to statement 694, wherein sending the request to the storage device or the FHE circuit includes sending the request to the storage device or the FHE circuit without sending the request to the host processor.

Statement 696. An embodiment of the disclosure includes the method according to statement 694, wherein sending the request to the storage device or the FHE circuit includes sending the request to the storage device or the FHE circuit without management by the host processor.

Statement 697. An embodiment of the disclosure includes the method according to statement 694, further comprising:

receiving a reply at the multi-function device from the storage device or the FHE circuit; and sending the reply to the computational storage unit.

Statement 698. An embodiment of the disclosure includes the method according to statement 697, wherein sending the reply to the computational storage unit includes sending the reply to the computational storage unit without sending the reply to the host processor.

Statement 699. An embodiment of the disclosure includes the method according to statement 672, further comprising:

accessing a data in a buffer in the multi-function device by the storage device; and accessing the data in the buffer in the multi-function device by the FHE circuit.

Statement 700. An embodiment of the disclosure includes the method according to statement 699, further comprising:

accessing the data in the buffer in the multi-function device by the computational storage unit.

Statement 701. An embodiment of the disclosure includes the method according to statement 699, wherein:

the buffer includes an address range; and the method further comprises determining the address range of the buffer from the host processor.

Statement 702. An embodiment of the disclosure includes the method according to statement 699, wherein:

accessing the data in the buffer in the multi-function device by the storage device includes accessing the data in the buffer in the multi-function device by the storage device using a first protocol; and accessing the data in the buffer in the multi-function device by the FHE circuit includes accessing the data in the buffer in the multi-function device by the FHE circuit using a second protocol.

Statement 703. An embodiment of the disclosure includes the method according to statement 702, wherein:

the first protocol includes at least one of a File Read protocol, a File Write protocol, a Direct Memory Access (DMA) protocol, or a Non-Volatile Memory Express (NVMe) protocol; and the second protocol includes at least one of the File Read protocol, the File Write protocol, the DMA protocol, or the NVMe protocol.

Statement 704. An embodiment of the disclosure includes the method according to statement 702, further comprising accessing the data in the buffer in the multi-function device by the computational storage unit using a third protocol.

Statement 705. An embodiment of the disclosure includes the method according to statement 704, wherein the third protocol includes at least one of the File Read protocol, the File Write protocol, the DMA protocol, or the NVMe protocol.

Statement 706. An embodiment of the disclosure includes the method according to statement 699, further comprising processing the data in the buffer using a data processor of the multi-function device.

Statement 707. An embodiment of the disclosure includes the method according to statement 706, wherein processing the data in the buffer using the data processor of the multi-function device includes processing the data in the buffer using the data processor of the multi-function device based at least in part on a request from one of the host processor, the storage device, the FHE circuit, or the computational storage unit.

Statement 708. An embodiment of the disclosure includes the method according to statement 707, wherein:
- the method further comprises:
  - determining that a function is exposed by the data processor; and
  - exposing the function by the multi-function device; and
- processing the data in the buffer using the data processor of the multi-function device based at least in part on a request from one of the host processor, the storage device, the FHE circuit, or the computational storage unit includes receiving the request from at least one of the host processor, the storage device, the FHE circuit, or the computational storage unit, the request triggering the function.

Statement 709. An embodiment of the disclosure includes the method according to statement 708, wherein determining that the function is exposed by the data processor includes determining that a Peripheral Component Interconnect Express (PCIe) function is exposed by the data processor.

Statement 710. An embodiment of the disclosure includes the method according to statement 709, wherein the PCIe function includes a first physical function (PF) or a first virtual function (VF).

Statement 711. An embodiment of the disclosure includes the method according to statement 707, wherein:
- the method further comprises:
  - determining that a function is exposed by the data processor; and
  - exposing the function by the multi-function device; and
- processing the data in the buffer using the data processor of the multi-function device based at least in part on a request from one of the host processor, the storage device, the FHE circuit, or the computational storage unit includes:
  - receiving the request from at least one of the host processor, the storage device, the FHE circuit, or the computational storage unit, the request triggering the second function; and
  - triggering the function of the data processor.

Statement 712. An embodiment of the disclosure includes the method according to statement 711, wherein triggering the function of the data processor includes mapping the second function to the function of the data processor.

Statement 713. An embodiment of the disclosure includes the method according to statement 672, further comprising:
- receiving a request from the host processor, the storage device, the FHE circuit, or the computational storage unit at a bridge of the multi-function device; and
- passing the request through the bridge to the host processor, the storage device, the FHE circuit, or the computational storage unit.

Statement 714. An embodiment of the disclosure includes the method according to statement 672, further comprising:
- receiving a request from the host processor, the storage device, the FHE circuit, or the computational storage unit at a bridge of the multi-function device, the request triggering a function exposed by the storage device, the FHE circuit, or the computational storage unit; and
- sending the request from the bridge to the storage device, the FHE circuit, or the computational storage unit based at least in part on the function exposed by the storage device, the FHE circuit, or the computational storage unit.

Statement 715. An embodiment of the disclosure includes the method according to statement 714, wherein receiving the request from the host processor, the storage device, the FHE circuit, or the computational storage unit at the bridge of the multi-function device includes:
- receiving the request from the host processor, the storage device, the FHE circuit, or the computational storage unit at the multi-function device; and
- sending the request to the bridge based at least in part on the function exposed by the storage device, the FHE circuit, or the computational storage unit.

Statement 716. An embodiment of the disclosure includes the method according to statement 714, wherein:
- receiving the request from the host processor, the storage device, the FHE circuit, or the computational storage unit at the bridge of the multi-function device, the request triggering a second function exposed by the multi-function device;
- the method further comprises mapping the second function to the function exposed by the storage device, the FHE circuit, or the computational storage unit; and
- sending the request from the bridge to the storage device, the FHE circuit, or the computational storage unit based at least in part on the function exposed by the storage device, the FHE circuit, or the computational storage unit.

Statement 717. An embodiment of the disclosure includes the method according to statement 716, wherein receiving the request from the host processor, the storage device, the FHE circuit, or the computational storage unit at the bridge of the multi-function device includes:
- receiving the request from the host processor, the storage device, the FHE circuit, or the computational storage unit at the multi-function device; and
- sending the request to the bridge based at least in part on the second function exposed by the multi-function device.

Statement 718. An embodiment of the disclosure includes the method according to statement 714, wherein the multi-function device does not expose the function to the host processor.

Statement 719. An embodiment of the disclosure includes the method according to statement 672, further comprising:
- receiving a request from the storage device, the FHE circuit, or the computational storage unit at a bridge of the multi-function device; and
- sending the request from the bridge to a buffer of the multi-function device.

Statement 720. An embodiment of the disclosure includes the method according to statement 719, wherein the request is sent from the storage device, the FHE circuit, or the computational storage unit to the host processor.

Statement 721. An embodiment of the disclosure includes the method according to statement 719, wherein sending the request from the bridge to the buffer of the multi-function device includes sending the request from the bridge to the buffer of the multi-function device without notifying the storage device, the FHE circuit, or the computational storage unit.

Statement 722. An embodiment of the disclosure includes the method according to statement 719, wherein sending the request from the bridge to the buffer of the multi-function device includes sending the request from the bridge to the buffer of the multi-function device based at least in part on an address, the request including the address.

Statement 723. An embodiment of the disclosure includes the method according to statement 722, wherein the buffer includes an address range including the address.

Statement 724. An embodiment of the disclosure includes the method according to statement 723, further comprising receiving the address range for the buffer from the host processor.

Statement 725. An embodiment of the disclosure includes the method according to statement 672, wherein:

exposing the storage device to the host processor connected to the multi-function device includes exposing the storage device to the host processor connected to the multi-function device based at least in part on a list of device configurations; and selectively exposing the FHE circuit and the computational storage unit to the host processor includes selectively exposing the FHE circuit and the computational storage unit to the host processor based at least in part on the list of device configurations.

Statement 726. An embodiment of the disclosure includes the method according to statement 725, wherein further comprising accessing the list of device configurations from a storage of the multi-function device.

Statement 727. An embodiment of the disclosure includes the method according to statement 726, wherein accessing the list of device configurations from the storage of the multi-function device includes accessing the list of device configurations from a persistent storage of the multi-function device.

Statement 728. An embodiment of the disclosure includes the method according to statement 725, further comprising:

determining that a device is connected to the multi-function device;

determining a configuration of the device; and updating the list of device configurations based at least in part on the configuration of the device.

Statement 729. An embodiment of the disclosure includes the method according to statement 728, wherein the device includes a second storage device, a second computational storage unit, a second FHE circuit, or a network interface device.

Statement 730. An embodiment of the disclosure includes the method according to statement 728, wherein updating the list of device configurations based at least in part on the configuration of the device includes determining that the list of device configurations omits the configuration of the device.

Statement 731. An embodiment of the disclosure includes the method according to statement 672, further comprising replacing the storage device with a device.

Statement 732. An embodiment of the disclosure includes the method according to statement 672, further comprising replacing the FHE circuit with a device.

Statement 733. An embodiment of the disclosure includes the method according to statement 672, further comprising replacing the computational storage unit with a device.

Statement 734. An embodiment of the disclosure includes the method according to statement 672, wherein the multi-function device communicates with the storage device using at least one of an Ethernet protocol, a Transmission Control Protocol/Internet Protocol (TCP/IP) protocol, a Remote DMA (RDMA) protocol, an NVMe protocol, an NVMe over Fabrics (NVMe-oF) protocol, a Universal Flash Storage (UFS) protocol, an embedded MultiMediaCard (eMMC) protocol, a Serial Attached Small Computer System Interface (SCSI) (SAS) protocol, or a Serial AT Attachment (SATA) protocol.

Statement 735. An embodiment of the disclosure includes the method according to statement 672, wherein the multi-function device communicates with the FHE circuit using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 736. An embodiment of the disclosure includes the method according to statement 672, wherein the multi-function device communicates with the computational storage unit using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 737. An embodiment of the disclosure includes the method according to statement 672, wherein the multi-function device communicates with the host processor using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 738. An embodiment of the disclosure includes an article, comprising a non-transitory storage medium, the non-transitory storage medium having stored thereon instructions that, when executed by a machine, result in:

determining that a storage device is connected to a multi-function device;

determining that a Fully Homomorphic Encryption (FHE) circuit is available;

determining that a computational storage unit is connected to the multi-function device;

exposing the storage device to a host processor connected to the multi-function device; and selectively exposing the FHE circuit and the computational storage unit to the host processor.

Statement 739. An embodiment of the disclosure includes the article according to statement 738, wherein the multi-function device is implemented using at least one of a Field Programmable Gate Array (FPGA), an Application-Specific Integrated Circuit (ASIC), a System-on-a-Chip (SoC), a Graphics Processing Unit (GPU), a General Purpose GPU (GPGPU), a Central Processing Unit (CPU), a Tensor Processing Unit (TPU), or a Neural Processing Unit (NPU).

Statement 740. An embodiment of the disclosure includes the article according to statement 738, wherein the FHE circuit is implemented using at least one of an FPGA, an ASIC, an SoC, a GPU, a GPGPU, a CPU, a TPU, or an NPU.

Statement 741. An embodiment of the disclosure includes the article according to statement 738, wherein the computational storage unit is implemented using at least one of an FPGA, an ASIC, an SoC, a GPU, a GPGPU, a CPU, a TPU, or an NPU.

Statement 742. An embodiment of the disclosure includes the article according to statement 738, wherein the storage device includes a Solid State Drive (SSD).

Statement 743. An embodiment of the disclosure includes the article according to statement 738, wherein the computational storage unit includes an accelerator circuit, a second FHE circuit, or a network interface device.

Statement 744. An embodiment of the disclosure includes the article according to statement 738, wherein determining that the FHE circuit is available includes determining that the FHE circuit is connected to the multi-function device.

Statement 745. An embodiment of the disclosure includes the article according to statement 744, wherein determining that the FHE circuit is connected to the multi-function device includes determining that the FHE circuit is connected to the multi-function device via a connector.

Statement 746. An embodiment of the disclosure includes the article according to statement 738, wherein determining that the FHE circuit is available includes determining that the FHE circuit is integrated into the multi-function device.

Statement 747. An embodiment of the disclosure includes the article according to statement 738, wherein:

determining that the storage device is connected to the multi-function device includes determining that the storage device is connected to the multi-function device via a first connector; and determining that the computational storage unit is connected to the multi-function device includes determining that the computational storage unit is connected to the multi-function device via a second connector.

Statement 748. An embodiment of the disclosure includes the article according to statement 738, wherein selectively exposing the FHE circuit and the computational storage unit to a host processor connected to the multi-function device includes:

exposing the FHE circuit to the host processor; and not exposing the computational storage unit to the host processor.

Statement 749. An embodiment of the disclosure includes the article according to statement 738, wherein selectively exposing the FHE circuit and the computational storage unit to a host processor connected to the multi-function device includes:

exposing the computational storage unit to the host processor; and not exposing the FHE circuit to the host processor.

Statement 750. An embodiment of the disclosure includes the article according to statement 738, the non-transitory storage medium having stored thereon further instructions that, when executed by the machine, result in:

receiving a request at the multi-function device from the storage device to invoke a capability of the FHE circuit or the computational storage unit; and sending the request to the FHE circuit or the computational storage unit.

Statement 751. An embodiment of the disclosure includes the article according to statement 750, wherein sending the request to the FHE circuit or the computational storage unit includes sending the request to the FHE circuit or the computational storage unit without sending the request to the host processor.

Statement 752. An embodiment of the disclosure includes the article according to statement 750, wherein sending the request to the FHE circuit or the computational storage unit includes sending the request to the FHE circuit or the computational storage unit without management by the host processor.

Statement 753. An embodiment of the disclosure includes the article according to statement 750, the non-transitory storage medium having stored thereon further instructions that, when executed by the machine, result in:

receiving a reply at the multi-function device from the FHE circuit or the computational storage unit; and sending the reply to the storage device.

Statement 754. An embodiment of the disclosure includes the article according to statement 753, wherein sending the reply to the storage device includes sending the reply to the storage device without sending the reply to the host processor.

Statement 755. An embodiment of the disclosure includes the article according to statement 738, the non-transitory storage medium having stored thereon further instructions that, when executed by the machine, result in:

receiving a request at the multi-function device from the FHE circuit to invoke a capability of the storage device or the computational storage unit; and sending the request to the storage device or the computational storage unit.

Statement 756. An embodiment of the disclosure includes the article according to statement 755, wherein sending the request to the storage device or the computational storage unit includes sending the request to the storage device or the computational storage unit without sending the request to the host processor.

Statement 757. An embodiment of the disclosure includes the article according to statement 755, wherein sending the request to the storage device or the computational storage unit includes sending the request to the storage device or the computational storage unit without management by the host processor.

Statement 758. An embodiment of the disclosure includes the article according to statement 755, the non-transitory storage medium having stored thereon further instructions that, when executed by the machine, result in:

receiving a reply at the multi-function device from the storage device or the computational storage unit; and sending the reply to the FHE circuit.

Statement 759. An embodiment of the disclosure includes the article according to statement 758, wherein sending the reply to the FHE circuit includes sending the reply to the FHE circuit without sending the reply to the host processor.

Statement 760. An embodiment of the disclosure includes the article according to statement 738, the non-transitory storage medium having stored thereon further instructions that, when executed by the machine, result in:

receiving a request at the multi-function device from the computational storage unit to invoke a capability of the storage device or the FHE circuit; and sending the request to the storage device or the FHE circuit.

Statement 761. An embodiment of the disclosure includes the article according to statement 760, wherein sending the request to the storage device or the FHE circuit includes sending the request to the storage device or the FHE circuit without sending the request to the host processor.

Statement 762. An embodiment of the disclosure includes the article according to statement 760, wherein sending the request to the storage device or the FHE circuit includes sending the request to the storage device or the FHE circuit without management by the host processor.

Statement 763. An embodiment of the disclosure includes the article according to statement 760, the non-transitory storage medium having stored thereon further instructions that, when executed by the machine, result in:

receiving a reply at the multi-function device from the storage device or the FHE circuit; and sending the reply to the computational storage unit.

Statement 764. An embodiment of the disclosure includes the article according to statement 763, wherein sending the reply to the computational storage unit includes sending the reply to the computational storage unit without sending the reply to the host processor.

Statement 765. An embodiment of the disclosure includes the article according to statement 738, the non-transitory storage medium having stored thereon further instructions that, when executed by the machine, result in:

accessing a data in a buffer in the multi-function device by the storage device; and accessing the data in the buffer in the multi-function device by the FHE circuit.

Statement 766. An embodiment of the disclosure includes the article according to statement 765, the non-transitory storage medium having stored thereon further instructions that, when executed by the machine, result in:

accessing the data in the buffer in the multi-function device by the computational storage unit.

Statement 767. An embodiment of the disclosure includes the article according to statement 765, wherein:

the buffer includes an address range; and the non-transitory storage medium has stored thereon further instructions that, when executed by the machine, result in determining the address range of the buffer from the host processor.

Statement 768. An embodiment of the disclosure includes the article according to statement 765, wherein:

accessing the data in the buffer in the multi-function device by the storage device includes accessing the data in the buffer in the multi-function device by the storage device using a first protocol; and accessing the data in the buffer in the multi-function device by the FHE circuit includes accessing the data in the buffer in the multi-function device by the FHE circuit using a second protocol.

Statement 769. An embodiment of the disclosure includes the article according to statement 768, wherein:

the first protocol includes at least one of a File Read protocol, a File Write protocol, a Direct Memory Access (DMA) protocol, or a Non-Volatile Memory Express (NVMe) protocol; and the second protocol includes at least one of the File Read protocol, the File Write protocol, the DMA protocol, or the NVMe protocol.

Statement 770. An embodiment of the disclosure includes the article according to statement 768, the non-transitory storage medium having stored thereon further instructions that, when executed by the machine, result in accessing the data in the buffer in the multi-function device by the computational storage unit using a third protocol.

Statement 771. An embodiment of the disclosure includes the article according to statement 770, wherein the third protocol includes at least one of the File Read protocol, the File Write protocol, the DMA protocol, or the NVMe protocol.

Statement 772. An embodiment of the disclosure includes the article according to statement 765, the non-transitory storage medium having stored thereon further instructions that, when executed by the machine, result in processing the data in the buffer using a data processor of the multi-function device.

Statement 773. An embodiment of the disclosure includes the article according to statement 772, wherein processing the data in the buffer using the data processor of the multi-function device includes processing the data in the buffer using the data processor of the multi-function device based at least in part on a request from one of the host processor, the storage device, the FHE circuit, or the computational storage unit.

Statement 774. An embodiment of the disclosure includes the article according to statement 773, wherein:

the non-transitory storage medium has stored thereon further instructions that, when executed by the machine, result in:

determining that a function is exposed by the data processor; and exposing the function by the multi-function device; and processing the data in the buffer using the data processor of the multi-function device based at least in part on a request from one of the host processor, the storage device, the FHE circuit, or the computational storage unit includes receiving the request from at least one of the host processor, the storage device, the FHE circuit, or the computational storage unit, the request triggering the function.

Statement 775. An embodiment of the disclosure includes the article according to statement 774, wherein determining that the function is exposed by the data processor includes determining that a Peripheral Component Interconnect Express (PCIe) function is exposed by the data processor.

Statement 776. An embodiment of the disclosure includes the article according to statement 775, wherein the PCIe function includes a first physical function (PF) or a first virtual function (VF).

Statement 777. An embodiment of the disclosure includes the article according to statement 773, wherein:

the non-transitory storage medium has stored thereon further instructions that, when executed by the machine, result in:

determining that a function is exposed by the data processor; and exposing the function by the multi-function device; and processing the data in the buffer using the data processor of the multi-function device based at least in part on a request from one of the host processor, the storage device, the FHE circuit, or the computational storage unit includes:

receiving the request from at least one of the host processor, the storage device, the FHE circuit, or the computational storage unit, the request triggering the second function; and triggering the function of the data processor.

Statement 778. An embodiment of the disclosure includes the article according to statement 777, wherein triggering the function of the data processor includes mapping the second function to the function of the data processor.

Statement 779. An embodiment of the disclosure includes the article according to statement 738, the non-transitory storage medium having stored thereon further instructions that, when executed by the machine, result in:

receiving a request from the host processor, the storage device, the FHE circuit, or the computational storage unit at a bridge of the multi-function device; and passing the request through the bridge to the host processor, the storage device, the FHE circuit, or the computational storage unit.

Statement 780. An embodiment of the disclosure includes the article according to statement 738, the non-transitory storage medium having stored thereon further instructions that, when executed by the machine, result in:

receiving a request from the host processor, the storage device, the FHE circuit, or the computational storage unit at a bridge of the multi-function device, the request triggering a function exposed by the storage device, the FHE circuit, or the computational storage unit; and sending the request from the bridge to the storage device, the FHE circuit, or the computational storage unit based at least in part on the function exposed by the storage device, the FHE circuit, or the computational storage unit.

Statement 781. An embodiment of the disclosure includes the article according to statement 780, wherein receiving the request from the host processor, the storage device, the FHE circuit, or the computational storage unit at the bridge of the multi-function device includes:

receiving the request from the host processor, the storage device, the FHE circuit, or the computational storage unit at the multi-function device; and sending the request to the bridge based at least in part on the function exposed by the storage device, the FHE circuit, or the computational storage unit.

Statement 782. An embodiment of the disclosure includes the article according to statement 780, wherein:

receiving the request from the host processor, the storage device, the FHE circuit, or the computational storage unit at the bridge of the multi-function device, the request triggering a second function exposed by the multi-function device;

the non-transitory storage medium has stored thereon further instructions that, when executed by the machine, result in mapping the second function to the function exposed by the storage device, the FHE circuit, or the computational storage unit; and sending the request from the bridge to the storage device, the FHE circuit, or the computational storage unit based at least in part on the function exposed by the storage device, the FHE circuit, or the computational storage unit.

Statement 783. An embodiment of the disclosure includes the article according to statement 782, wherein receiving the request from the host processor, the storage device, the FHE circuit, or the computational storage unit at the bridge of the multi-function device includes:

receiving the request from the host processor, the storage device, the FHE circuit, or the computational storage unit at the multi-function device; and sending the request to the bridge based at least in part on the second function exposed by the multi-function device.

Statement 784. An embodiment of the disclosure includes the article according to statement 780, wherein the multi-function device does not expose the function to the host processor.

Statement 785. An embodiment of the disclosure includes the article according to statement 738, the non-transitory storage medium having stored thereon further instructions that, when executed by the machine, result in:

receiving a request from the storage device, the FHE circuit, or the computational storage unit at a bridge of the multi-function device; and sending the request from the bridge to a buffer of the multi-function device.

Statement 786. An embodiment of the disclosure includes the article according to statement 785, wherein the request is sent from the storage device, the FHE circuit, or the computational storage unit to the host processor.

Statement 787. An embodiment of the disclosure includes the article according to statement 785, wherein sending the request from the bridge to the buffer of the multi-function device includes sending the request from the bridge to the buffer of the multi-function device without notifying the storage device, the FHE circuit, or the computational storage unit.

Statement 788. An embodiment of the disclosure includes the article according to statement 785, wherein sending the request from the bridge to the buffer of the multi-function device includes sending the request from the bridge to the buffer of the multi-function device based at least in part on an address, the request including the address.

Statement 789. An embodiment of the disclosure includes the article according to statement 788, wherein the buffer includes an address range including the address.

Statement 790. An embodiment of the disclosure includes the article according to statement 789, the non-transitory storage medium having stored thereon further instructions that, when executed by the machine, result in receiving the address range for the buffer from the host processor.

Statement 791. An embodiment of the disclosure includes the article according to statement 738, wherein:

exposing the storage device to the host processor connected to the multi-function device includes exposing the storage device to the host processor connected to the multi-function device based at least in part on a list of device configurations; and selectively exposing the FHE circuit and the computational storage unit to the host processor includes selectively exposing the FHE circuit and the computational storage unit to the host processor based at least in part on the list of device configurations.

Statement 792. An embodiment of the disclosure includes the article according to statement 791, wherein the non-transitory storage medium having stored thereon further instructions that, when executed by the machine, result in accessing the list of device configurations from a storage of the multi-function device.

Statement 793. An embodiment of the disclosure includes the article according to statement 792, wherein accessing the list of device configurations from the storage of the multi-function device includes accessing the list of device configurations from a persistent storage of the multi-function device.

Statement 794. An embodiment of the disclosure includes the article according to statement 791, the non-transitory storage medium having stored thereon further instructions that, when executed by the machine, result in:

determining that a device is connected to the multi-function device;

determining a configuration of the device; and updating the list of device configurations based at least in part on the configuration of the device.

Statement 795. An embodiment of the disclosure includes the article according to statement 794, wherein the device includes a second storage device, a second computational storage unit, a second FHE circuit, or a network interface device.

Statement 796. An embodiment of the disclosure includes the article according to statement 794, wherein updating the list of device configurations based at least in part on the configuration of the device includes determining that the list of device configurations omits the configuration of the device.

Statement 797. An embodiment of the disclosure includes the article according to statement 738, the non-transitory storage medium having stored thereon further instructions that, when executed by the machine, result in replacing the storage device with a device.

Statement 798. An embodiment of the disclosure includes the article according to statement 738, the non-transitory storage medium having stored thereon further instructions that, when executed by the machine, result in replacing the FHE circuit with a device.

Statement 799. An embodiment of the disclosure includes the article according to statement 738, the non-transitory storage medium having stored thereon further instructions that, when executed by the machine, result in replacing the computational storage unit with a device.

Statement 800. An embodiment of the disclosure includes the article according to statement 738, wherein the multi-function device communicates with the storage device using at least one of an Ethernet protocol, a Transmission Control Protocol/Internet Protocol (TCP/IP) protocol, a Remote DMA (RDMA) protocol, an NVMe protocol, an NVMe over Fabrics (NVMe-oF) protocol, a Universal Flash Storage (UFS) protocol, an embedded MultiMediaCard (eMMC) protocol, a Serial Attached Small Computer System Interface (SCSI) (SAS) protocol, or a Serial AT Attachment (SATA) protocol.

Statement 801. An embodiment of the disclosure includes the article according to statement 738, wherein the multi-function device communicates with the FHE circuit using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 802. An embodiment of the disclosure includes the article according to statement 738, wherein the multi-function device communicates with the computational storage unit using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Statement 803. An embodiment of the disclosure includes the article according to statement 738, wherein the multi-function device communicates with the host processor using at least one of an Ethernet protocol, a TCP/IP protocol, an RDMA protocol, an NVMe protocol, an NVMe-oF protocol, a UFS protocol, an eMMC protocol, an SAS protocol, or a SATA protocol.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A method, comprising:

determining that a storage device is connected to a multi-function device;

determining that a Fully Homomorphic Encryption (FHE) circuit is in communication with the multi-function device;

exposing the storage device to a host processor connected to the multi-function device; and selectively exposing the FHE circuit to the host processor based at least in part on a list of device configurations.

2. The method according to claim 1, wherein determining that the FHE circuit is in communication with the multi-function device includes determining that the FHE circuit is connected to the multi-function device.

3. The method according to claim 1, wherein determining that the FHE circuit is in communication with the multi-function device includes determining that the FHE circuit is integrated into the multi-function device.

4. The method according to claim 1, further comprising:

receiving a request at the multi-function device from the storage device or the FHE circuit to invoke a capability of the storage device or the FHE circuit; and sending the request to the storage device or the FHE circuit.

5. The method according to claim 1, further comprising:

accessing a data in a buffer in the multi-function device by the storage device, including:

receiving a request from the storage device at a first bridge of the multi-function device; and sending the request from the first bridge to the buffer of the multi-function device;

accessing the data in the buffer in the multi-function device by the FHE circuit, including:

receiving a request from the FHE circuit at a second bridge of the multi-function device; and sending the request from the second bridge to the buffer of the multi-function device; and processing the data in the buffer using a data processor of the multi-function device.

6. The method according to claim 1, wherein:

exposing the storage device to the host processor connected to the multi-function device includes exposing the storage device to the host processor connected to the multi-function device based at least in part on the list of device configurations; and the method further comprises:

determining that a device is connected to the multi-function device;

determining a configuration of the device; and updating the list of device configurations based at least in part on the configuration of the device.

7. The method according to claim 1, wherein:

the method further comprises determining that a computational storage unit is connected to the multi-function device; and selectively exposing the FHE circuit to the host processor based at least in part on the list of device configurations includes selectively exposing the FHE circuit to the host processor or the computational storage unit based at least in part on the list of device configurations.

8. The method according to claim 1, wherein the FHE circuit is implemented using at least one of an FPGA, an ASIC, an SoC, a GPU, a GPGPU, a CPU, a TPU, or an NPU.

9. The method according to claim 1, further comprising:

receiving a request at the multi-function device from the storage device to invoke a capability of the FHE circuit; and sending the request to the FHE circuit.

10. The method according to claim 1, further comprising:

receiving a request at the multi-function device from the FHE circuit to invoke a capability of the storage device; and sending the request to the storage device.

11. The method according to claim 1, further comprising:

accessing a data in a buffer in the multi-function device by the storage device; and accessing the data in the buffer in the multi-function device by the FHE circuit.

12. The method according to claim 11, wherein:

accessing the data in the buffer in the multi-function device by the storage device includes accessing the data in the buffer in the multi-function device by the storage device using a first protocol; and accessing the data in the buffer in the multi-function device by the FHE circuit includes accessing the data in the buffer in the multi-function device by the FHE circuit using a second protocol.

13. The method according to claim 12, further comprising accessing the data in the buffer in the multi-function device by a computational storage unit using a third protocol.

14. The method according to claim 11, further comprising processing the data in the buffer using a data processor of the multi-function device.

15. The method according to claim 1, further comprising:

receiving a request from the storage device or the FHE circuit at a bridge of the multi-function device; and sending the request from the bridge to a buffer of the multi-function device.

16. The method according to claim 15, wherein the request is sent from the storage device or the FHE circuit to the host processor.

17. The method according to claim 15, wherein sending the request from the bridge to the buffer of the multi-function device includes sending the request from the bridge to the buffer of the multi-function device based at least in part on an address, the request including the address.

18. The method according to claim 1, wherein exposing the storage device to the host processor connected to the multi-function device includes exposing the storage device to the host processor connected to the multi-function device based at least in part on the list of device configurations.

19. An article, comprising a non-transitory storage medium, the non-transitory storage medium having stored thereon instructions that, when executed by a machine, result in:

determining that a storage device is connected to a multi-function device;

determining that a Fully Homomorphic Encryption (FHE) circuit is in communication with the multi-function device;

exposing the storage device to a host processor connected to the multi-function device; and selectively exposing the FHE circuit to the host processor based at least in part on a list of device configurations.

20. The article according to claim 19, further comprising:

accessing a data in a buffer in the multi-function device by the storage device; and accessing the data in the buffer in the multi-function device by the FHE circuit.

* * * * *